(12) United States Patent
Sancoff et al.

(10) Patent No.: US 10,730,597 B2
(45) Date of Patent: Aug. 4, 2020

(54) HIGH SPEED SURFACE CRAFT AND SUBMERSIBLE CRAFT

(71) Applicant: Juliet Marine Systems, Inc., Portsmouth, NH (US)

(72) Inventors: Gregory E. Sancoff, North Hampton, NH (US); Joseph Curcio, Gray, ME (US); David Norman, Standish, ME (US)

(73) Assignee: Juliet Marine Systems, Inc., Portsmouth, NH (US)

( * ) Notice: Subject to any disclaimer, the term of this patent is extended or adjusted under 35 U.S.C. 154(b) by 0 days.

(21) Appl. No.: 15/728,909

(22) Filed: Oct. 10, 2017

(65) Prior Publication Data
US 2019/0315444 A1 Oct. 17, 2019

Related U.S. Application Data

(63) Continuation of application No. 15/145,542, filed on May 3, 2016, now Pat. No. 9,783,275, which is a
(Continued)

(51) Int. Cl.
*B63B 1/14* (2006.01)
*B63G 8/08* (2006.01)
(Continued)

(52) U.S. Cl.
CPC .............. *B63G 8/08* (2013.01); *B63B 1/107* (2013.01); *B63B 1/14* (2013.01); *B63B 1/32* (2013.01);
(Continued)

(58) Field of Classification Search
CPC ...................................................... B63B 1/14
See application file for complete search history.

(56) References Cited

U.S. PATENT DOCUMENTS

| 1,344,903 | A | * | 6/1920 | Koiransky | ............... B63B 1/14 |
| | | | | | 114/61.16 |
| 2,823,636 | A | | 2/1958 | Gongwer et al. | |

(Continued)

FOREIGN PATENT DOCUMENTS

| DE | 3614291 | 10/1987 |
| EP | 2 662 658 | 11/2013 |

(Continued)

OTHER PUBLICATIONS

Adams, Eric, "Supercavitating Torpedo", Jun. 1, 2004; www.popsci.com/scitech/article/2004-06/supercavitating-torpedo, Jun. 2004.
(Continued)

*Primary Examiner* — J. Woodrow Eldred
(74) *Attorney, Agent, or Firm* — Pandiscio & Pandiscio

(57) ABSTRACT

A marine vessel comprising:
at least one buoyant tubular foil; and
at least one baffle plate positioned about the perimeter of the at least one buoyant tubular foil so as to protrude into the flow of water passing by the perimeter of the at least one buoyant tubular foil, whereby to create a high-pressure zone fore of the at least one baffle plate and a low-pressure zone immediately aft of the at least one baffle plate, whereby to create a dense stream of supercavitated water immediately aft of the at least one baffle plate.

2 Claims, 69 Drawing Sheets

Related U.S. Application Data continuation of application No. 14/327,755, filed on Jul. 10, 2014, now Pat. No. 9,327,811, which is a continuation-in-part of application No. 14/231,887, filed on Apr. 1, 2014, now Pat. No. 9,592,894, which is a continuation of application No. 13/436,291, filed on Mar. 30, 2012, now Pat. No. 8,683,937, which is a continuation-in-part of application No. 12/485,848, filed on Jun. 16, 2009, now Pat. No. 8,408,155, said application No. 13/436,291 is a continuation-in-part of application No. 13/212,767, filed on Aug. 18, 2011, now Pat. No. 8,857,365, and a continuation-in-part of application No. PCT/US2011/052642, filed on Sep. 21, 2011.

(60) Provisional application No. 61/132,184, filed on Jun. 16, 2008, provisional application No. 61/200,284, filed on Nov. 26, 2008, provisional application No. 61/374,923, filed on Aug. 18, 2010, provisional application No. 61/374,940, filed on Aug. 18, 2010, provisional application No. 61/469,127, filed on Mar. 30, 2011, provisional application No. 61/469,143, filed on Mar. 30, 2011, provisional application No. 61/844,767, filed on Jul. 10, 2013, provisional application No. 61/876,829, filed on Sep. 12, 2013.

(51) Int. Cl.

| | | |
|---|---|---|
| *B63G 13/00* | (2006.01) | |
| *B63B 1/32* | (2006.01) | |
| *B63B 3/00* | (2006.01) | |
| *B63H 1/04* | (2006.01) | |
| *B63G 8/00* | (2006.01) | |
| *B63B 35/00* | (2020.01) | |
| *B63B 1/38* | (2006.01) | |
| *B63H 1/18* | (2006.01) | |
| *F42B 19/12* | (2006.01) | |
| *B63B 1/10* | (2006.01) | |
| *B63G 1/00* | (2006.01) | |

(52) U.S. Cl.
CPC ............... *B63B 1/38* (2013.01); *B63B 3/00* (2013.01); *B63B 35/00* (2013.01); *B63G 1/00* (2013.01); *B63G 8/00* (2013.01); *B63G 8/001* (2013.01); *B63G 13/00* (2013.01); *B63H 1/04* (2013.01); *B63H 1/18* (2013.01); *F42B 19/125* (2013.01); *B63B 2001/145* (2013.01); *B63B 2035/006* (2013.01); *B63G 2008/002* (2013.01); *Y02T 70/122* (2013.01)

(56) References Cited

U.S. PATENT DOCUMENTS

| | | | |
|---|---|---|---|
| 3,016,865 A | | 1/1962 | Eichenberger |
| 3,106,179 A | | 10/1963 | Traksel et al. |
| 3,163,980 A | | 1/1965 | Turner |
| 3,343,513 A | | 9/1967 | Bader |
| 3,411,301 A | | 11/1968 | Olsen |
| 3,430,595 A | | 3/1969 | Tulleners |
| 3,541,987 A | * | 11/1970 | Barkley ............. B63B 1/14 114/61.16 |
| 3,678,872 A | | 7/1972 | Migliaccio et al. |
| 3,683,622 A | | 8/1972 | Von Krusenstierna |
| 3,730,123 A | | 5/1973 | Lang |
| 3,779,199 A | | 12/1973 | Mayer, Jr. |
| 3,808,804 A | | 5/1974 | Scott-Scott |
| 3,830,178 A | | 8/1974 | Lang |
| 3,987,742 A | | 10/1976 | Boisrayon et al. |
| 4,074,652 A | | 2/1978 | Jackson |
| 4,186,679 A | | 2/1980 | Fabula et al. |
| 4,346,662 A | | 8/1982 | Rogers |
| 4,546,721 A | | 10/1985 | Langrock |
| 4,680,017 A | | 7/1987 | Eller |
| 4,681,508 A | | 7/1987 | Kim |
| 4,789,306 A | | 12/1988 | Vorus et al. |
| 4,819,576 A | | 4/1989 | Shaw |
| 4,831,297 A | | 5/1989 | Taylor et al. |
| 4,902,254 A | | 2/1990 | Chas |
| 4,962,718 A | | 10/1990 | Gornstein et al. |
| 4,981,099 A | | 1/1991 | Holder |
| 5,031,557 A | * | 7/1991 | Farrier ............. B63B 1/14 114/61.16 |
| 5,191,848 A | | 3/1993 | Hatfield |
| 5,237,947 A | | 8/1993 | Manning |
| 5,252,875 A | | 10/1993 | Veronesi et al. |
| 5,277,142 A | | 1/1994 | Connor |
| 5,279,247 A | | 1/1994 | Plangetis |
| 5,301,624 A | | 4/1994 | Hall et al. |
| 5,355,827 A | | 10/1994 | Barbazash et al. |
| 5,359,958 A | | 11/1994 | Guild |
| 5,383,801 A | | 1/1995 | Chas |
| 5,438,947 A | | 8/1995 | Tarn |
| 5,503,100 A | | 4/1996 | Shaw |
| 5,511,504 A | | 4/1996 | Martin |
| 5,551,369 A | | 9/1996 | Shen |
| 5,598,700 A | | 2/1997 | Varshay et al. |
| 5,601,047 A | | 2/1997 | Shen |
| 5,632,658 A | | 5/1997 | Chen et al. |
| 5,634,419 A | | 6/1997 | Cymara |
| 5,645,008 A | | 7/1997 | Loui |
| 5,794,558 A | | 8/1998 | Loui |
| 5,813,358 A | | 9/1998 | Roccotelli |
| 5,941,189 A | | 8/1999 | Johansson |
| 6,058,872 A | | 5/2000 | Latorre |
| 6,095,076 A | | 8/2000 | Nesbitt |
| 6,167,829 B1 | | 1/2001 | Lang |
| 6,394,019 B1 | * | 5/2002 | West ............. B63B 1/105 114/350 |
| 6,427,618 B1 | | 8/2002 | Hilleman |
| 6,470,817 B2 | | 10/2002 | Delfosse |
| 6,508,191 B1 | | 1/2003 | Spoljaric |
| 6,591,577 B2 | | 7/2003 | Miyazaki |
| 6,684,801 B1 | | 2/2004 | Kuklinski |
| 6,701,862 B2 | | 3/2004 | Hilleman |
| 6,725,797 B2 | | 4/2004 | Hilleman |
| 6,789,490 B2 | | 9/2004 | Schmidt |
| 6,881,109 B2 | | 4/2005 | Matsuda et al. |
| 6,905,093 B2 | | 6/2005 | Dryer et al. |
| 7,096,810 B1 | | 8/2006 | Adams |
| 7,144,223 B2 | | 12/2006 | Buzzi |
| 7,219,613 B2 | | 5/2007 | Root, Jr. |
| 7,225,748 B2 | | 6/2007 | Caspi et al. |
| 7,278,364 B2 | | 10/2007 | Root, Jr. |
| 7,314,014 B2 | | 1/2008 | Heyring et al. |
| 7,434,527 B2 | | 10/2008 | Brighi |
| 7,854,637 B2 | | 12/2010 | Schultz et al. |
| 8,408,155 B2 | | 4/2013 | Sancoff et al. |
| 8,683,937 B2 | | 4/2014 | Sancoff |
| 8,857,365 B2 | | 10/2014 | Sancoff |
| 9,403,579 B2 | | 8/2016 | Sancoff |
| 9,592,894 B2 | | 3/2017 | Sancoff |
| 2002/0152947 A1 | | 10/2002 | Hilleman |
| 2003/0154896 A1 | | 8/2003 | Schmidt |
| 2004/0000265 A1 | | 1/2004 | Carson |
| 2004/0200399 A1 | | 10/2004 | Abdel-Maksoud et al. |
| 2005/0261844 A1 | | 11/2005 | Iwers |
| 2006/0075948 A1 | | 4/2006 | Root, Jr. |
| 2006/0075949 A1 | | 4/2006 | Root, Jr. |
| 2008/0132130 A1 | | 6/2008 | Nigel |
| 2009/0007831 A1 | | 1/2009 | Jouffroy |
| 2010/0101471 A1 | | 4/2010 | Van Krieken |
| 2010/0236466 A1 | | 9/2010 | Costas |
| 2012/0097086 A1 | | 4/2012 | Sancoff |
| 2012/0192777 A1 | * | 8/2012 | Brizzolara ............. B63B 1/107 114/61.12 |
| 2012/0304909 A1 | | 12/2012 | del Campo y Ruiz de Almodovar |

(56) References Cited

U.S. PATENT DOCUMENTS

2012/0315811 A1 12/2012 Sancoff
2013/0098285 A1 4/2013 Takano et al.

FOREIGN PATENT DOCUMENTS

| JP | S38-12570 | 5/1960 |
| JP | 59-213592 | 12/1984 |
| JP | H8-198182 | 8/1996 |
| JP | 2006-224823 | 8/2006 |
| KR | 101 195 773 | 11/2012 |
| WO | WO 1998/008732 | 3/1998 |
| WO | WO 2012/042948 | 4/2012 |
| WO | WO 2012/135718 | 10/2012 |

OTHER PUBLICATIONS

Ceccio, Steven L., "Research; Current Research Summary", http://www-personal.umich.edu/~ceccio/research.html.
Savchenko, Yuriy N., Supercavitation—Problems and Perspectives, National Academy of Sciences, Institute of Hydromechanics, Kyiv, Ukraine, 2001.

* cited by examiner

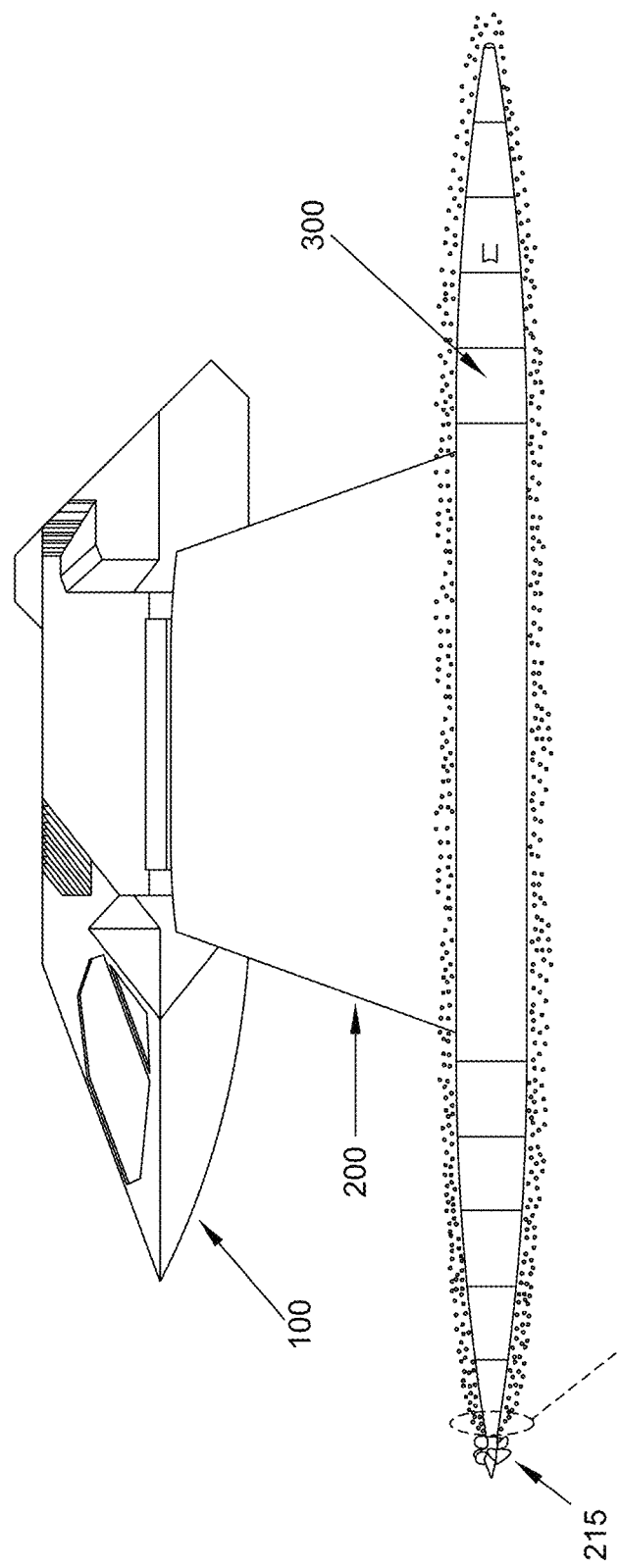
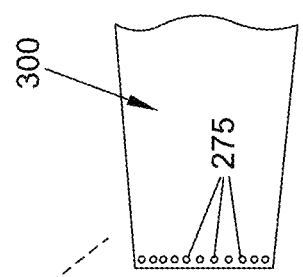

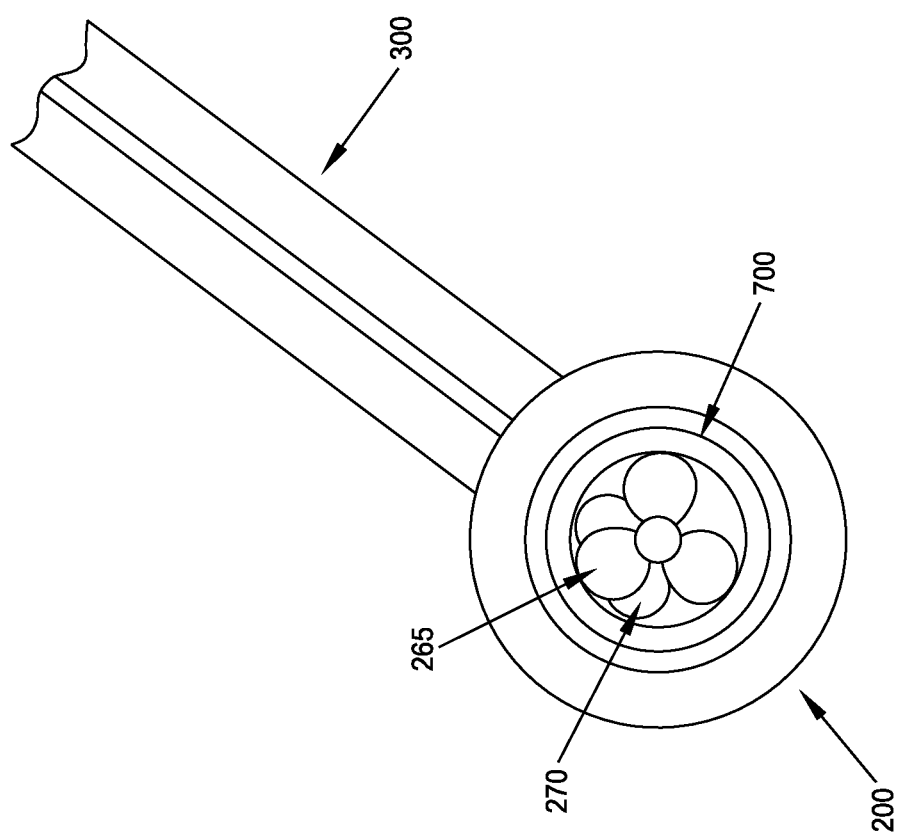

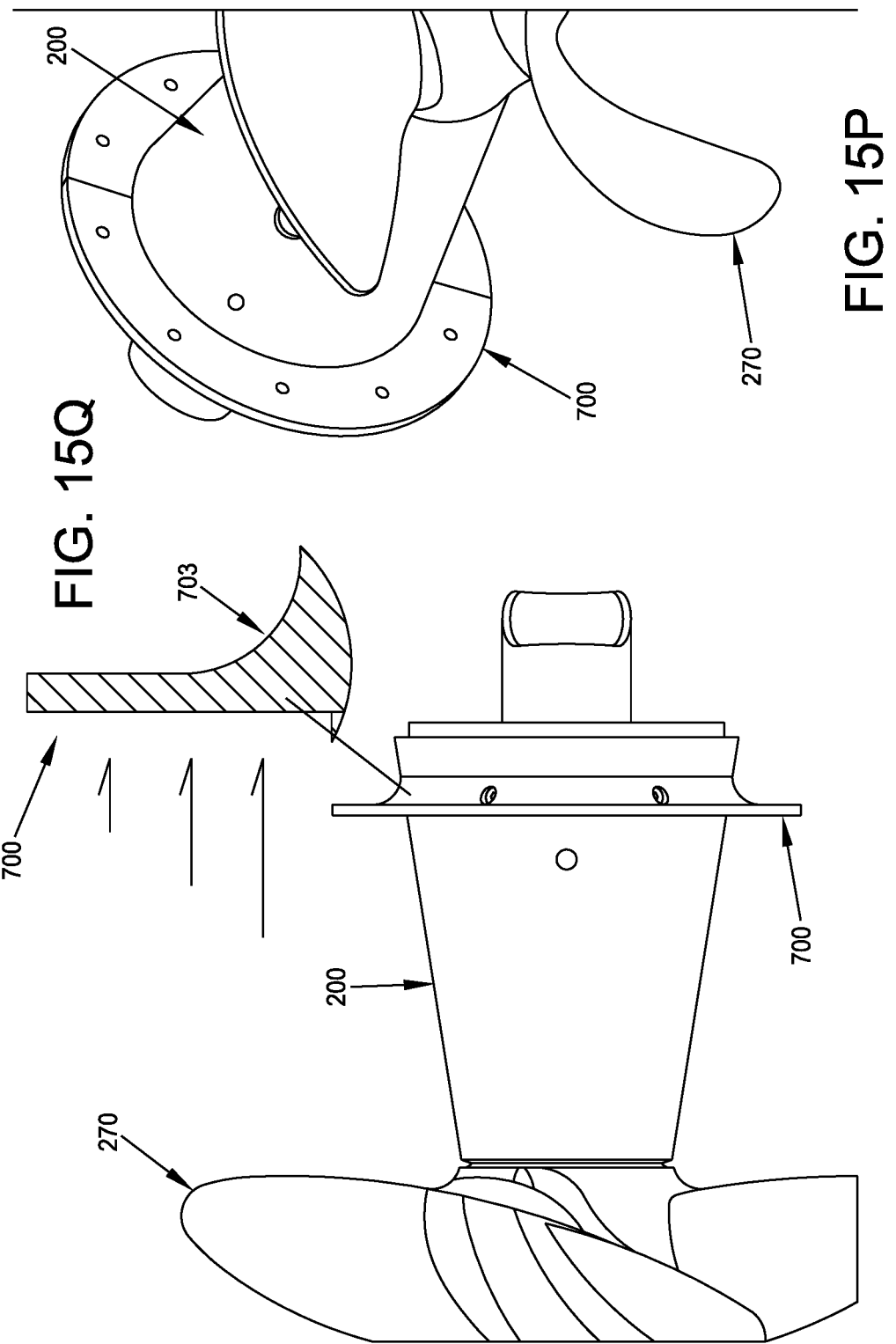

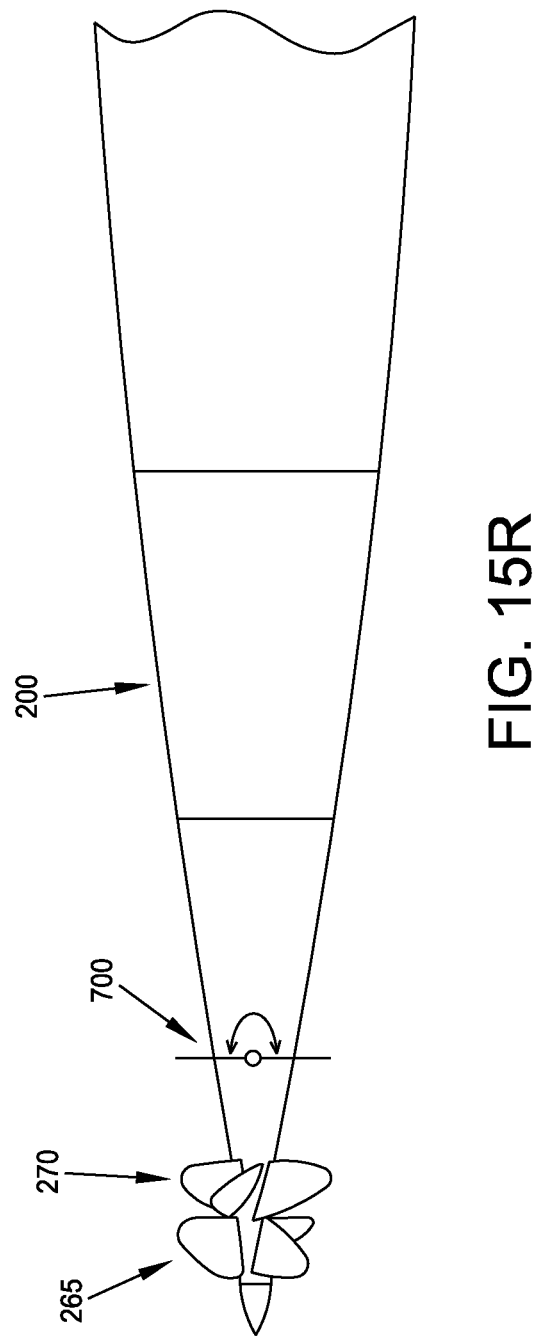

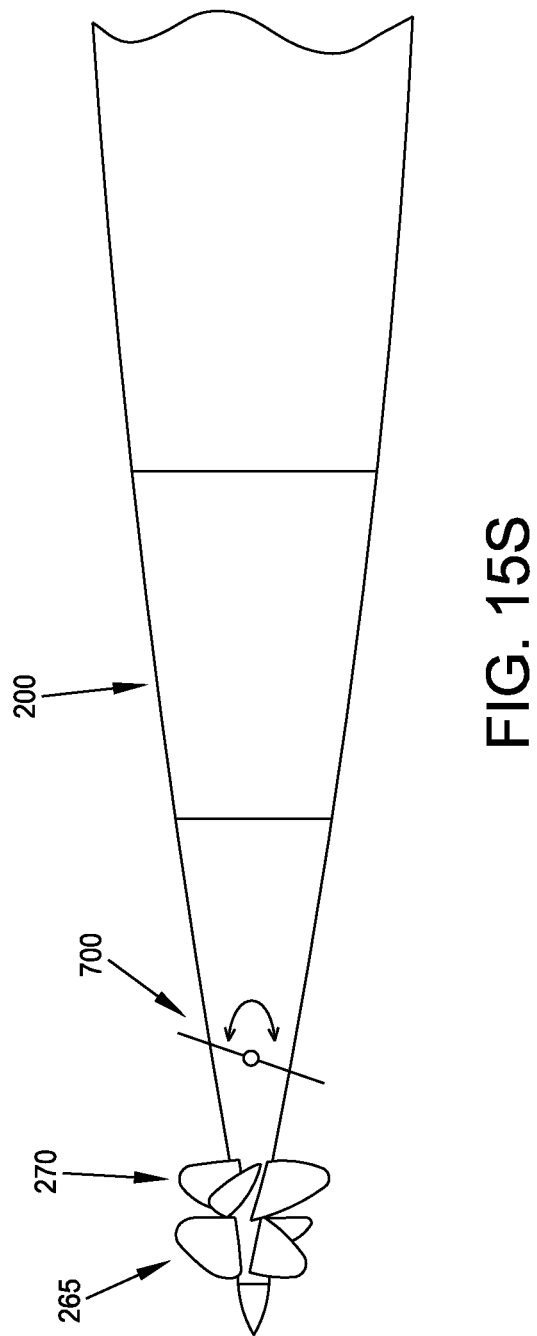

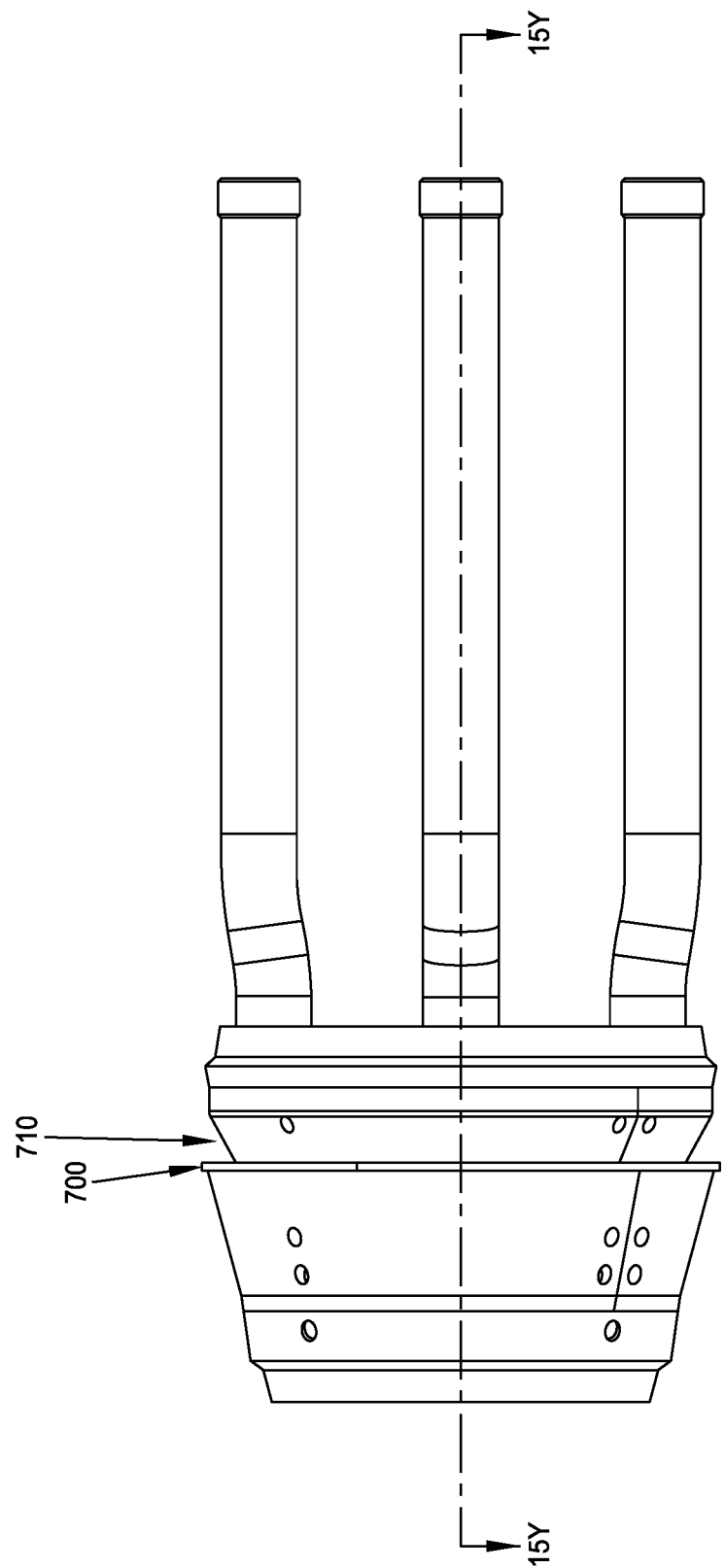

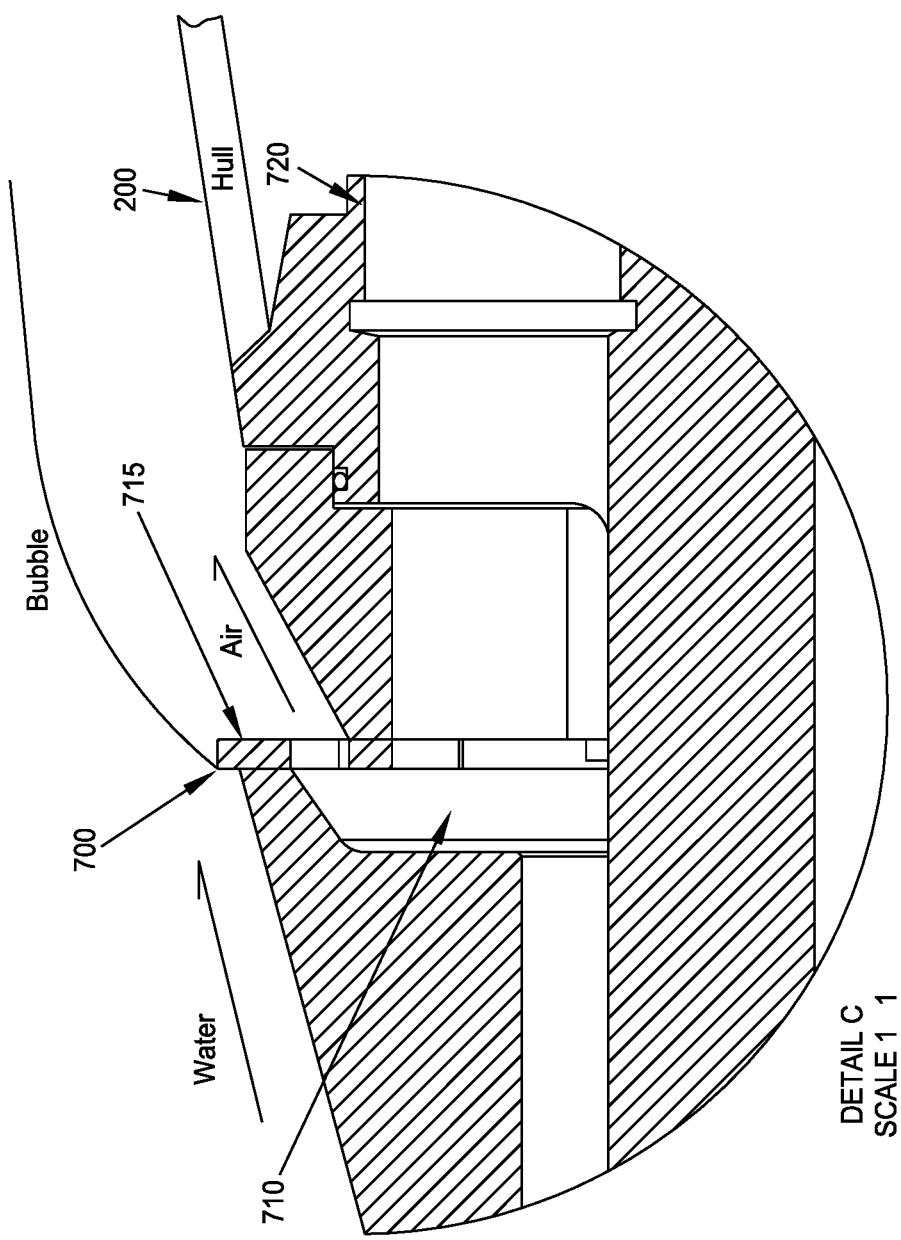

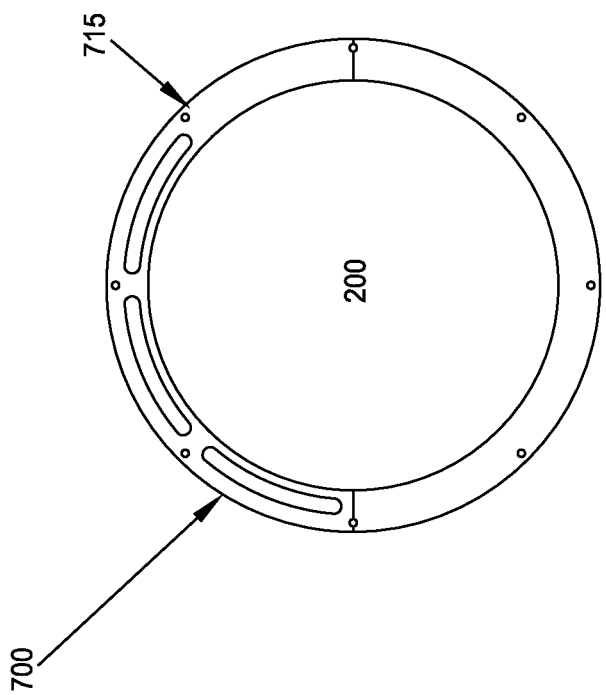
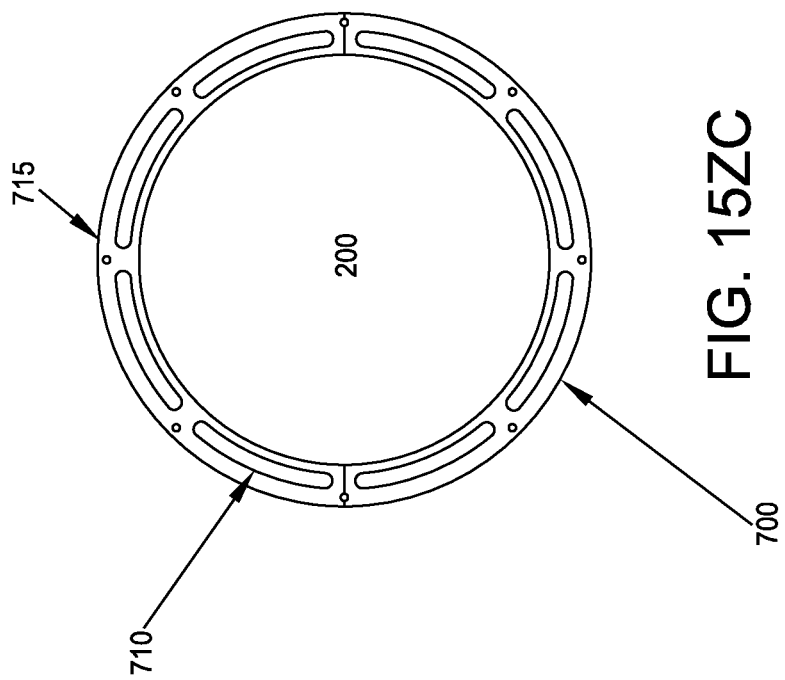
FIG. 15ZD
FIG. 15ZC

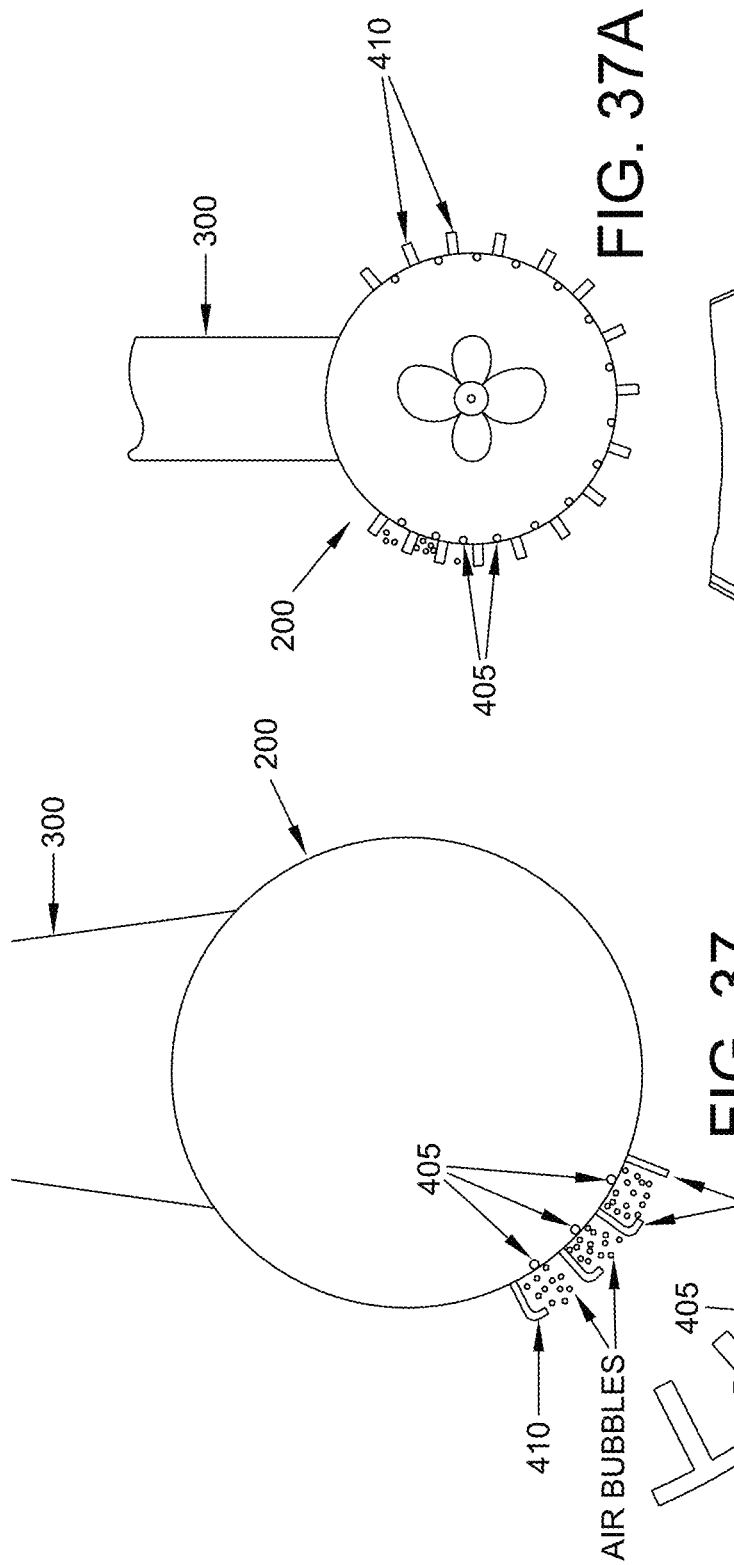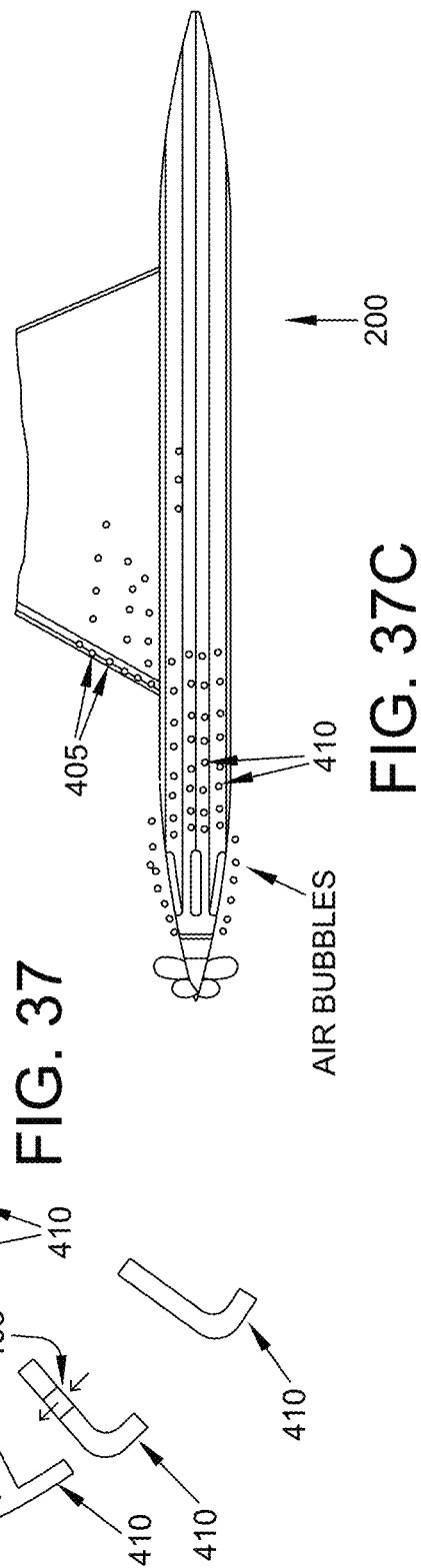

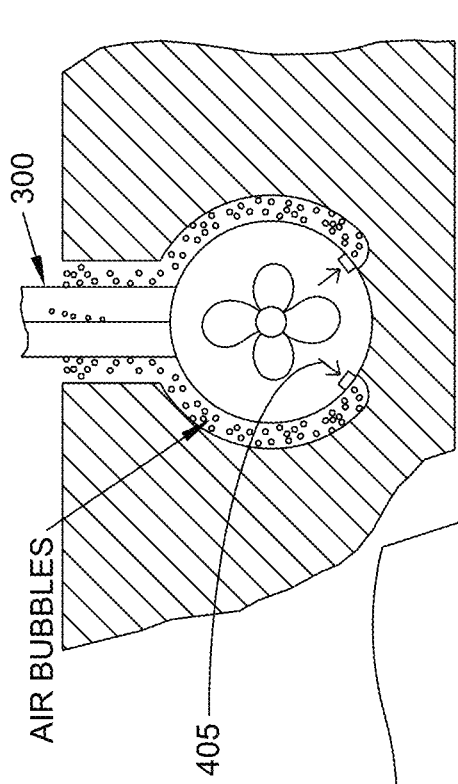
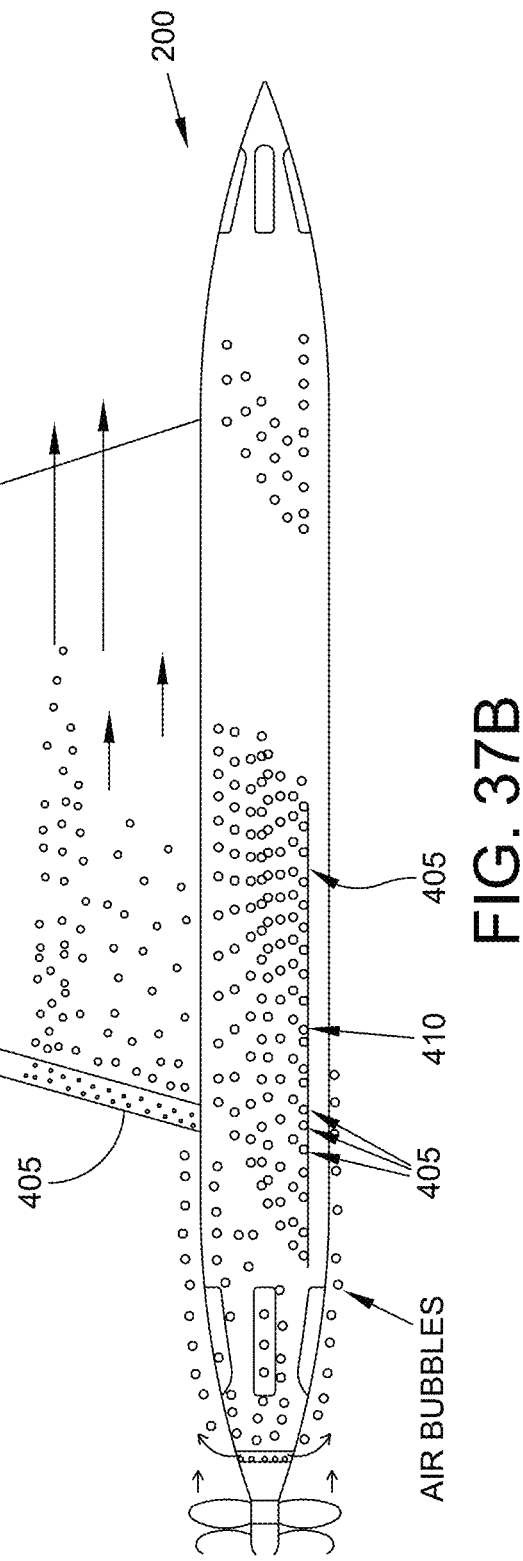

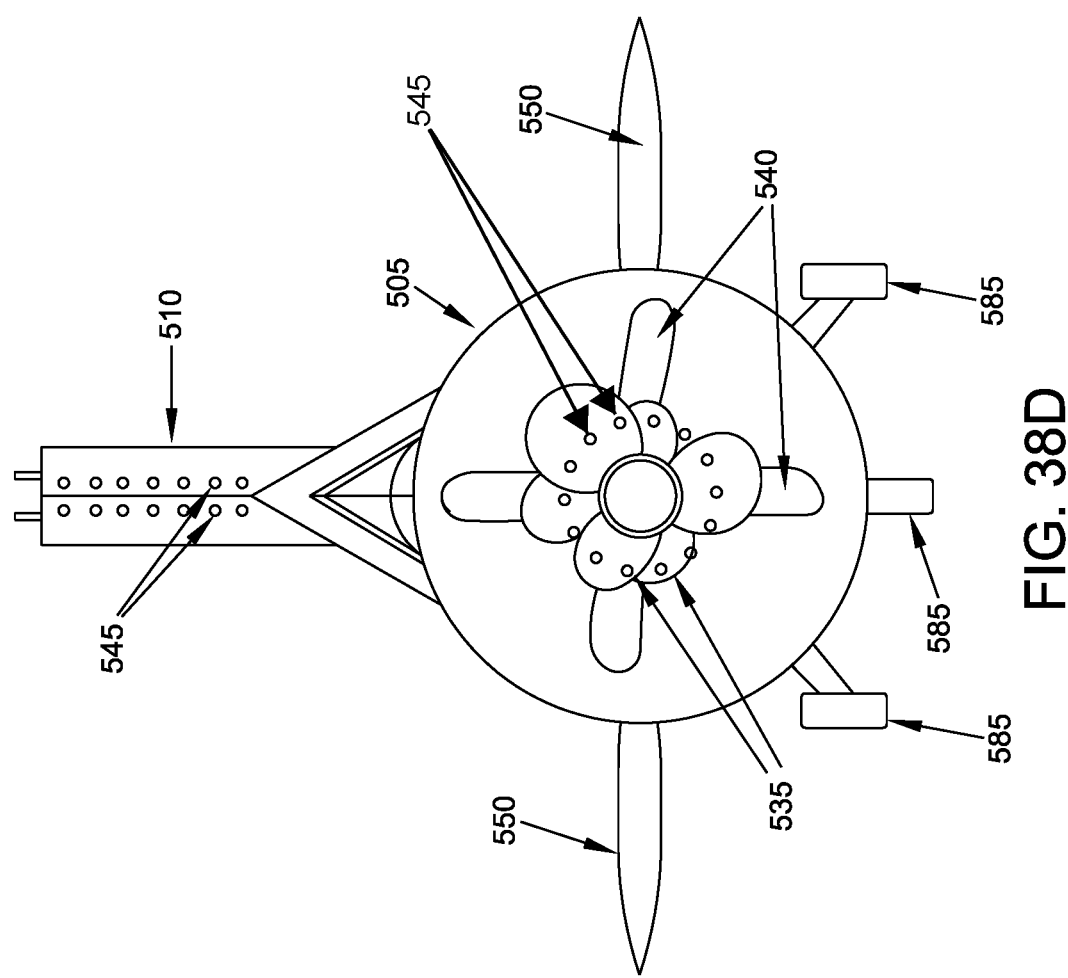

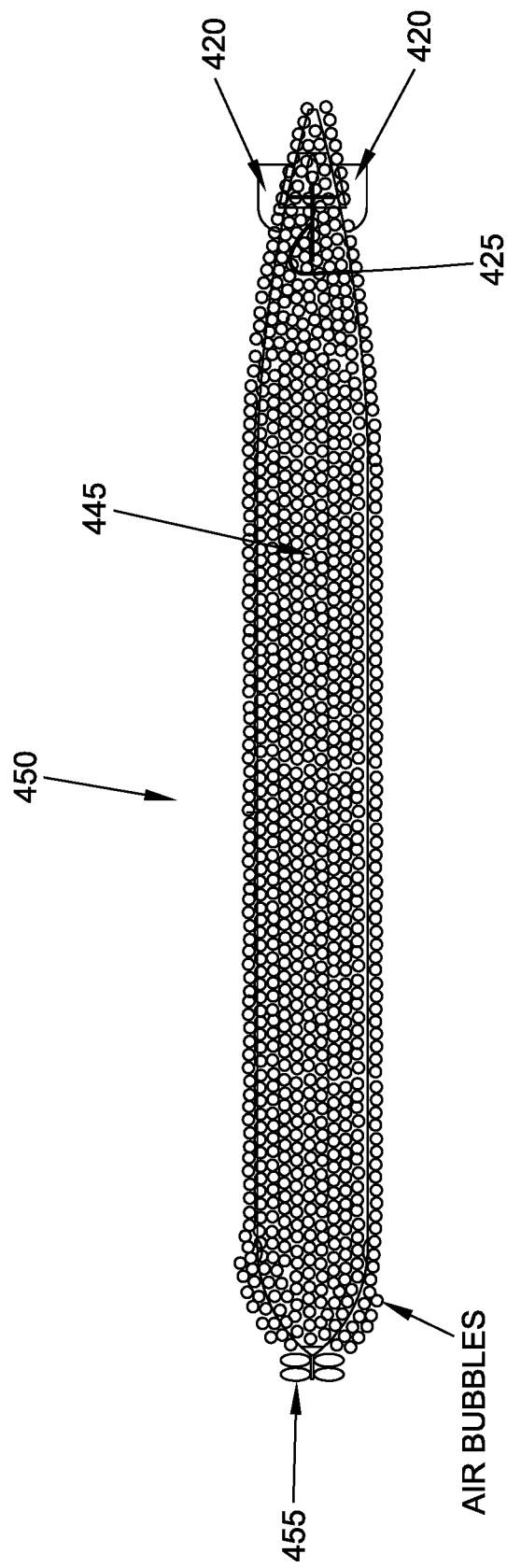

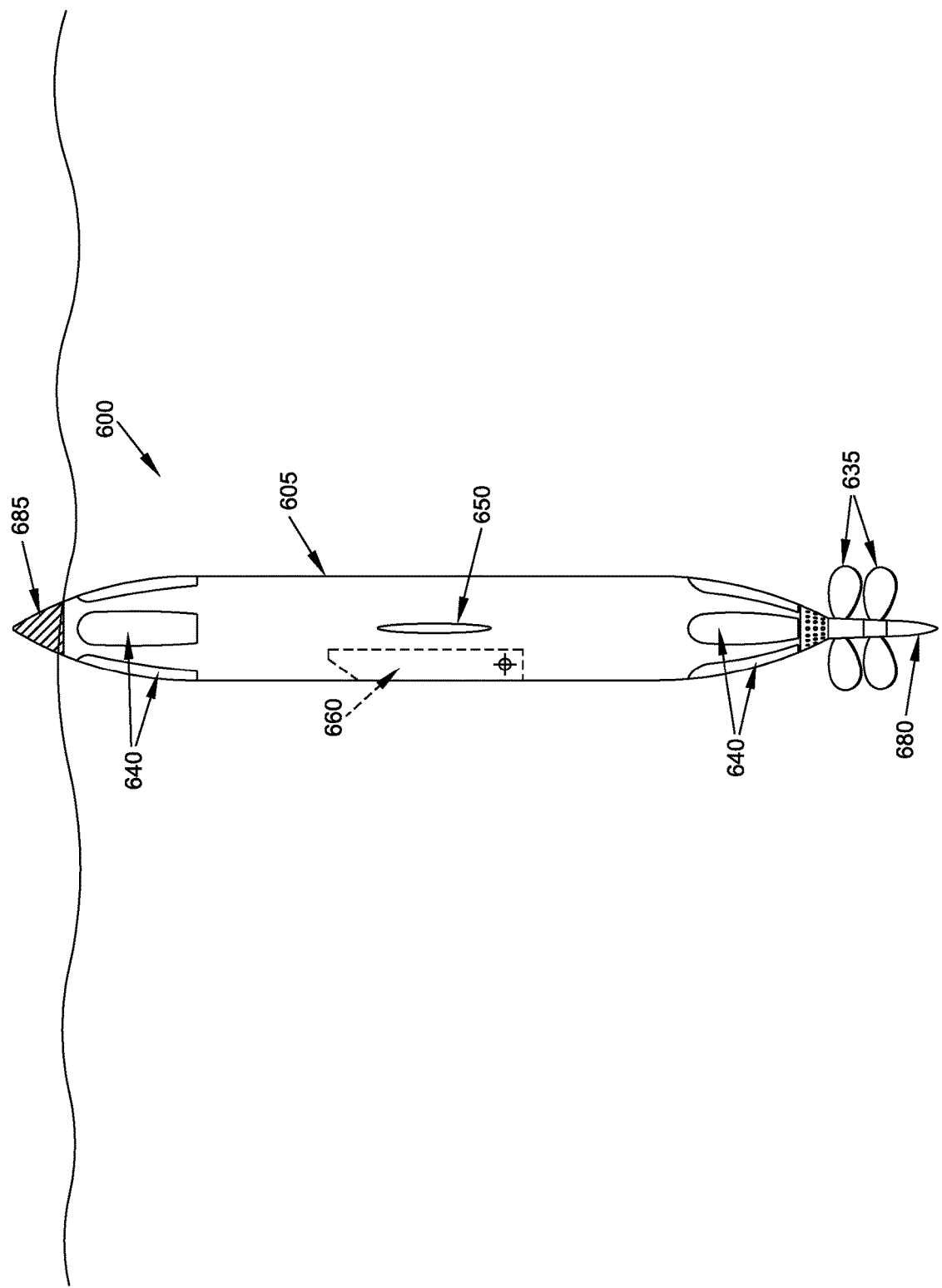

HIGH SPEED SURFACE CRAFT AND SUBMERSIBLE CRAFT

REFERENCE TO PENDING PRIOR PATENT APPLICATIONS

This patent application is a continuation of pending prior U.S. patent application Ser. No. 15/145,542, filed May 3, 2016 by Juliet Marine Systems, Inc. and Gregory E. Sancoff et al. for HIGH SPEED SURFACE CRAFT AND SUBMERSIBLE CRAFT, which patent application in turn is a continuation of prior U.S. patent application Ser. No. 14/327,755, filed Jul. 10, 2014 by Juliet Marine Systems, Inc. and Gregory E. Sancoff et al. for HIGH SPEED SURFACE CRAFT AND SUBMERSIBLE CRAFT, which patent application in turn:

(1) is a continuation-in-part of prior U.S. patent application Ser. No. 14/231,887, filed Apr. 1, 2014 by Juliet Marine Systems, Inc. and Gregory E. Sancoff for HIGH SPEED SURFACE CRAFT AND SUBMERSIBLE VEHICLE, which patent application is a continuation of prior U.S. patent application Ser. No. 13/436,291, filed Mar. 30, 2012 by Gregory E. Sancoff for HIGH SPEED SURFACE CRAFT AND SUBMERSIBLE VEHICLE, which patent application:

(i) is a continuation-in-part of prior U.S. patent application Ser. No. 12/485,848, filed Jun. 16, 2009 by Gregory E. Sancoff et al. for FLEET PROTECTION ATTACK CRAFT, which patent application in turn claims benefit of (a) prior U.S. Provisional Patent Application Ser. No. 61/132,184, filed Jun. 16, 2008 by Gregory Sancoff for FORCE PROTECTION ATTACK CRAFT, and (b) prior U.S. Provisional Patent Application Ser. No. 61/200,284, filed Nov. 26, 2008 by Gregory E. Sancoff et al. for FLEET PROTECTION ATTACK CRAFT (F-PAC);

(ii) is a continuation-in-part of prior U.S. patent application Ser. No. 13/212,767, filed Aug. 18, 2011 by Gregory E. Sancoff for FLEET PROTECTION ATTACK CRAFT AND UNDERWATER VEHICLES, which patent application in turn claims benefit of (a) prior U.S. Provisional Patent Application Ser. No. 61/374,923, filed Aug. 18, 2010 by Gregory E. Sancoff for SUPERCAVITATION AIR CHANNELS FOR BUOYANT TUBULAR FOIL, and (b) prior U.S. Provisional Patent Application Ser. No. 61/374,940, filed Aug. 18, 2010 by Gregory E. Sancoff for TORPEDO EMPLOYING FRONT-MOUNTED COUNTER-ROTATING PROPELLERS AND STEERING SPOILERS;

(iii) is a continuation-in-part of prior International (PCT) Patent Application No. PCT/US11/52642, filed Sep. 21, 2011 by Juliet Marine Systems, Inc. et al. for FLEET PROTECTION ATTACK CRAFT AND SUBMERSIBLE VEHICLE;

(iv) claims benefit of prior U.S. Provisional Patent Application Ser. No. 61/469,127, filed Mar. 30, 2011 by Gregory E. Sancoff for SEA-X1: SHALLOW SUBMERGED SUPER-CAVITATIONS SUBMARINE; and (v) claims benefit of prior U.S. Provisional Patent Application Ser. No. 61/469,143, filed Mar. 30, 2011 by Gregory E. Sancoff for SEA-SPRINT: UNMANNED, HIGH SPEED SUPER-CAVITATIONS SUBMERSIBLE CRAFT;

(2) claims benefit of prior U.S. Provisional Patent Application Ser. No. 61/844,767, filed Jul. 10, 2013 by Juliet Marine Systems, Inc. and Gregory E. Sancoff for BAFFLE PLATE TO ENHANCE SUPERCAVITATION EFFECT; and (3) claims benefit of prior U.S. Provisional Patent Application Ser. No. 61/876,829, filed Sep. 12, 2013 by Juliet Marine Systems, Inc. and Gregory E. Sancoff for BAFFLE PLATE TO ENHANCE SUPERCAVITATION EFFECT.

The fifteen (15) above-identified patent applications are hereby incorporated herein by reference.

FIELD OF THE INVENTION

This invention relates to marine vessels in general, and more particularly to high-speed attack and reconnaissance craft.

BACKGROUND OF THE INVENTION

The terrorist attack on the guided missile destroyer USS Cole in Aden harbor in 2000 provided a devastating example of what a small group of terrorists can do to a modern warship with minimal resources—in the case of the USS Cole, two terrorists in a small boat carrying a few hundred pounds of explosives came close to sinking a billion dollar warship.

The success of the attack on the Cole has given rise to another, even more disturbing concern—that a large number of high speed boats, each packed with explosives and manned by suicide bombers, could create a "small boat swarm" which could overwhelm the defenses of a warship, particularly in restricted waters where reaction time and maneuverability may be limited. Indeed, recent wargame simulations suggest that such swarm tactics could prove extremely effective against naval battle groups operating in the narrow waters of the Persian Gulf.

It is currently believed that such "small boat swarm" tactics are best countered with fast, similarly-sized, highly-maneuverable and heavily-armed attack craft which can establish a defensive perimeter at a safe distance from the naval battle group. To this end, appropriately-outfitted Zodiac-type craft have already been deployed for this purpose. However, experience has shown that Zodiac-type craft are only practical in the relatively calm waters of a harbor. This is because operating Zodiac-type craft at high speed in the turbulent waters of the open sea imposes excessive physical stresses on the crews that can only be withstood for short periods of time. Furthermore, the defensive perimeter should, ideally, be established at a substantial distance from the battle group (e.g., at least 10 miles out), in order to give the battle group sufficient time to react in the event that any of the small boat swarm should penetrate the defensive perimeter established by the Zodiac-type craft. However, due to their light construction, limited operating time at high speeds, and limited fuel-carrying capacity, Zodiac-type craft are not capable of maintaining a reliable defensive perimeter so far out from the battle group. In practice, with Zodiac-type craft, the defensive perimeter must generally be maintained much closer to the battle group, with the consequent loss of reaction time.

It has been suggested that attack helicopters might be used to protect a naval battle group when it is at sea or at anchor. However, attack helicopters generally have relatively limited range and, perhaps more importantly, relatively limited sortie time, which effectively prevents them from maintaining a reliable defensive perimeter a substantial distance out from the battle group. Furthermore, attack helicopters generally have substantial radar, infrared and visual "signatures", thereby making them relatively easy to detect and target.

Thus, there is a need for a new and improved fleet protection attack craft which can be used to maintain a defensive perimeter a safe distance out from a naval battle group. In this respect it should be appreciated that such a craft should be small, fast, highly-maneuverable and heavily-armed. Furthermore, the craft should provide a stable platform even when running at high speed in substantial ocean swells, whereby to minimize physical stress on the crew and to provide a stable weapons platform. Further, the craft should be capable of remaining on station for a substantial period of time, in order to maintain a reliable defensive perimeter at a safe distance from the battle group.

There is also a need for a new and improved craft which can be used for reconnaissance, and/or to deliver small teams of special forces behind enemy lines and/or to extract the same. Thus, the craft should also be capable of "stealth mode" operation, i.e., it should have small radar, infrared, visual and noise signatures, thereby making it difficult to detect and target.

In addition to the foregoing, there is also a need for a new and improved submersible vehicle (e.g., submarine, torpedo, unmanned drone, etc.) which is capable of moving through the water at high speeds.

SUMMARY OF THE INVENTION

These and other objects of the present invention are addressed by, among other things, the provision and use of a novel fleet protection attack craft. The novel attack craft is small, fast, highly-maneuverable and heavily-armed. The novel attack craft provides a stable platform even when running at high speed in substantial ocean swells, whereby to minimize physical stress on the crew and to provide a stable weapons platform. And the novel attack craft is capable of remaining on station for a substantial period of time, in order to maintain a reliable defensive perimeter at a safe distance from a naval battle group. Thus, the novel attack craft provides an effective means for defending against a "small boat swarm", by establishing a defensive perimeter at a safe distance from the battle group and thereby permitting the interception, identification, warning and, if ultimately necessary, destruction of hostile boats long before they can approach the battle group.

In addition, the novel attack craft is also capable of "stealth mode" operation, i.e., it has small radar, infrared, visual and noise signatures, thereby making it difficult to detect and target. Thus, the novel attack craft also provides an effective means for conducting reconnaissance and/or for delivering small teams of special forces behind enemy lines and/or for extracting the same.

In addition to the foregoing, the objects of the present invention are addressed by the provision and use of a novel submersible vehicle (e.g., submarine, torpedo, unmanned drone, etc.) which is capable of moving through the water at high speeds.

In one form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel;
wherein the first and second struts are pivotally connected to the command module and fixedly connected to the first and second buoyant tubular foils, respectively; and
wherein the first and second struts comprise substantially rigid planar structures.

In another form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second engines enclosed within the first and second buoyant tubular foils, respectively, and first and second propulsion units connected to the first and second engines, respectively, for moving the marine vessel through the water.

In another form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises first and second propeller mechanisms mounted on the leading ends of the first and second buoyant tubular foils, respectively, for moving the marine vessel through the water.

In another form of the present invention, there is provided a marine vessel comprising:
a command module;
first and second buoyant tubular foils; and
first and second struts for connecting the first and second buoyant tubular foils to the command module, respectively;
wherein the first and second buoyant tubular foils provide substantially all of the buoyancy required for the marine vessel; and
wherein the marine vessel further comprises a plurality of spoilers mounted on the first and second buoyant tubular foils for steering the marine vessel as it moves through the water.

In another form of the present invention, there is provided a marine vessel comprising:
a buoyant tubular foil; and
a propeller mechanism mounted on the leading end of the buoyant tubular foil for moving the marine vessel through the water.

In another form of the present invention, there is provided a marine vessel comprising:
a buoyant tubular foil; and
a plurality of spoilers mounted on the buoyant tubular foil for steering the marine vessel as it moves through the water.

In another form of the present invention, there is provided a marine vessel comprising:
a buoyant tubular foil;
a propeller mechanism mounted on the leading end of the buoyant tubular foil for moving the marine vessel through the water; and
a plurality of spoilers mounted on the buoyant tubular foil for steering the marine vessel through the water;
wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted.

In another form of the present invention, there is provided a method for moving through water, the method comprising:
  providing a marine vessel comprising:
    a command module;
    first and second buoyant tubular foils; and
    first and second struts for connecting the first and second buoyant tubular foils to the command module, respectively;
    wherein the first and second buoyant tubular foils provide substantially all of the buoyancy required for the marine vessel;
    wherein the first and second struts are pivotally connected to the command module and fixedly connected to the first and second buoyant tubular foils, respectively; and
    wherein the first and second struts comprise substantially rigid planar structures; and
  moving the marine vessel through water and adjusting the position of the first and second struts relative to the command module.

In another form of the present invention, there is provided a method for moving through water, the method comprising:
  providing a marine vessel comprising:
    a command module;
    first and second buoyant tubular foils; and
    first and second struts for connecting the first and second buoyant tubular foils to the command module, respectively;
    wherein the first and second buoyant tubular foils provide substantially all of the buoyancy required for the marine vessel; and
    wherein the marine vessel further comprises first and second engines enclosed within the first and second buoyant tubular foils, respectively, and first and second propulsion units connected to the first and second engines, respectively, for moving the marine vessel through the water; and
  moving the marine vessel through water.

In another form of the present invention, there is provided a method for moving through water, the method comprising:
  providing a marine vessel comprising:
    a command module;
    first and second buoyant tubular foils; and
    first and second struts for connecting the first and second buoyant tubular foils to the command module, respectively;
    wherein the first and second buoyant tubular foils provide substantially all of the buoyancy required for the marine vessel; and
    wherein the marine vessel further comprises first and second propeller mechanisms mounted on the leading ends of the first and second buoyant tubular foils, respectively, for moving the marine vessel through the water; and
  moving the marine vessel through water.

In another form of the present invention, there is provided a method for moving through water, the method comprising:
  providing a marine vessel comprising:
    a command module;
    first and second buoyant tubular foils; and
    first and second struts for connecting the first and second buoyant tubular foils to the command module, respectively;
    wherein the first and second buoyant tubular foils provide substantially all of the buoyancy required for the marine vessel; and
    wherein the marine vessel further comprises a plurality of spoilers mounted on the first and second buoyant tubular foils for steering the marine vessel as it moves through the water; and
  moving the marine vessel through water and adjusting the position of the spoilers.

In another form of the present invention, there is provided a method for moving through water, the method comprising:
  providing a marine vessel comprising:
    a buoyant tubular foil; and
    a propeller mechanism mounted on the leading end of the buoyant tubular foil for moving the marine vessel through the water; and
  moving the marine vessel through water.

In another form of the present invention, there is provided a method for moving through water, the method comprising:
  providing a marine vessel comprising:
    a buoyant tubular foil; and
    a plurality of spoilers mounted on the buoyant tubular foil for steering the marine vessel as it moves through the water; and
  moving the marine vessel through water and adjusting the position of the spoilers.

In another form of the present invention, there is provided a method for moving through water, the method comprising:
  providing a marine vessel comprising:
    a buoyant tubular foil;
    a propeller mechanism mounted on the leading end of the buoyant tubular foil for moving the marine vessel through the water; and
    a plurality of spoilers mounted on the buoyant tubular foil for steering the marine vessel through the water;
    wherein each of the spoilers comprises a plate movable between (i) an inboard position wherein the plate is substantially aligned with the skin of the buoyant tubular foil to which the spoiler is mounted, and (ii) an outboard position wherein the plate projects into, and deflects, the water flowing by the buoyant tubular foil to which the spoiler is mounted; and
  moving the marine vessel through water and adjusting the position of the spoilers.

In another form of the present invention, there is provided a marine vessel comprising:
  an elongated closed underwater vehicle;
  first and second propellers mounted on a forward end of said vehicle and adapted in operation to move said vehicle through water;
  said first and second propellers comprising leading and trailing propellers;
  wherein said leading and trailing propellers are adapted to rotate in opposite directions to each other simultaneously;
  whereby to provide propeller generated super-cavitated water flowing from the propellers and thence along an outer surface of said vehicle;
  whereby to diminish friction on the outer surface of said vehicle and facilitate high underwater speeds.

In another form of the present invention, there is provided a marine vessel comprising:
  an elongated closed underwater vehicle;
  propeller means mounted on a forward end of said vehicle;

said propeller means being operable to move said vehicle through water and to produce super-cavitated water for flow aft of said propeller means and adjacent an outer wall of said vehicle;

whereby to effect a water pressure on the vehicle outer wall less than water pressure forwardly of said propeller means.

In another form of the present invention, there is provided a marine vessel comprising:

a command module;

first and second buoyant tubular foils;

first and second struts connecting said first and second foils to said command module;

wherein said first and second foils provide all buoyancy required for the vessel;

wherein said struts are each pivotally connected to said command module and to one of said foils;

said first and second struts comprising generally rigid planar structures; and first and second propellers mounted on forward ends of said foils for moving the vessel through water;

wherein said first and second propellers comprise leading and trailing propellers; and wherein said leading and trailing propellers rotate in opposite directions to create air skirts around the foils and extending along lengths of the foils to decrease foil surface friction.

In another form of the present invention, there is provided a marine vessel comprising:

an elongated closed underwater vehicle;

a propeller mounted on a forward end of said vehicle and adapted in operation to move said vehicle through water;

said propeller being of a size and configuration to provide propeller generated super-cavitated water flowing from said propeller and thence along an outer surface of said vehicle;

whereby to diminish friction on the outer surface of said vehicle and facilitate high underwater speeds.

In another form of the present invention, there is provided a method for moving through water, the method comprising:

providing a marine vessel comprising:

a command module;

first and second buoyant tubular foils; and first and second struts for connecting the first and second buoyant tubular foils to the command module, respectively;

wherein the first and second buoyant tubular foils provide substantially all buoyancy required for the marine vessel; and wherein the marine vessel further comprises first and second propeller mechanisms mounted on the forward ends of the first and second buoyant tubular foils, respectively, for moving the marine vessel through water; and moving the marine vessel through water.

In another form of the present invention, there is provided a method for moving through water, the method comprising:

providing a marine vessel comprising:

a buoyant tubular foil; and a propeller mechanism mounted on the forward end of the buoyant tubular foil for moving the marine vessel through the water; and moving the marine vessel through water.

In another form of the present invention, there is provided a method for moving through water, the method comprising:

providing a marine vessel comprising:

a buoyant tubular foil;

a propeller mechanism mounted on the forward end of the buoyant tubular foil for moving the marine vessel through water; and a plurality of spoilers mounted on the buoyant tubular foil for steering the marine vessel through water;

wherein each of the spoilers comprises a plate movable between (i) an inboard position wherein the plate is substantially aligned with a skin of the buoyant tubular foil to which the spoiler is mounted, and (ii) an outboard position wherein the plate projects into, and deflects, water flowing by the buoyant tubular foil to which the spoiler is mounted; and moving the marine vessel through water and adjusting the positions of the spoilers.

In another form of the present invention, there is provided an elongated tubular foil for travel through water, the foil being provided with a propulsion means;

said propulsion means comprising in part a propeller means rotatably mounted on a forward end of the foil and adapted to move the foil through the water;

said propeller means being adapted to effect supercavitation of water while operative to move the foil through the water;

to thereby create a skirt of supercavitated water adjacent at least a portion of an outer skin of the foil;

such that the foil moves through the skirt of supercavitated water.

In another form of the present invention, there is provided a method for propelling a body through water, the method comprising the steps of:

providing the body in an elongated tubular configuration having a propulsion means rotatably mounted on a forward end of the body and adapted to move the body through the water;

activating the propulsion means so as to effect the movement of the body through the water and so as to create a skirt of supercavitated water adjacent at least a portion of an outer skin of the body;

such that the body moves through the supercavitated water adjacent thereto.

In another form of the present invention, there is provided an elongated tubular body for travel through water, the elongated tubular body being provided with a propulsion means;

said propulsion means comprising in part a propeller means rotatably mounted on a forward end of the elongated tubular body and adapted to move the elongated tubular body through the water;

said propeller means being adapted to effect supercavitation of water while operative to move the elongated tubular body through the water to thereby create a skirt of supercavitated water adjacent at least a portion of an outer skin of the elongated tubular body;

such that the elongated tubular body moves through the skirt of supercavitated water with substantially reduced hull friction.

In another form of the present invention, there is provided a method for propelling a body through water, the method comprising the steps of:

providing the body in an elongated tubular configuration having a propulsion means rotatably mounted on a forward end of the body and adapted to move the body through the water;

activating the propulsion means so as to effect the movement of the body through the water and so as to create a skirt of supercavitated water adjacent at least a portion of an outer skin of the body;

such that the body moves through the supercavitated water adjacent thereto with substantially reduced hull friction.

In another form of the present invention, there is provided a submersible vessel comprising:

an elongated hull;

at least one propeller mounted on a forward end of said hull and adapted to move said hull through water;

said at least one propeller being of a size and configuration such that when it is rotated at an appropriate speed, it generates supercavitated water flowing from said at least one propeller and thence along an outer surface of said hull so as to diminish friction on the outer surface of said hull and facilitate high underwater speeds.

In another form of the present invention, there is provided a method for moving through water, the method comprising:

providing a submersible vessel comprising:

an elongated hull;

at least one propeller mounted on a forward end of said hull and adapted to move said hull through water;

said at least one propeller being of a size and configuration such that when it is rotated at an appropriate speed, it generates supercavitated water flowing from said at least one propeller and thence along an outer surface of said hull so as to diminish friction on the outer surface of said hull and facilitate high underwater speeds;

submerging at least a portion of the elongated hull; and rotating the at least one propeller so as to move the submersible vessel through water.

In another form of the present invention, there is provided a marine vessel comprising:

at least one buoyant tubular foil; and at least one baffle plate positioned about the perimeter of the at least one buoyant tubular foil so as to protrude into the flow of water passing by the perimeter of the at least one buoyant tubular foil, whereby to create a high-pressure zone fore of the at least one baffle plate and a low-pressure zone immediately aft of the at least one baffle plate, whereby to create a dense stream of supercavitated water immediately aft of the at least one baffle plate.

In another form of the present invention, there is provided a method for moving through water, the method comprising:

providing a marine vessel comprising:

at least one buoyant tubular foil; and at least one baffle plate positioned about the perimeter of the at least one buoyant tubular foil so as to protrude into the flow of water passing by the perimeter of the at least one buoyant tubular foil, whereby to create a high-pressure zone fore of the at least one baffle plate and a low-pressure zone immediately aft of the at least one baffle plate, whereby to create a dense stream of supercavitated water immediately aft of the at least one baffle plate; and moving the marine vessel through water, such that the passage of water past the at least one baffle plate creates a high-pressure zone fore of the at least one baffle plate and a low-pressure zone immediately aft of the at least one baffle plate, whereby to create a dense stream of supercavitated water immediately aft of the at least one baffle plate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 15ZE is a schematic view showing steam generated by hot engine exhaust being ejected from openings in the BTF so as to create an encompassing gaseous envelope about the perimeter of the BTF;

FIG. 37 is a cross-sectional view of a buoyant tubular foil (BTF) having air trap fins disposed on some or all of its periphery, and further shows preferred configurations for the air trap fins—in addition, this view shows a plurality of air outlet holes formed in the hull of the buoyant tubular foil;

FIG. 37A is a view similar to that of FIG. 37, but showing a substantially complete array of air trap fins mounted on the outer hull of the buoyant tubular foil (BTF);

FIGS. 37B and 37C are side elevational views of a buoyant tubular foil (BTF) and a strut supporting the buoyant tubular foil, wherein the buoyant tubular foil comprises air trap fins on its periphery, and further wherein the buoyant tubular foil and the supporting strut have a plurality of air outlet holes formed therein;

FIG. 37D is a cross-sectional view of a buoyant tubular foil (BTF) having air outlet holes formed therein;

FIGS. 38A, 38B, 38C and 38D are schematic views of a novel submarine formed in accordance with the present invention;

FIG. 39 is a schematic view of a torpedo comprising a buoyant tubular foil (i.e., a tubular hull) equipped with a front pulling propeller mechanism for generating a supercavitated air curtain (e.g., an envelope or skirt of gaseous bubbles) encompassing the hull of torpedo;

FIG. 41 is a schematic view showing one manner of using the novel unmanned submersible craft shown in FIG. 40.

DETAILED DESCRIPTION OF THE INVENTION

Overview

Looking first at FIGS. 1-6, there is shown a novel fleet protection attack craft 5. Attack craft 5 generally comprises a command module 100 for carrying a crew, weapons and payload (including passengers), a pair of buoyant tubular foils (BTFs) 200 for providing buoyancy, propulsion and steering, and a pair of struts 300 for supporting command module 100 on BTFs 200.

Figure 1:
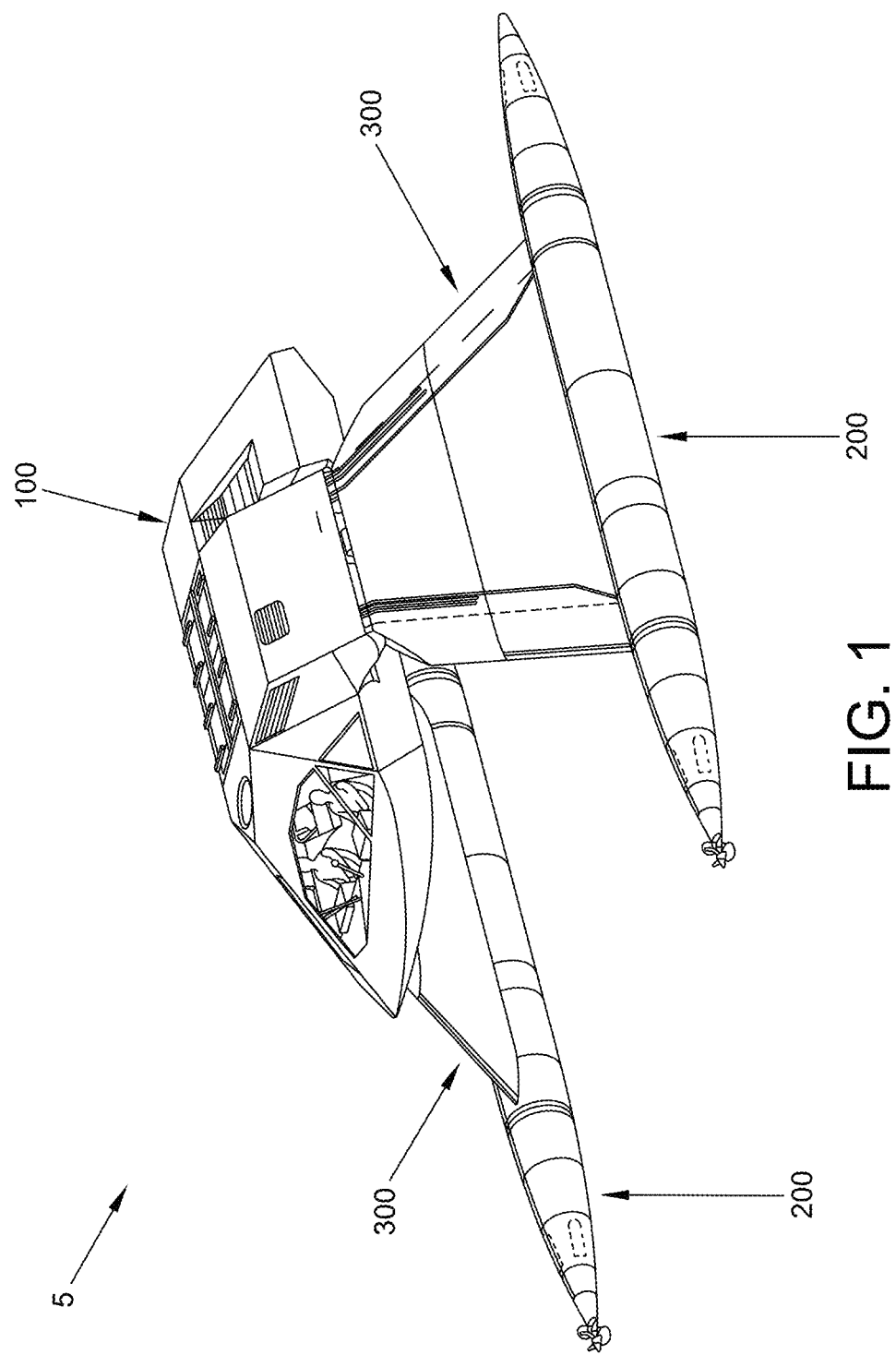
FIG. 1 is a schematic view showing a novel fleet protection attack craft formed in accordance with the present invention.
Figure 2:
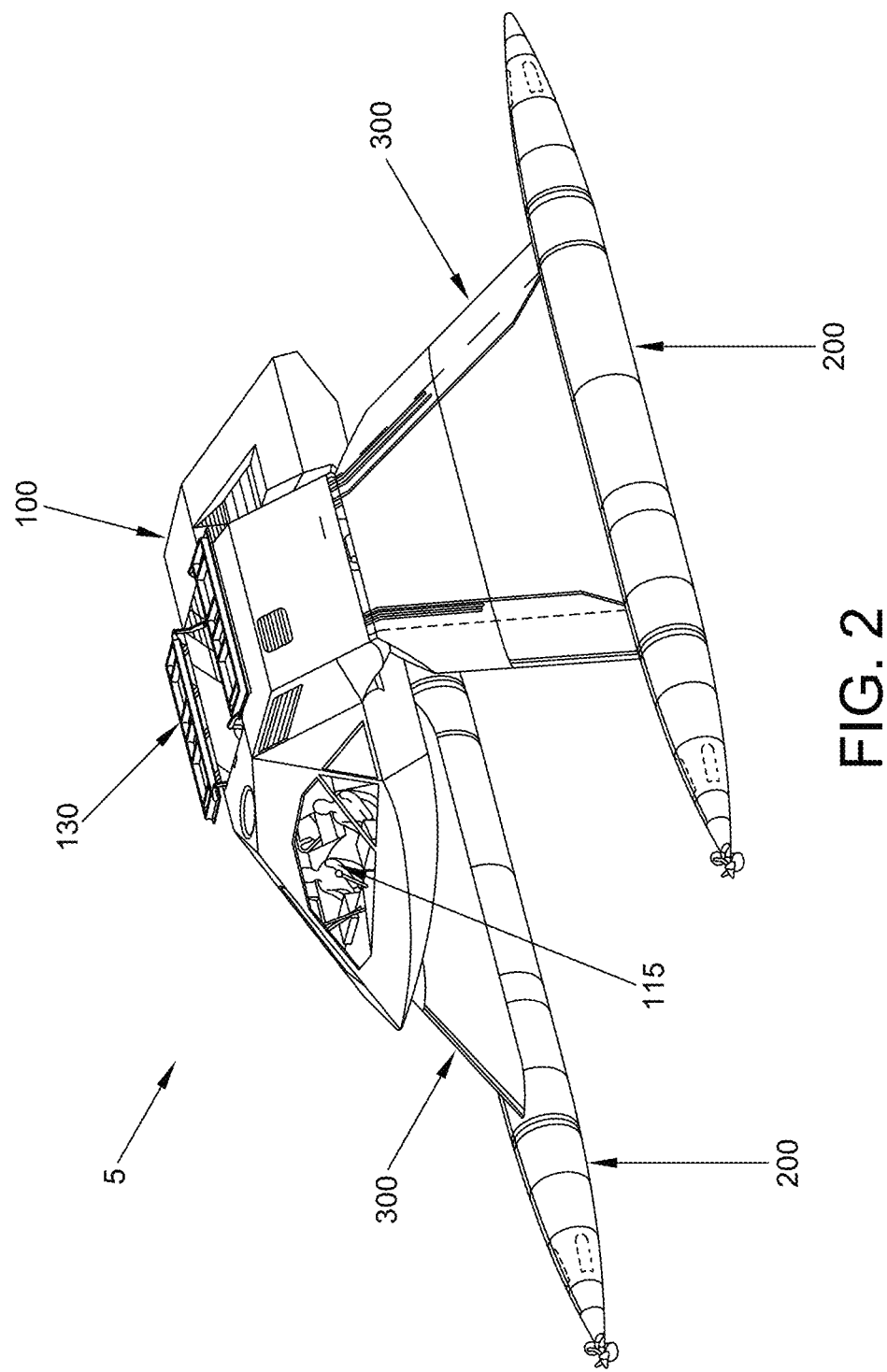
FIGS. 2-9 are schematic views showing further construction details of the novel attack craft shown in FIG. 1, including further details of its command module, buoyant tubular foils (BTFs) and struts.
Figure 3:
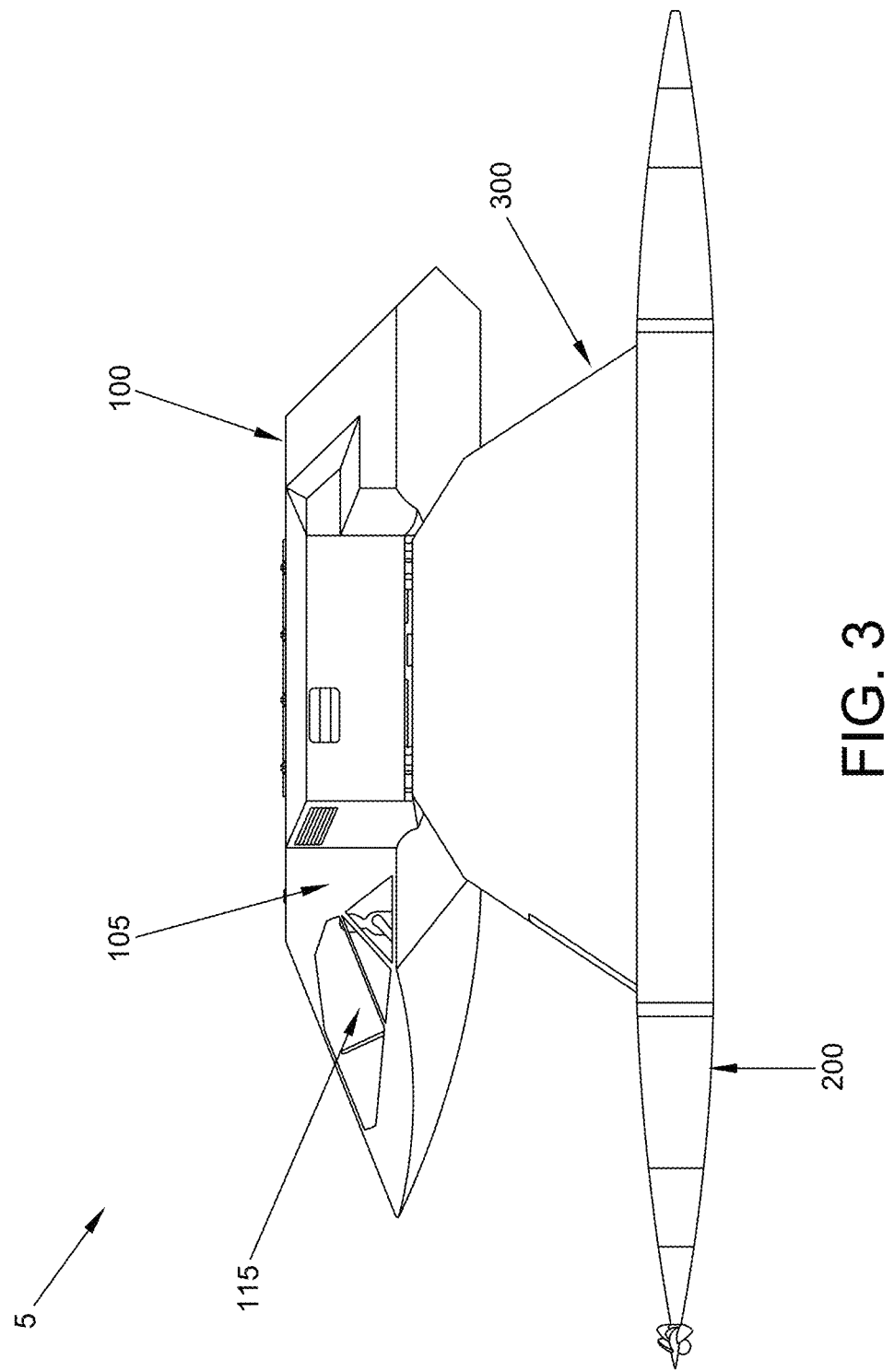
Figure 4:
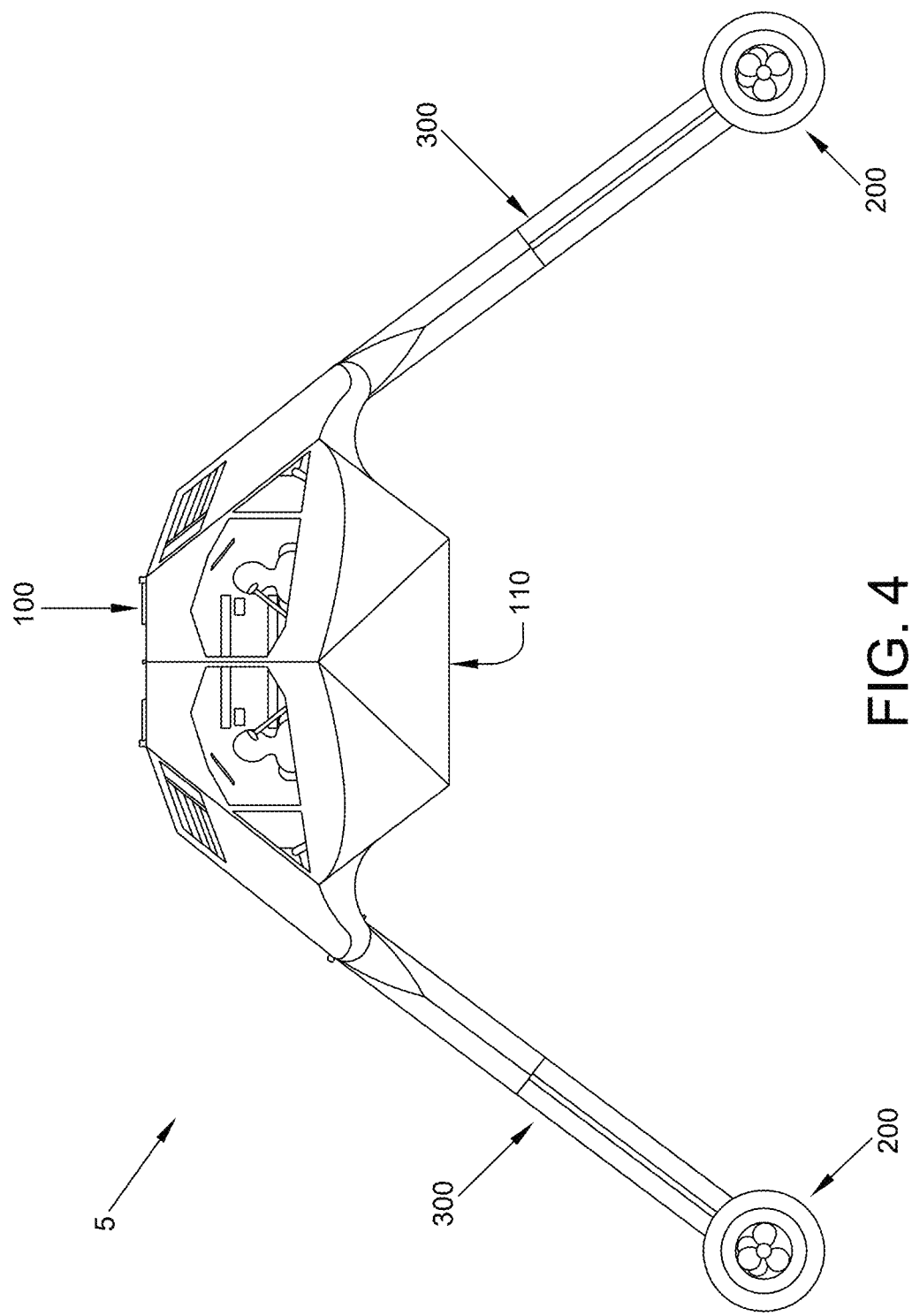
Figure 5:
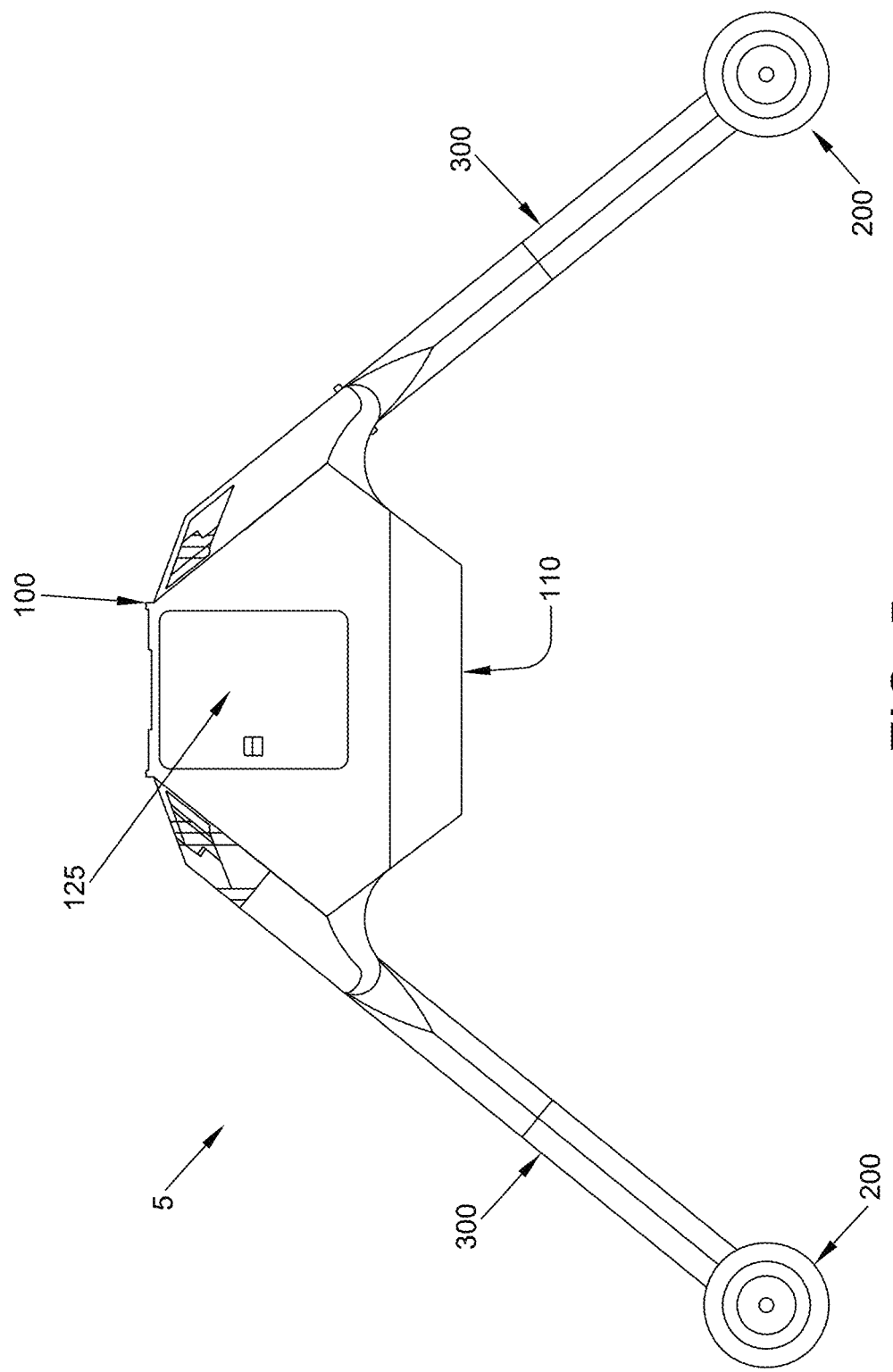
Figure 6:
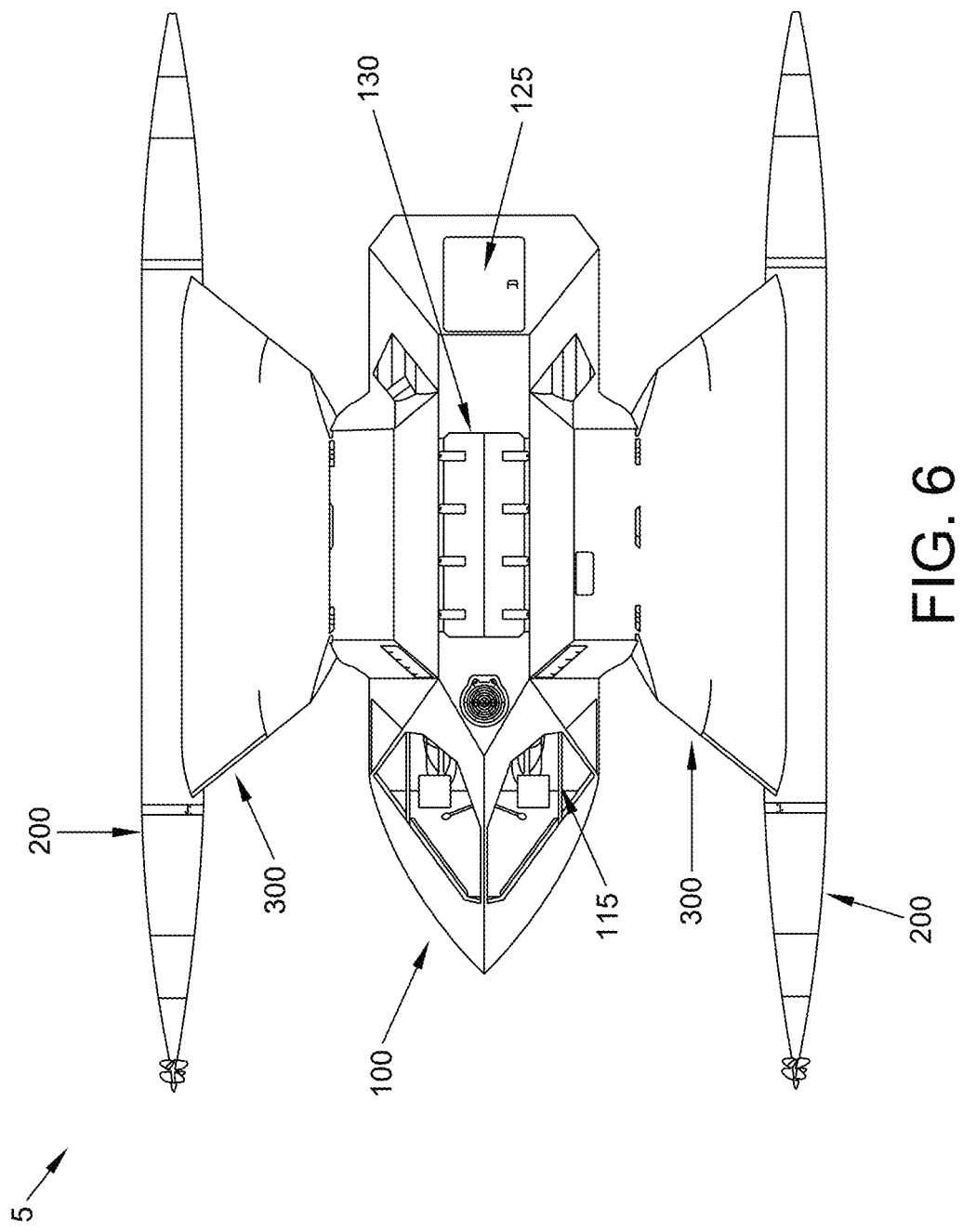
Figure 7:
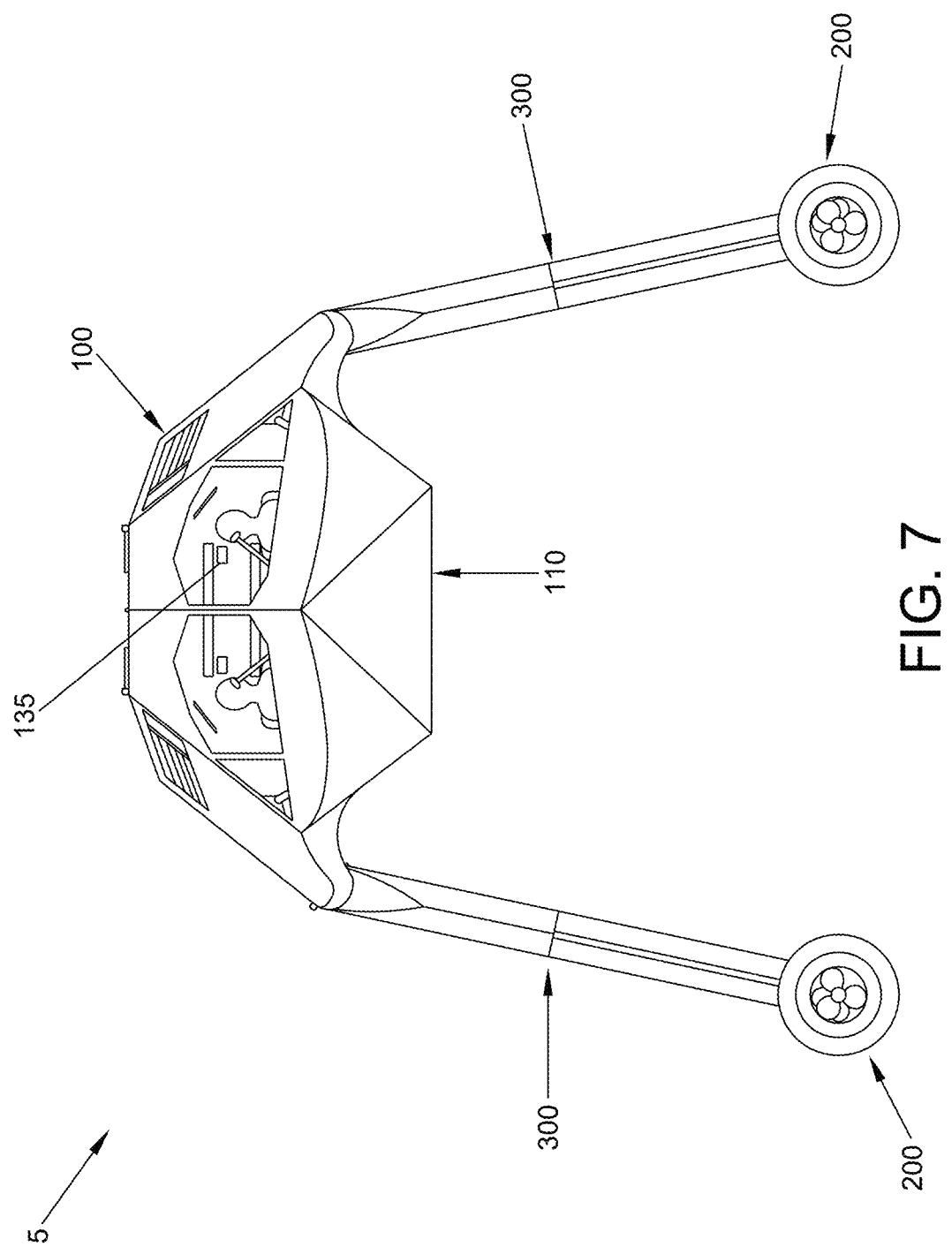
Figure 8:
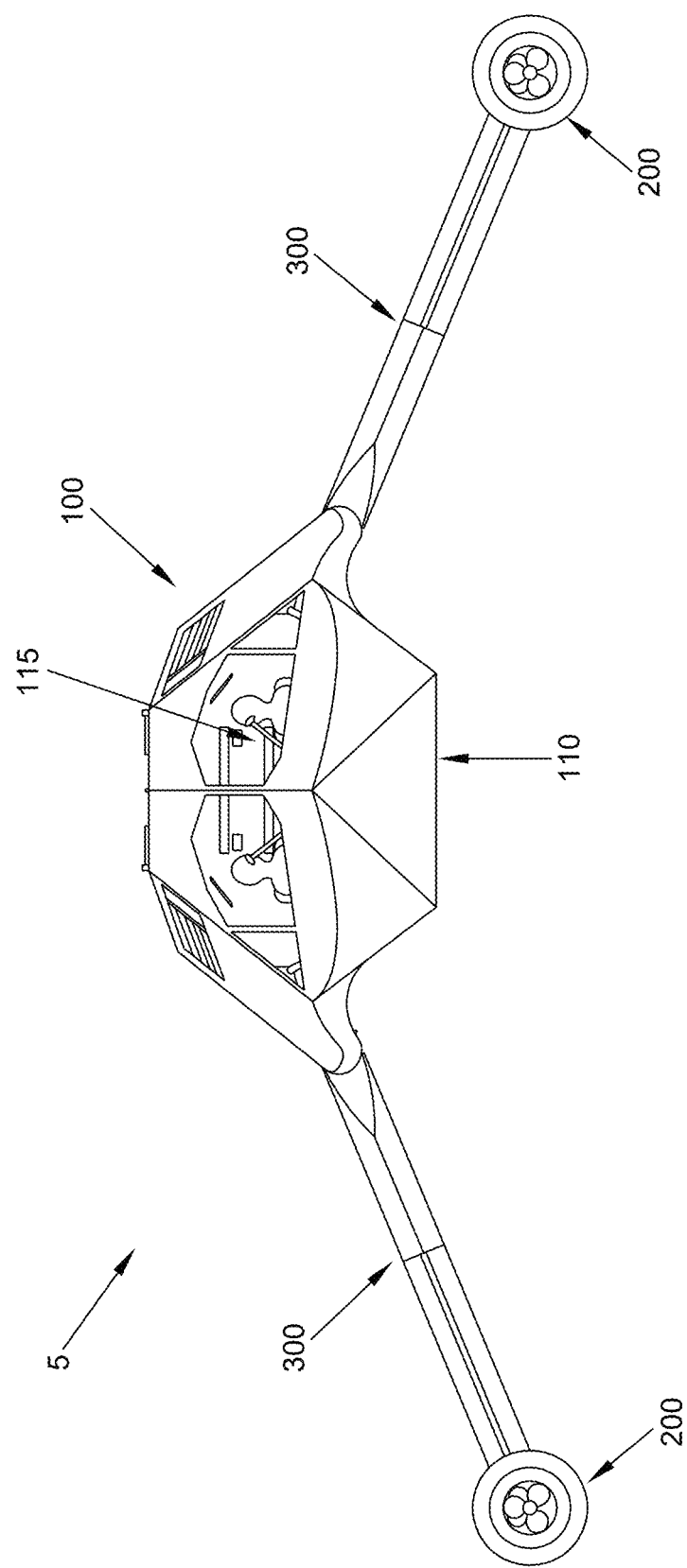
Figure 9:
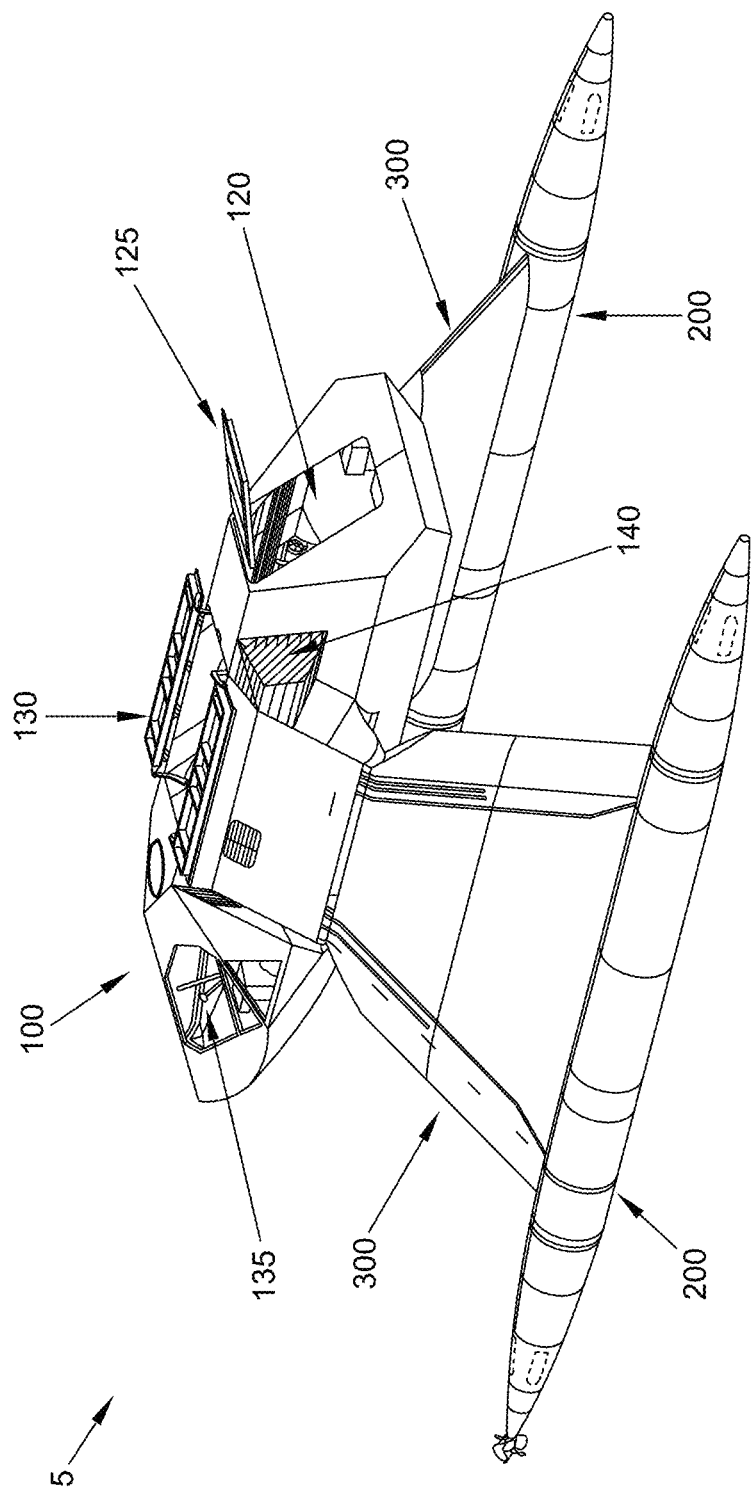
Figure 10:
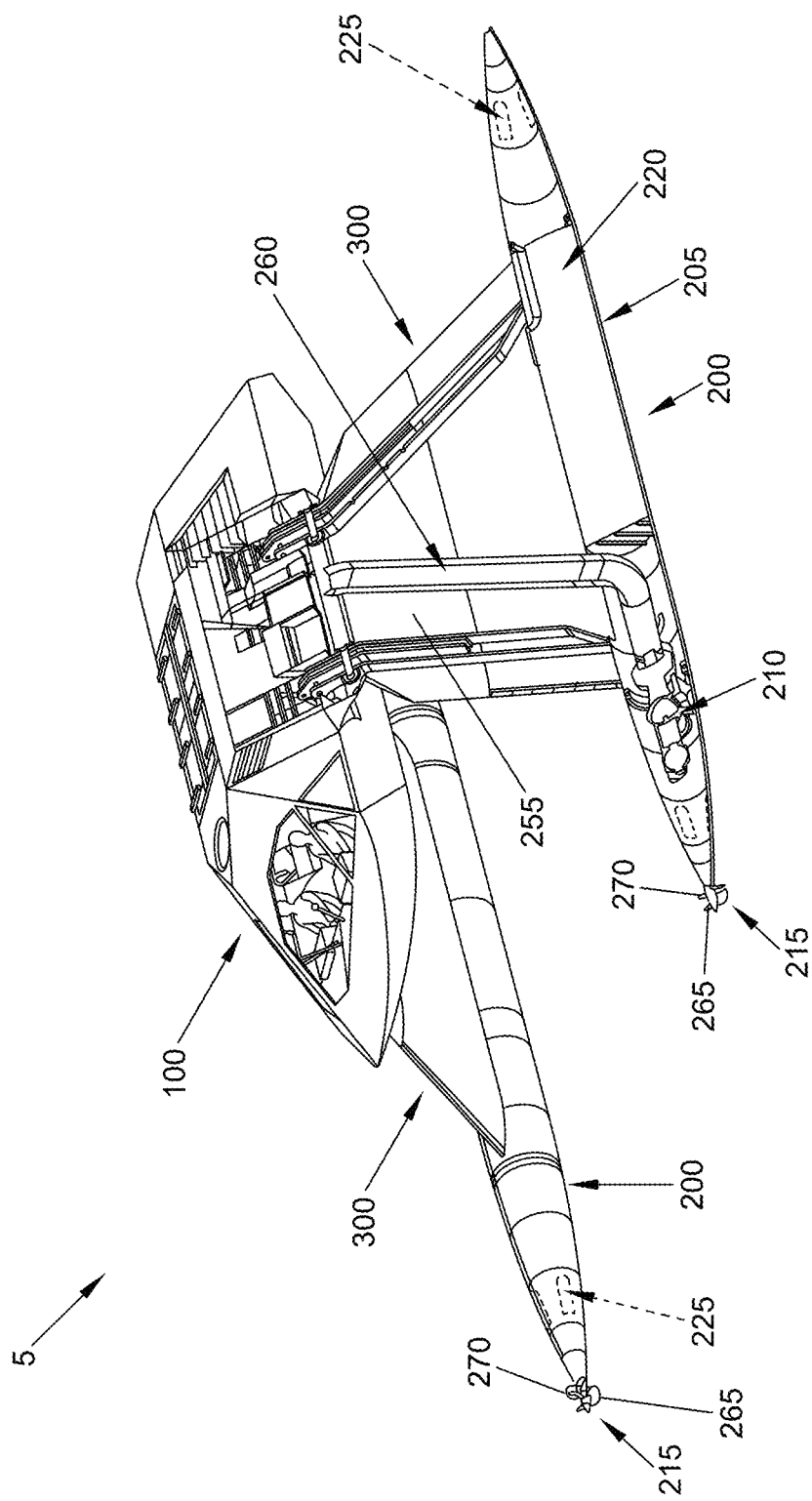
FIGS. 10-15 are schematic views showing further details of the BTFs and struts, and the internal components thereof.
Figure 11:
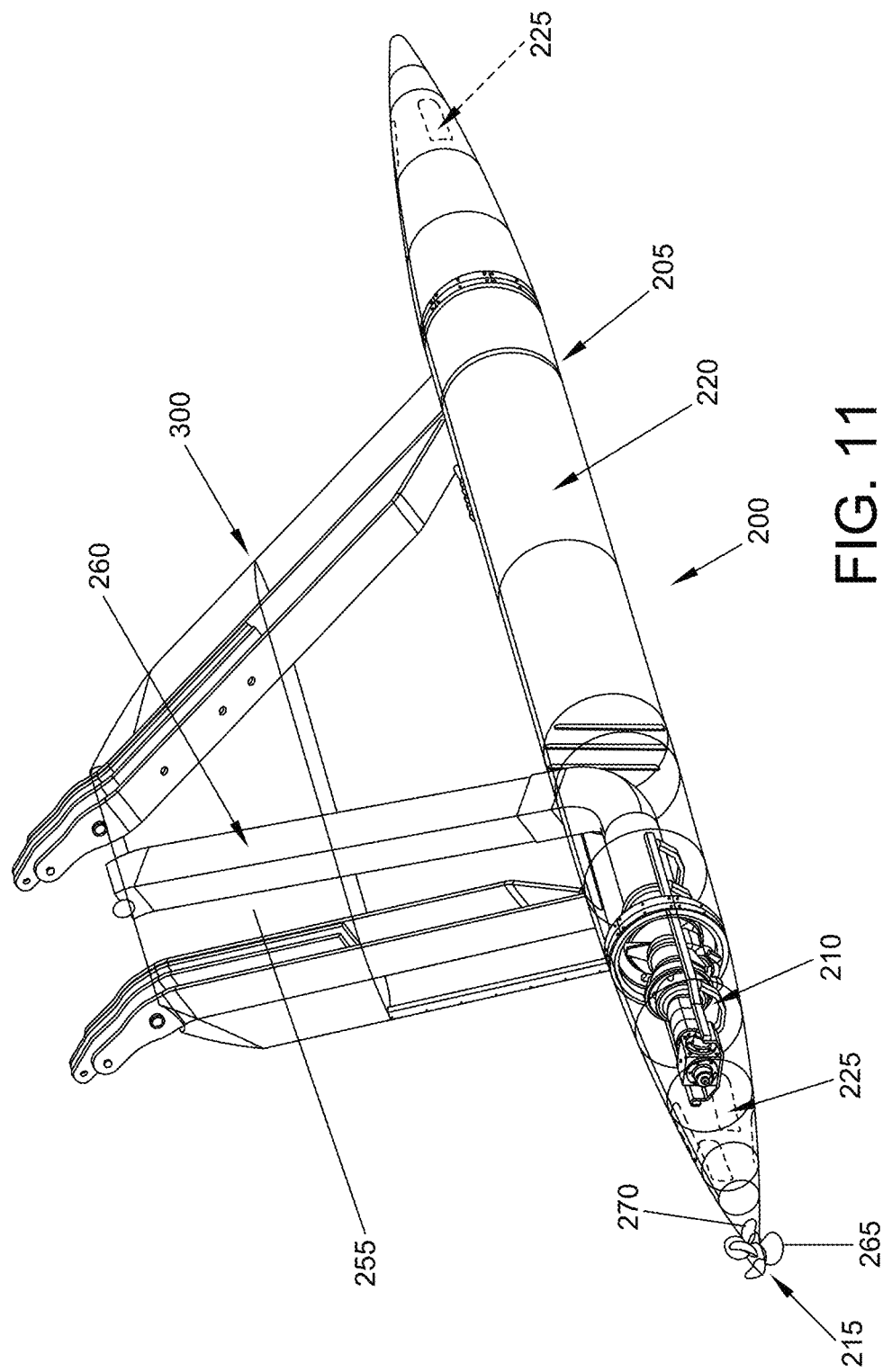
Figure 12:
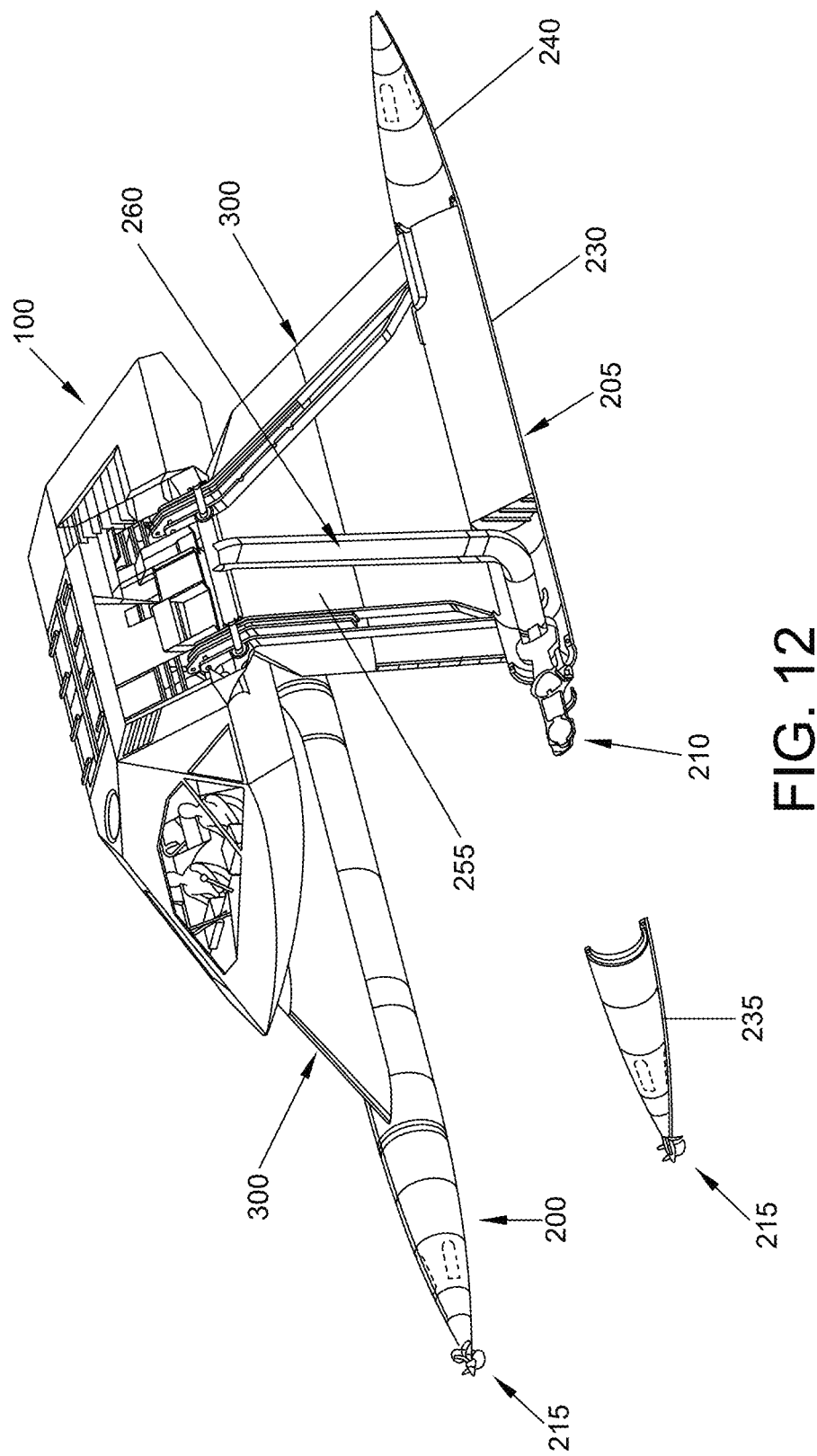
Figure 13:
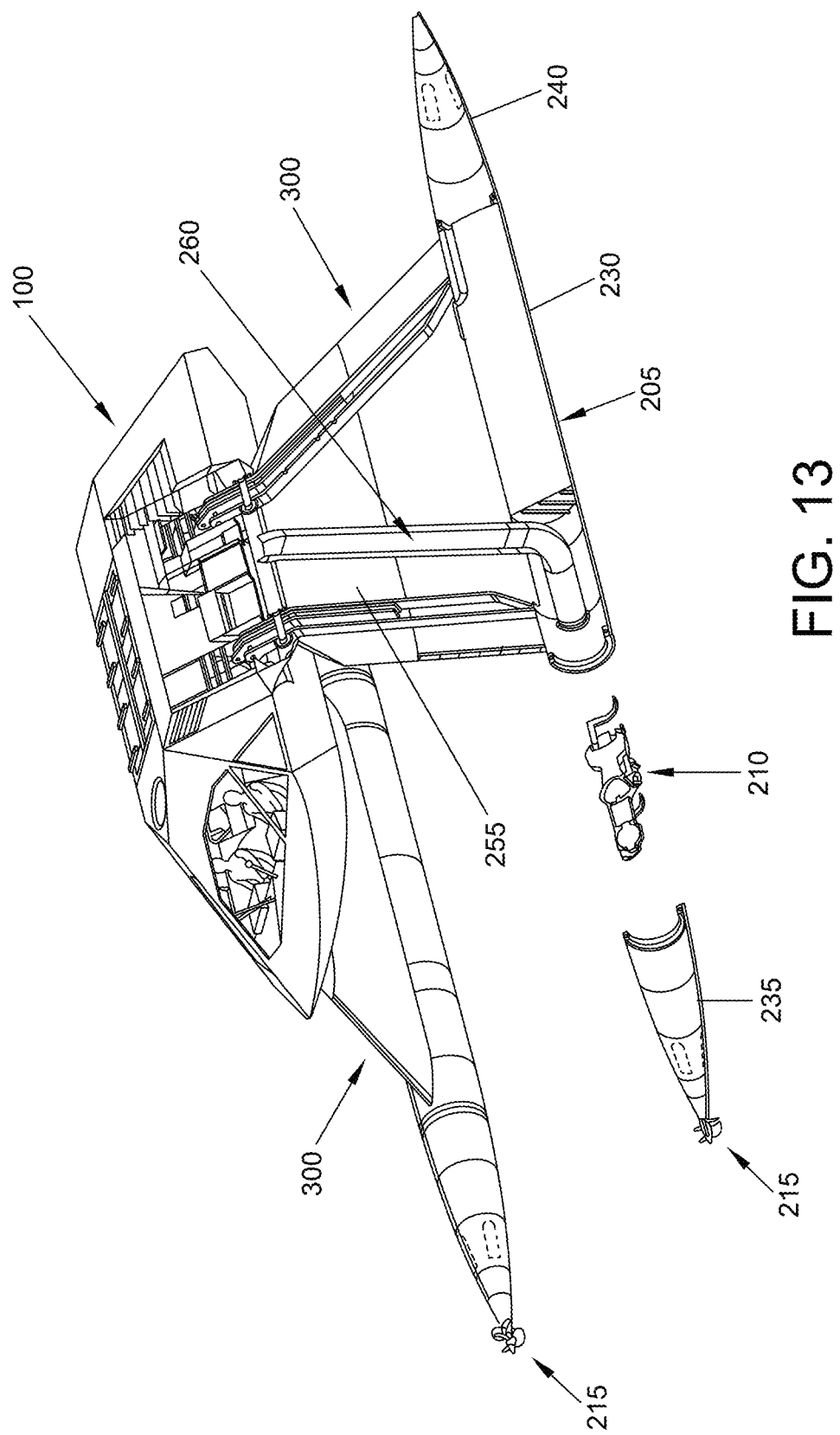

As seen in FIGS. 4, 7 and 8, and as will hereinafter be discussed in further detail, struts 300 can be disposed in a variety of different positions vis-à-vis command module 100, so that attack craft 5 can assume a number of different configurations, depending on the desired mode of operation, whereby to provide high speed, extreme stability and stealth capability.

Thus, for example, in standard seas, attack craft 5 may be placed in the configuration shown in FIG. 4 (i.e., so that struts 300 are disposed approximately 45 degrees off the horizon, and at approximately a right angle to one another) so that command module 100 is safely out of the water and the vessel has modest radar, infrared and visual signatures.

However, in high seas, while operating at high speed, attack craft 5 may be placed in the configuration shown in FIG. 7 (i.e., so that struts 300 are disposed substantially perpendicular to the horizon, and substantially parallel to one another) so that command module 100 stands well out of the water and is free from the affect of swells.

Furthermore, depending on sea conditions, attack craft 5 may be placed in a configuration somewhere between those shown in FIGS. 4 and 7.

Attack craft 5 is also designed to operate in stealth mode, by lowering its physical profile. In this case, attack craft 5 may be placed in the configuration shown in FIG. 8 (i.e., so that struts 300 are disposed almost parallel to the horizon, and almost co-linear with one another) so that command module 100 is disposed just above, or actually in, the water, reducing its radar, infrared and visual signatures. This mode can be very useful when attack craft 5 is being used for reconnaissance purposes and/or to deliver small teams of special forces behind enemy lines and/or to extract the same.

Thus, in one preferred form of the invention, attack craft 5 is normally operated in the configuration shown in FIG. 4, with command module 100 completely out of the water, but the command module being as low as possible so as to have a reduced profile. However, in high seas and at high speed, attack craft 5 may be operated in the configuration shown in FIG. 7, so that command module 100 stands well clear of any swells. And, when desired, attack craft 5 may be operated in the configuration shown in FIG. 8 so as to assume a stealth mode. Or, attack craft 5 may be operated in a selected configuration somewhere between those shown in FIGS. 4, 7 and 8.

Prior Art Designs for Achieving High Speed And/Or Extreme Stability

There are currently two competing approaches for achieving high speed and/or high stability in a water craft. These are (i) the hydrofoil approach, which generally provides high speed; and (ii) the Small Waterplane Area Twin Hull (SWATH) approach, which generally provides high stability.

The Hydrofoil Approach

Hydrofoils have been in experimental use for many years, and today are in active service around the world for a variety of applications. Hydrofoils generally employ small airplane-like wings ("lifting foils") which provide lift for the hull of the vessel. These lifting foils are typically lowered into the water while the vessel is underway. At higher speeds, the lifting foils are capable of lifting the hull of the vessel completely out of the water, thereby allowing the vessel to operate with only its lifting foils (and their supporting struts) in the water, whereby to minimize drag and increase vessel speed. However, the lifting foils themselves provide no buoyancy and therefore cannot support the vessel at slower speeds. Thus, the vessel can only operate in hydrofoil mode when moving at substantial speeds. In addition, due to the thin nature of the hyrdofoil's lifting foils, it is not possible to house the vessel's engines within the lifting foils themselves—instead, it is necessary to house the engines within the hull of the vessel and to use transmission technologies (e.g., mechanical, hydraulic and/or electrical means) to transfer power from the vessel's engines down to its lifting foils, which carry the propellers. However, these power transmission technologies all involve substantial losses in power (thereby necessitating the use of larger engines and/or resulting in lower speeds) and significantly complicate the propulsion system of the vessel.

The SWATH Approach

SWATH vessels employ two or more torpedo-shaped structures which are disposed underwater and attached to the main body of the vessel with fixed vertical struts. The torpedo-shaped structures provide buoyancy for the main body of the vessel, which remains completely out of the water. In this way, SWATH vessels resemble catamarans, except that the two pontoon hulls of the catamaran are replaced by underwater torpedo-shaped structures which reside immediately below the hull at the ends of the vertical struts. The SWATH design generally provides excellent stability because the underwater torpedo-shaped structures are less affected by wave action than a traditional wave-riding hull. However, the substantial skin friction, and the inefficient hydromantic shape, of the large underwater torpedo-shaped structures generally result in higher power consumption. This higher power consumption in turn necessitates the use of larger engines and/or results in reduced vessel speed. However, the use of larger engines is itself problematic, since the engines must then be housed in the hull or, if the engines are to be housed in the underwater torpedo-shaped structures, the underwater torpedo-shaped structures must be enlarged. Housing the engines in the hull introduces all of the power transmission problems discussed above with respect to hydrofoils, inasmuch as the propellers are mounted to the underwater torpedo-shaped structures. Conversely, enlarging the underwater torpedo-shaped structures increases the skin friction problems, and the inefficient hydromantic shape problems, discussed above—which in turn necessitates the use of even larger engines. For this reason, it has previously been impossible to build a small, high-speed SWATH vessel. In addition to the foregoing, the SWATH design typically requires a high profile in order to ensure that the hull of the vessel remains completely out of water, particularly in high seas. This gives the SWATH vessel larger radar, infrared and visual signatures, thereby making it easy to detect and target.

Novel Approach for Achieving High Speed And Extreme Stability

The present invention overcomes the problems associated with the prior art through the provision and use of novel fleet protection attack craft 5. Attack craft 5 supports its command module 100 on a pair of buoyant tubular foils (BTFs) 200 via movable struts 300. BTFs 200 normally provide all of the buoyancy required for the craft, with command module 100 remaining completely out of the water. More particularly, BTFs 200 and struts 300 are often the only portions of the craft which contact the water, and they provide low friction hydromantic cross-sections so as to minimize water resistance. Significantly, BTFs 200 house substantially all of the propulsion, fuel and steering systems for the craft, thereby providing the craft with an unusually low center of gravity and permitting the volume of command module 100 to be dedicated to crew, weapons and payload. Furthermore, struts 300 are movable relative to command module 100, thereby permitting the craft to assume a number of different configurations. This unique approach results in a craft with unparalleled speed and stability regardless of sea conditions, and with lower radar, infrared and visual signatures, thereby making it difficult to detect and target. Various aspects of the craft will now be discussed in further detail.

Command Module 100

Looking now at FIGS. 1-9, command module 100 generally comprises a watertight enclosure 105 (FIG. 3) having a hull-like bottom surface 110 (FIGS. 4, 5, 7 and 8). Command module 100 includes a cockpit 115 (FIGS. 2, 3, 6 and 8) for housing a pilot and weapons officer, and a bay 120 (FIG. 9) for housing weapons and payload (including passengers). Command module 100 further includes a rear hatch 125 (FIGS. 5, 6 and 9) for permitting entry and exit of crew, weapons and payload (including passengers), and a top hatch 130 (FIGS. 2, 6 and 9) for permitting various weapons systems to be raised out of bay 120, fired, and then lowered back into bay 120.

Command module 100 is armored to protect all occupants, weaponry and payload. Windscreens 135 (FIGS. 7 and 9) are formed out of bullet-resistant materials.

Command module 100 comprises watertight bulkhead enclosures which, combined with hull-like bottom surface 110, allow waves to wash over the command module without effect when attack craft 5 is operating in its stealth mode (see below). Automatic vent doors seal any open systems against water leakage when attack craft 5 is in this stealth mode.

The outer structure of command module 100 is preferably based on so-called "stealth" principals in order to minimize the radar signature of the craft. More particularly, the outer surface of command module 100 is designed to deflect radar energy and return only a minimal amount of radar energy to the radar transmitter. To this end, the exterior surfaces of command module 100 are preferably highly angular, with the angles being selected so as to reflect the radar energy either downward towards the water or upward into the sky. In any case the exterior surfaces of command module 100 minimize the amount of radar energy reflected directly back to the sender. Furthermore, command module 100 preferably incorporates a radar-absorbent paint which is capable of absorbing or further reducing any incident radar energy.

Command module 100 is also configured to house all of the control systems for piloting the attack craft, all of the weapons control systems for operating the weapons carried by the attack craft, an auxiliary generator for supplemental power requirements (e.g., for navigation), a battery charger, an air filtration system, a head, a sink, an air compressor, etc.

The weapons systems carried by attack craft 5 preferably comprise (i) one 20 mm Vulcan Gatling gun, equipped with optic and night vision; (ii) two 30 caliber Miniguns equipped with optic and night vision; (iii) one or more 2.5 inch laser-guided rockets; and (iv) 8 "mini" torpedoes. Preferably the Gatling gun, Miniguns and rockets are housed within bay 120 for elevated deployment through top hatch 130, and the "mini" torpedoes are mounted to the exterior of command module 100, e.g., such as is shown at 140.

Buoyant Tubular Foils (BTFs) 200

Looking next at FIGS. 10-15, a pair of buoyant tubular foils (BTFs) 200 provide buoyancy, propulsion and steering for attack craft 5. Each of the BTFs 200 generally comprises a hollow tubular structure 205 which houses an engine 210 for powering a propeller system 215, a fuel tank 220 for supplying fuel to engine 210, and steering elements (or spoilers) 225 for steering attack craft 5.

Hollow Tubular Structure 205

Hollow tubular structure 205 generally comprises a hollow hull which provides buoyancy for attack craft 5. Hollow tubular structure 205 is configured so as to provide stability at low speed operations while still providing low water friction and an improved hydromantic profile so as to enable speeds of over eighty (80) knots. At high speeds, the configuration of hollow tubular structure 205 provides extraordinary stability for the vessel, due to the flow of water over the elongated tubular structure.

More particularly, the low friction hydromantic cross-section of hollow tubular structure 205 traverses water with the lowest possible skin friction forces and the best hydromantic shape obtainable, yet still houses engine 210 and fuel tank 220, and supports propeller system 215 and steering elements 225. It has been determined that best performance is achieved where hollow tubular structure 205 has a cross-section which is between about 1/10 and about 1/30 of the length of hollow tubular structure 205, and preferably about 1/20 of the length of the hollow tubular structure. By way of example but not limitation, excellent performance can be achieved when the hollow tubular structure 205 has a 3 foot outer diameter and a 60 foot length.

Figure 14:
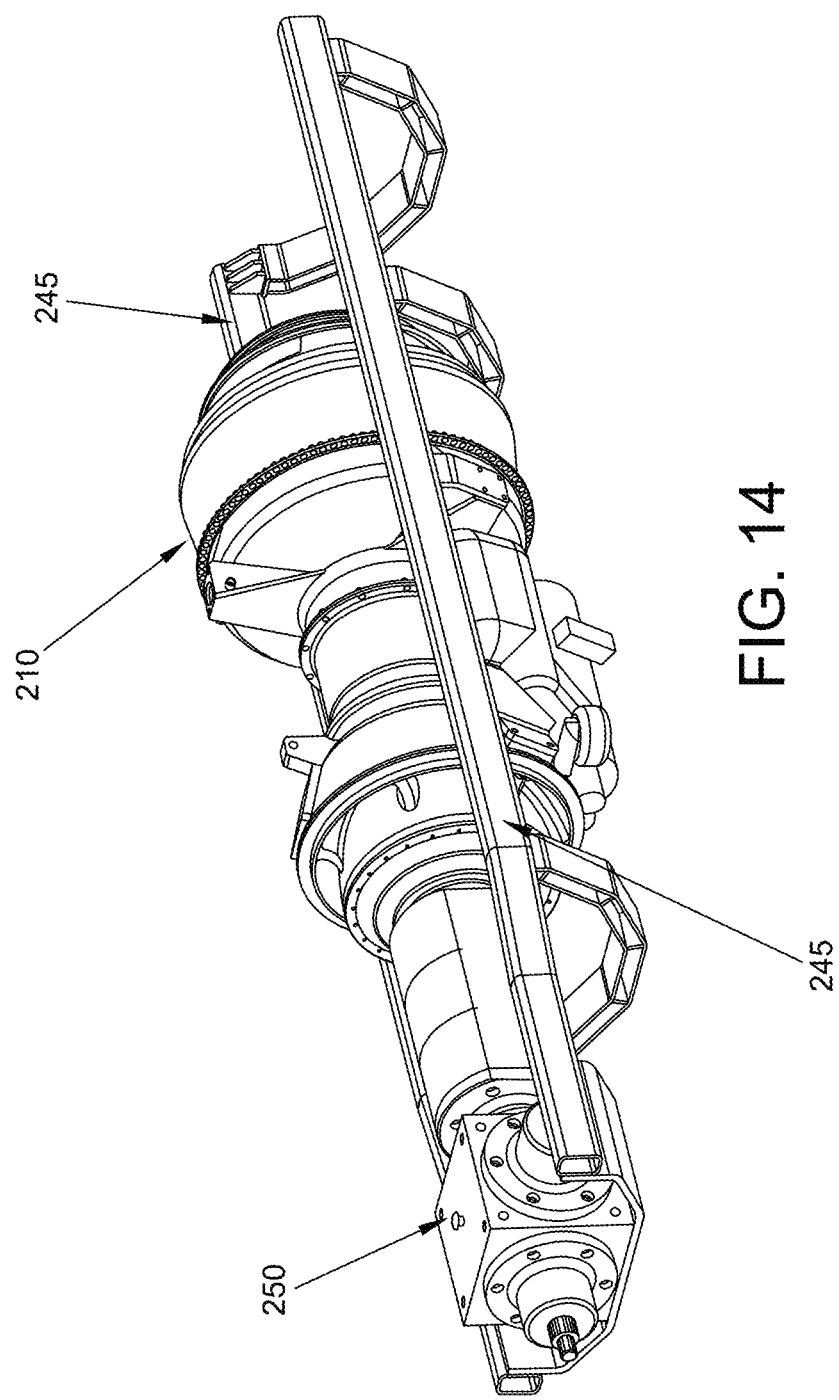

As seen in FIGS. 12-15, hollow tubular structure 205 comprises a plurality of disconnectable sections that permit easy access to components disposed within the interior of hollow tubular structure 205, e.g., for maintenance and quick replacement of power and sensor modules. By way of example but not limitation, hollow tubular structure 205 can comprise a center section 230 which is mounted to a strut 300, a forward section 235 which is dismountable from center section 230, and a rear section 240 which is dismountable from center section 230. Preferably, interior components are equipped with slides for easy entry into, and removal from, hollow tubular structure 205. By way of example but not limitation, FIG. 14 shows how engine 210 may be equipped with slides 245 for supporting engine 210 within hollow tubular section 205, and to facilitate insertion into, and removal from, hollow tubular structure 205.

Forward section 235 and rear section 240 can mount to center section 230 in a variety of ways. By way of example but not limitation, the sections can be mechanically held together (e.g., by hydraulics, power screw actions, etc.) or they can twist lock together (e.g., in the manner of a bayonet-type mount). A watertight seal is provided between the sections so as to ensure hull integrity. The seal can be a continuous circular shape to match the cross-section of hollow tubular structure 205, e.g., a resilient O-ring having a round or flat cross-section. Alternatively, the O-ring can be an inflatable seal (e.g., like the inner tube of a bicycle tire) that can provide adjustable sealing forces by the injection of an appropriate amount of fluid (e.g., gas or liquid). Preferably, each O-ring seal has two sealing surfaces, i.e., the face surface between adjacent sections and the face surface against the skin of hollow tubular structure 205.

The ability to quickly unlock the various sections of hollow tubular structure 205 permits the rapid servicing and/or replacement of the various components contained within hollow tubular structure 205, e.g., engine 210, fuel tank 220, etc.

Gas Turbine (Jet) Engine Propulsion

Engine 210 can be a conventional diesel engine, internal combustion engine, rotary engine, electric motor, etc. Preferably, however, engine 210 comprises a gas turbine (jet) engine, e.g., of the sort used in aircraft, and particularly of the sort used in helicopters. A gas turbine engine is preferred due to its high power, small size and low weight. More particularly, a gas turbine engine typically has a horsepower-to-weight ratio of about 2.5 horsepower (HP) per pound. By comparison, a modern marine diesel engine typically has a horsepower-to-weight ratio of about 0.5 HP per pound. Inasmuch as there is generally a direct correlation between vessel acceleration and weight, it is generally desirable to use a high power, low weight engine in a high speed craft. Thus, a gas turbine engine is the preferred propulsion unit for attack craft 5.

Significantly, a gas turbine engine is also ideal for use in attack craft 5 inasmuch as its size and configuration are perfectly suited for disposition within hollow tubular structure 205. More particularly, gas turbine engines typically have an elongated, somewhat cylindrical configuration which easily fits within a hollow tubular structure. Significantly, gas turbine engines generally have relatively modest cross-sections, such that the gas turbine engines can fit within a relatively small diameter tube. By way of example but not limitation, the T53L13 gas turbine (jet) engine manufactured by Lycoming Engines (a division of Avco Corporation, a wholly owned subsidiary of Textron, Inc.) of Williamsport, Pa. has a diameter which is ideally suited for disposition within hollow tubular structure 205 of attack craft 5.

The use of a gas turbine engine in BTFs 200 also provides significant additional advantages.

First, the use of a gas turbine engine in each BTF 200 easily allows for the use of a centerline drive shaft to transfer power to propeller system 215. This is an enormous advantage when it comes to efficiently delivering large amounts of power to propeller system 215.

Second, the gas turbine engine provides a starter generator that performs two functions, i.e., (i) to start the turbine engine, and (ii) to generate DC power. More particularly, most gas turbine engines provide 24 volts DC at 300 amps. This allows attack craft 5 to power all of its electrical systems from the gas turbine engines, with the need for only a small supplemental generator for charging batteries.

In addition, placing a gas turbine engine inside hollow tubular structure 205, which is always underwater, also provides superior cooling for the gas turbine engine since the radiated engine heat is transferred to the surrounding water through the skin of hollow tubular structure 205.

Furthermore, gas turbine engines are generally designed to be quickly and easily removed (e.g., by sliding) from an aircraft fuselage. Similarly, the gas turbine engine can be quickly and easily removed (e.g., by sliding) from hollow tubular structure 205.

The gas turbine engine usually has a high internal rpm (greater than 19,000 rpm) with internal gear reductions. Preferably, a gearbox 250 using planetary gears connects engine 210 to propeller system 215. This approach provides a gearbox which is smaller than the outside diameter of the gas turbine engine.

Gas Turbine (Jet) Engine Intake And Exhaust

The "Achilles heel" of a gas turbine engine is its need to rapidly intake large quantities of fresh air and to rapidly expel large quantities of exhaust air. As a result of this need to rapidly move large quantities of air in and out of the gas turbine engine, gas turbine engines have not heretofore been a candidate for use in underwater structures (e.g., submarines and the submerged portions of SWATH vessels) due to the inability to adequately aspirate the jet engines.

A critical aspect of attack craft 5 is the air intake and exhaust systems which support the use of gas turbine engines underwater. In this respect it will be appreciated that the design of the air intake and exhaust systems is complicated by the fact that attack craft 5 is designed to change configurations (e.g., as shown in FIGS. 4, 7 and 8) and the air intake and exhaust systems must be able to accommodate these configuration changes. More particularly, in attack craft 5, the gas turbine engines are housed underwater in BTFs 200, the BTFs 200 are disposed at the ends of struts 300, and struts 300 are movable relative to command module 100 (see FIGS. 4, 7 and 8). Thus, the air intake and exhaust systems of attack craft 5 must be capable of rapidly moving large quantities of air in and out of the gas turbine engines, and through struts 300, while at the same time accommodating movement of struts 300 relative to command module 100.

To this end, attack craft 5 comprises an air intake and exhaust system for rapidly delivering large quantities of fresh air to gas turbine engine 210 and for rapidly expelling large quantities of exhaust air from gas turbine engine 210. The air intake and exhaust system generally comprises an engine intake duct 255 and an engine exhaust duct 260. The intake side of engine intake duct 255 is disposed in command module 100 so that it can access cool air, which increases the efficiency of gas turbine engines 210. Preferably, the intake side of engine intake duct 255 is funneled so as to generate ram air forces while attack craft 5 is moving at speed, which further increases the efficiency of gas turbine engines 210. The outlet side of engine exhaust duct 260 is disposed in command module 100 so as to provide efficient exhaust venting with a minimal heat signature. Engine intake duct 255 and engine exhaust duct 260 preferably pass through a flexible coupling located at the junction of the strut and the command module, in order to accommodate movement of the strut vis-à-vis the command module. This flexible coupling also accommodates other lines passing from command module 100 to BTFs 200 via struts 300, e.g., fuel re-fill lines, electrical power lines, electrical control lines, etc.

It should be appreciated that the flexible coupling is configured so as to allow engine intake and engine exhaust to be vectored and bent while still accommodating the large gas volumes associated with the gas turbine engine. Furthermore, the flexible coupling is designed to accommodate the high exhaust temperatures created by the gas turbine engine. The use of heat-resistant flexible materials in the coupling is essential to allow movement of the struts relative to the command module.

It should also be appreciated that moving large quantities of air through a narrow strut (which is thinner than BTF 200) entails using substantially the entire inner structure of the strut as an air intake duct and an engine exhaust duct. In one preferred form of the invention, engine exhaust duct 260 is routed inside air intake duct 255 so as to allow the exhaust to be cooled by the intake air, whereby to provide a lower thermal signature for attack craft 5. In another preferred form of the invention, engine exhaust duct 260 is not routed inside air intake duct 255—rather, in this form of the invention, engine exhaust duct 260 is separate from air intake duct 255, and the exhaust in engine exhaust duct 260 is separately cooled, e.g., with a water cooling jacket. Furthermore, in this form of the invention, insulation may be used to keep the cool air in air intake duct 255 from being heated by the hot exhaust in engine exhaust duct 260 in order to increase the efficiency of gas turbine engines 210.

Preferably, engine exhaust duct 260 includes insulation to prevent the heat of gas turbine engine 210 from overheating the outer skin of strut 300.

In one form of the present invention, engine exhaust ducts 260 are double-walled, so as to allow a fluid to be circulated around the inner hot duct, whereby to further cool the engine exhaust and provide a lower thermal signature.

Attack Craft Propulsion Using Battery Power

Preferably, attack craft 5 also includes an electric motor (not shown) and batteries (not shown) for selectively driving propeller system 215. More particularly, in certain circumstances (e.g., reconnaissance operations and the delivery and/or extraction of special forces) it may be desirable to operate with reduced noise. In these circumstances, the electric motor and batteries may be used in place of the gas turbine (jet) engine discussed above.

Propeller System 215

Most vessels in use today utilize propellers which are disposed at the stern of the vessel and push the vessel through the water. This approach is generally satisfactory for most vessels. However, stern-mounted, pushing propellers are generally not satisfactory for those vessels which are trying to achieve very high speeds, e.g., speeds in excess of 80 knots. This is because propellers located at the stern of the vessel engage water which has been agitated by the prior passage of the vessel through the water. Since the efficiency of propellers is highly affected by the state of the water the propellers move through, stern-mounted, pushing propellers are generally impractical for high speed craft.

Some high speed boats in use today (e.g., hydroplanes and ocean racing boats) use stern-mounted, surface-penetrating, forward-facing propellers that ride partially submerged in agitated water with air mixed in. These piercing propellers are designed with a heavy trailing edge and anti-cavitation cupping. These piercing propellers withstand the extreme forces of high horsepower and high rpm because the propeller is never fully engaged in the water.

However, this type of propeller would not be effective for attack craft 5, since with BTF 200, propeller system 215 must be fully submerged.

Significantly, the present invention utilizes a propeller system 215 which comprises a pair of forward-facing, pulling, counter-rotating propellers 265, 270 located at the bow end of each BTF 200.

More particularly, a propeller system 215 is placed at the bow of each BTF 200 so that the forward-facing, pulling propellers can "bite" into virgin, undisturbed water, whereby to obtain maximum efficiency. Furthermore, each propeller system 215 comprises two propellers, a leading propeller 265 and a trailing propeller 270, operated in a timed, counter-rotating mode, so as to provide reduced cavitation for the forward propeller. Leading propeller 265 is the main propulsion element and does the majority of the work of pulling of the vessel. Trailing propeller 270 spins in the opposite direction from the leading propeller and evacuates water from behind the leading propeller, thereby permitting the leading propeller to work with maximum efficiency. Thus, trailing propeller 270 moves water out from behind leading propeller 265 so that the leading propeller can pull more water in. This provides increased propeller efficiency, which translates into higher speed and lower fuel consumption.

Using serially-mounted, counter-rotating propellers 265, 270 also permits smaller propeller diameters to be used. This is because the surface areas of the two propellers combine so as to provide an overall effective surface area which is equivalent to the surface area of a single, larger diameter propeller. However, it is difficult to rotate a large diameter propeller at high speeds due to the forces involved. Thus, the use of serially-mounted, counter-rotating propellers permits the propellers to be rotated at higher rpms, thereby permitting higher speeds to be achieved.

In addition to the foregoing, by using two counter-rotating propellers, there is no side torque. More particularly, side torque in propellers is the result of the centrifugal forces created by the rotation of the propeller. This side torque creates a tendency for the vessel to turn in the direction of the rotation of the blade. Side torque is not desired with attack craft 5, since it involves a loss of energy and can create steering issues for the vessel.

A gearbox 250 connects a gas turbine engine 210 to a propeller system 215. More particularly, gearbox 250 is configured to convert the single rotational motion of the output shaft of a gas turbine engine 250 into the dual, co-axial, counter-rotational motions needed to drive the counter-rotating propellers, 265, 270.

Super-Cavitation

By placing the counter-rotating propellers 265, 270 on the forward end of BTFs 200, the propellers are able to pull the vessel through clean, undisturbed, virgin water, thereby ensuring optimal propeller performance. In addition, by placing the two serially-mounted, counter-rotating propellers on the front end of BTFs 200, attack craft 5 is able to generate a highly gaseous environment, comprising a jet stream of dense collapsing bubbles, that encapsulate BTFs 200 and significantly reduce vessel drag. More particularly, the actions of propellers 265, 270, working together, pull water through the leading propeller 265 and allow the trailing propeller 270 to heavily cavitate the rapidly moving water and create a heavy stream of gaseous bubbles which surround the outer surfaces of BTFs 200. This encompassing gaseous envelope (which is sometimes hereinafter referred to as a supercavitated air curtain, an envelope or skirt of gaseous bubbles, supercavitated water, and the like, all of which are intended to mean a highly gaseous environment of bubbles, and/or a single bubble that fully encases a submerged body) reduces hull drag and greatly increases the speed of the vessel, since the BTFs are essentially "flying through bubbles". See FIG. 15A. In this respect it should be appreciated that the kinetic coefficient of friction with air is approximately 1/800th the kinetic coefficient of friction of water. Furthermore, the faster the vessel goes, the greater the reduction in hull friction, inasmuch as (i) a greater quantity of gaseous bubbles are created by the serially-mounted, counter-rotating propellers, and (ii) the bubbles do not have time to collapse before BTFs 200 have passed completely through them.

Additional Means for Producing An Encompassing Gaseous Envelope

Attack craft 5 can also include additional means for producing an encompassing gaseous envelope about BTFs 200, whereby to reduce hull friction and thereby increase the speed of the vessel.

More particularly, in one form of the invention, a plurality of small openings 275 (FIG. 15B) are preferably located immediately aft of trailing propeller 270 and disposed in a circular fashion about some or all of the periphery of the BTF structure. These small openings 275 are in communication with ductwork or tubing leading to the outside air, allowing the flowing water coming off the trailing propeller 270 to create a siphon effect, drawing air down for release just aft of the trailing propeller, whereby to create an even more dense gaseous envelope for reducing BTF friction.

Figure 15:
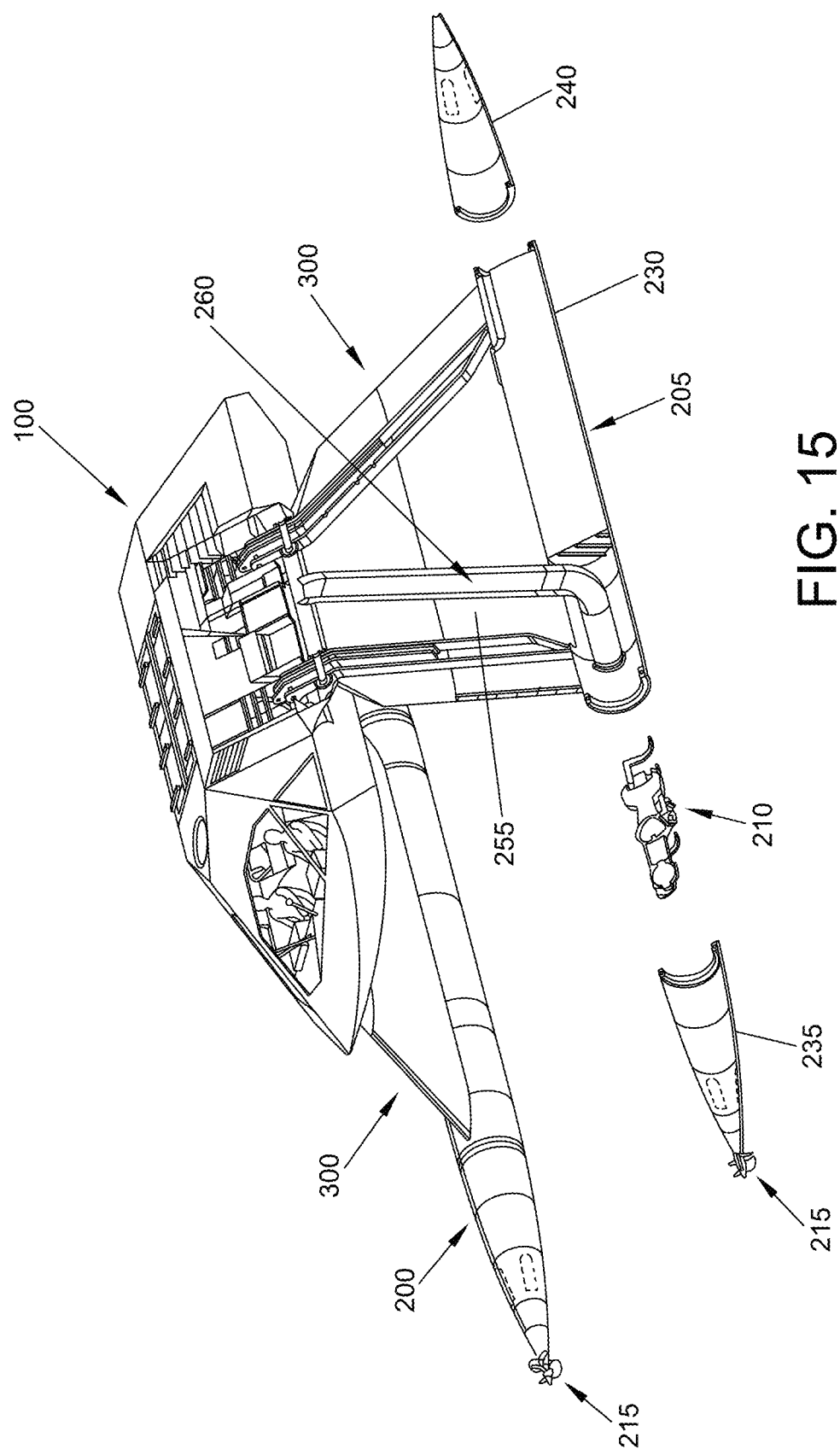
Figure 15D:
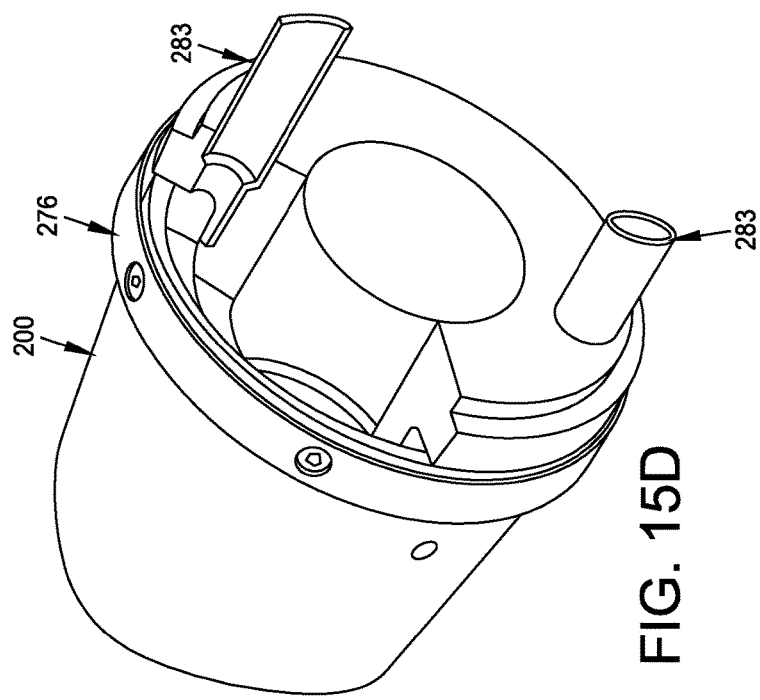
FIGS. 15C-15F are schematic views showing a venturi injection ring disposed adjacent to the perimeter of a BTF for producing an encompassing gaseous envelope about the BTF.
Figure 15E:
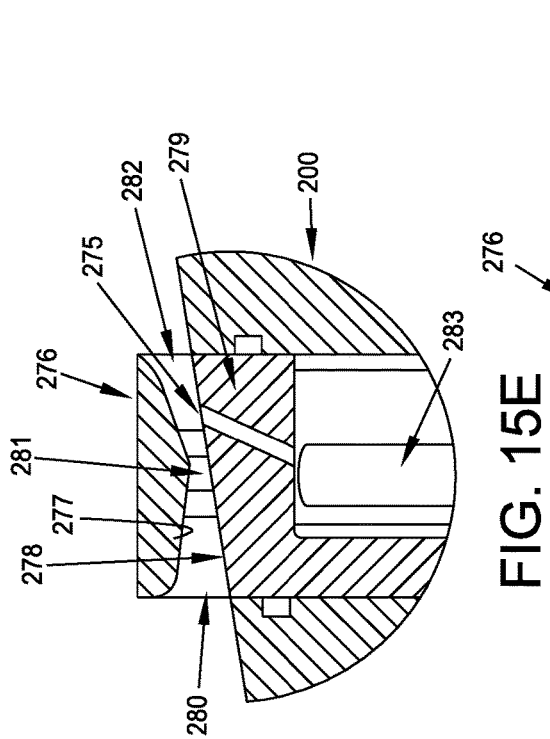
Figure 15C:
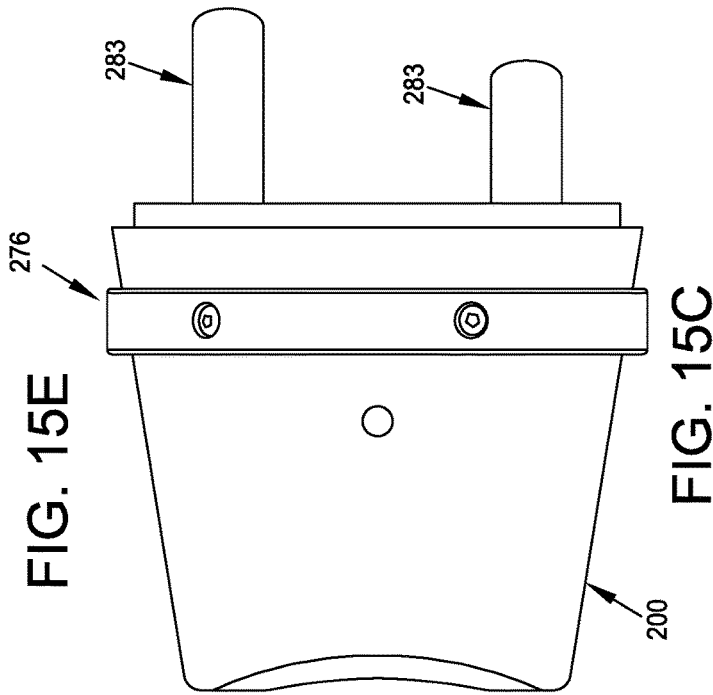

In one preferred form of the invention, and looking now at FIGS. 15C, 15D and 15E, at least one venturi injection ring 276 is positioned about some or all of the circumference of BTF 200, spaced slightly from the outside surface 278 of the BTF. In one preferred form of the invention, one venturi injection ring 276 is disposed just aft of trailing propeller 270 and extends about the entire circumference of BTF 200. Venturi injection ring 276 comprises an inner profile 277 which is configured to cooperate with the outer profile 278 of the adjacent peripheral portion 279 of BTF 200 so as to create a large opening 280, followed by a small opening 281, followed by a large opening 282, whereby to create a so-called "venturi effect" for the water flowing between venturi injection ring 276 and the adjacent outer profile 278 of peripheral portion 279 of BTF 200. This venturi effect causes the water flowing between venturi injection ring 276 and the adjacent outer profile 278 of peripheral portion 279 of BTF 200 to be accelerated, whereby to induce a pressure drop at venturi injection ring 276 aft of small opening 281. This pressure drop draws air (or another gas) out of one or more supply tubes 283, which extend between a plurality of small openings 275 (which may be bores or grooves) and an air source (such as the ambient air outside command module 100, obtained via an air intake disposed at the command module or a strut or via a snorkel extending upward from the BTF) or another gas source, whereby to provide a gaseous envelope aft of venturi injection ring 276. This gaseous envelope encompasses BTF 200 and thereby reduces hull drag and greatly increases the speed of the vessel. Note that the gaseous envelope created by venturi injection ring 276 supplements and enhances the gaseous envelope produced by the two serially-mounted, counter-rotating propellers on the front end of BTFs 200, thereby providing even more reduction of hull drag and further increasing the speed of the vessel.

It should also be appreciated that, if desired, venturi injection ring 276 can be used to draw other gases or liquids (instead of, or in addition to, ambient air) through supply tubes 283 and out of small openings 275, whereby to modify or enhance the gaseous envelope which encompasses BTF 200. By way of example but not limitation, such other gases or liquids may comprise polymers, soaps, oils, etc.

Figure 15F:
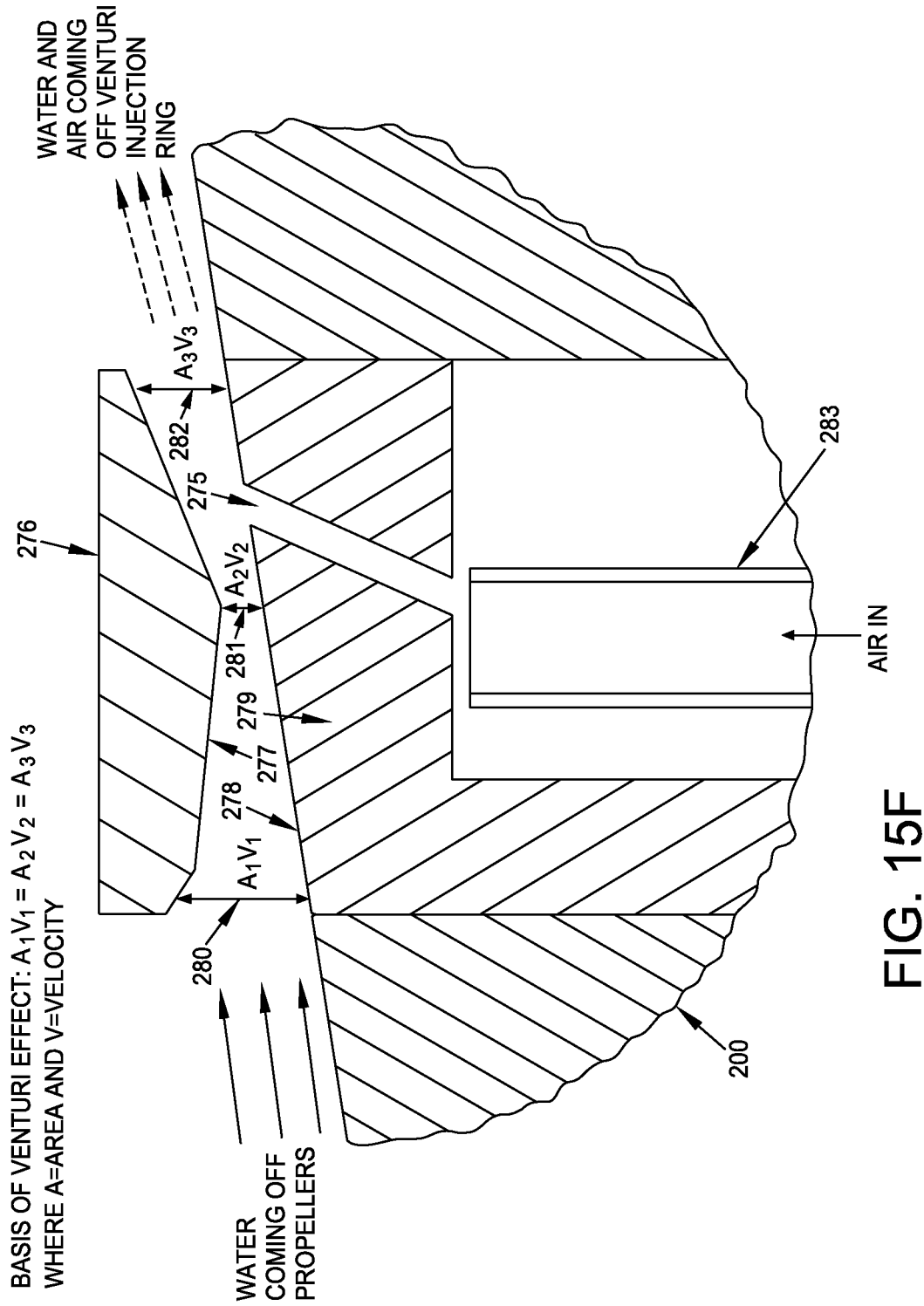

See FIG. 15F, which shows, in schematic form, the construction and function of venturi injection ring 276 in greater detail.

If desired, multiple injection rings 276 may be provided on a BTF 200.

If desired, venturi injection ring 276 can have a variable configuration such that the dimensions of large opening 280, small opening 281 and/or large opening 282 can be selectively changed, whereby to modify the venturi effect provided by venturi injection ring 276. This variable configuration can be implemented by mechanical and/or inflatable elements disposed on or forming venturi injection ring 276.

As will hereinafter be discussed, BTF 200 may also be used as the hull of a submarine, or as the hull of a torpedo, or as the hull of an unmanned drone, etc. In this respect it should be appreciated that venturi injection ring 276 may also be utilized on these craft so as to reduce hull drag and increase the speed of the craft.

Furthermore, it should be noted that, if desired, venturi injection ring 276 may be used on submerged surfaces of substantially any water craft, including water craft using rear propulsion means such as rear propellers, rear water jets, etc., so as to reduce hull drag and increase the speed of the craft. By way of example but not limitation, venturi injection ring 276 may be used on a rear propulsion SWATH vessel, a rear propulsion submarine, a rear propulsion torpedo, a rear propulsion unmanned drone, etc.

And, if desired, venturi injection ring 276 can be movable relative to BTF 200 such that venturi injection ring 276 can be disposed flush with the outer surface of BTF 200 and then deployed outwardly of BTF 200 when the venturi effect is desired. This construction can be highly advantageous in certain circumstances, e.g., where the venturi injection ring 276 is to be provided on a torpedo which must be launched from a torpedo tube.

In another form of the present invention, a pressurized gas source, connected to small openings 275, can also be used to release gas (and/or liquids) immediately aft of the trailing propeller, whereby to create the desired gaseous envelope for reducing BTF friction.

In yet another form of the invention, a supply of friction-reducing fluid (e.g., detergent) can be connected to the aforementioned small openings 275, whereby to create the desired friction-reducing envelope about BTFs 200.

In another form of the present invention, one or more baffle plates may be provided about some or all of the circumference of BTFs 200 for producing an encompassing gaseous envelope about BTFs 200, whereby to reduce hull friction and thereby increase the speed of the vessel. More particularly, and looking now at FIGS. 15G-15L, in one preferred form of the invention, a baffle plate 700 is mounted to each BTF 200 just aft of the two counter-rotating propellers 265, 270. The baffle plate 700 protrudes into the water coming off the propellers and flowing alongside the BTF and creates a high-pressure zone in front of the baffle plate and a low-pressure zone immediately aft of the baffle plate, whereby to create a dense stream of supercavitated water (e.g., an envelope of gaseous bubbles) immediately aft of the baffle plate. This dense stream of gaseous bubbles enhances the already-supercavitated water coming off the two counter-rotating propellers, whereby to create an enhanced envelope of gaseous bubbles for further reducing hull friction as the trailing portions of the BTF pass through water.

In one form of the invention, baffle plate 700 is a single-piece plate fixed to the BTF, and preferably extends about the entire circumference of the BTF. See FIGS. 15M and 15N.

And in one form of the invention, and looking now at FIGS. 15O, 15P, and 15Q, baffle plate 700 can have a trailing surface characterized by an arcuate (i.e., curved) section 703. Alternatively, the trailing surface of baffle plate 700 can be characterized by a frustoconical section 703.

In another form of the invention, baffle plate 700 is a single-piece plate which is pivotally mounted to the BTF. See FIGS. 15R and 15S. Pivotally mounting baffle plate 700 to the BTF can allow greater or lesser degrees of supercavitation to be created along different portions of the baffle plate and hence different portions of the BTF. By way of example but not limitation, baffle plate 700 may be rotatable so as to create higher degrees of supercavitation (i.e., greater amounts of gaseous bubbles) along the top portion of the BTF (to provide more reduced hull friction for movable struts 300), and lesser degrees of supercavitation (i.e., lesser amounts of gaseous bubbles) along the bottom portion of the BTF (to provide denser water beneath the BTF for better support for the craft). In addition, pivoting of baffle plate 700 may also be used to provide steering or trim (in addition to, or as an alternative to, the aforementioned spoilers 540).

In another form of the invention, baffle plate 700 comprises a multi-part plate, with each portion 700A, 700B, 700C, 700D of the baffle plate being separately movable relative to the BTF (e.g., by actuators 705A, 705B, 705C, 705D). See FIGS. 15T and 15U. The provision of separately movable portions of baffle plate 700 can allow greater or lesser degrees of supercavitation (i.e., greater or lesser amounts of gaseous bubbles) to be created along different portions of the baffle plate (and hence along different portions of the BTF). In addition, separately movable portions of baffle plate 700 can provide steering or trim (in addition to, or as an alternative to, the aforementioned spoilers 540).

If desired, multiple baffle plates 700 can be provided for each BTF 200. See, for example, FIG. 15V, which shows a series of baffle plates 700 arranged along the length of BTF 200.

Figure 15G:
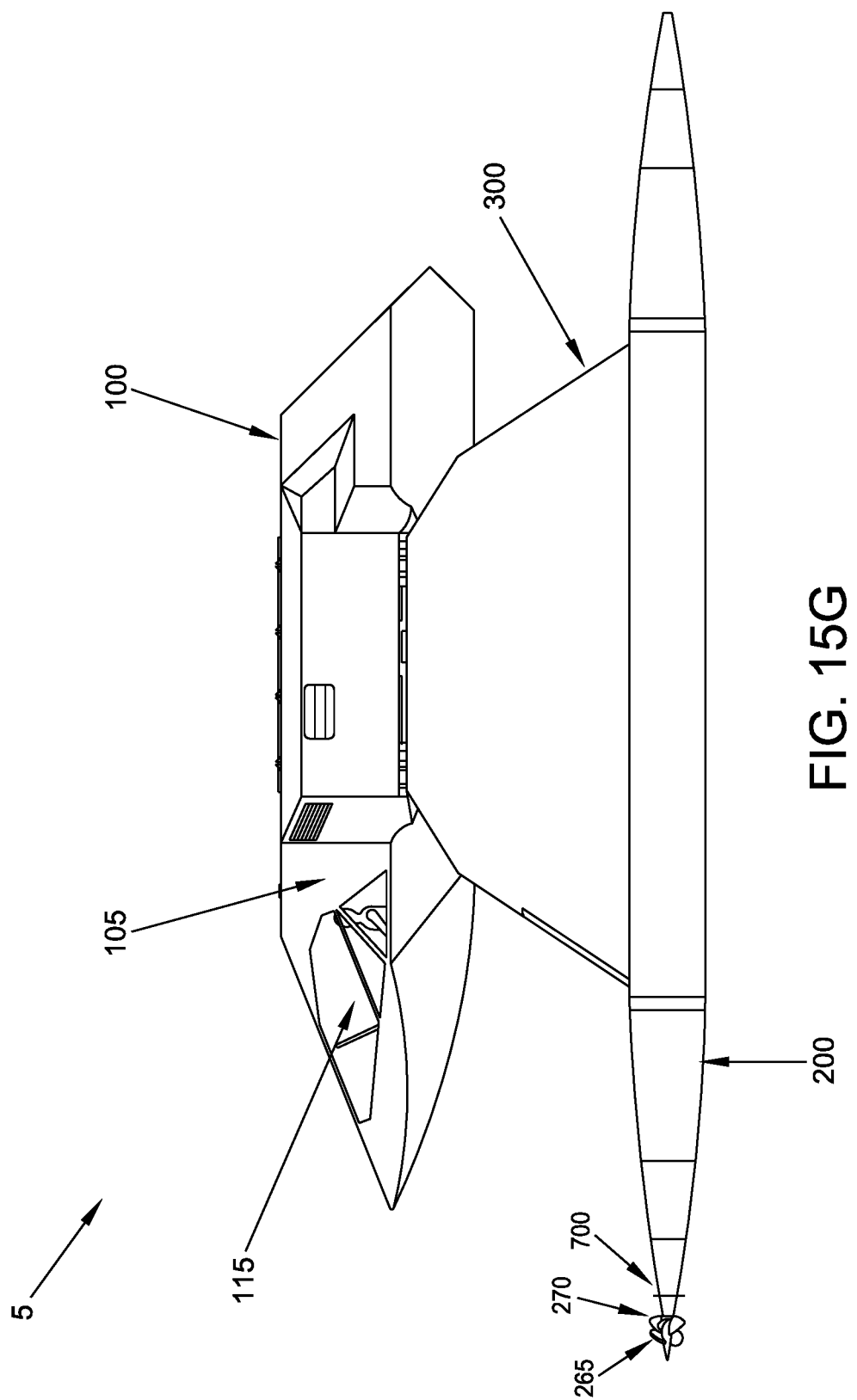
FIGS. 15G-15W are schematic views showing one or more baffle plates provided about the periphery of a BTF for producing an encompassing gaseous envelope about the BTF.
Figure 15H:
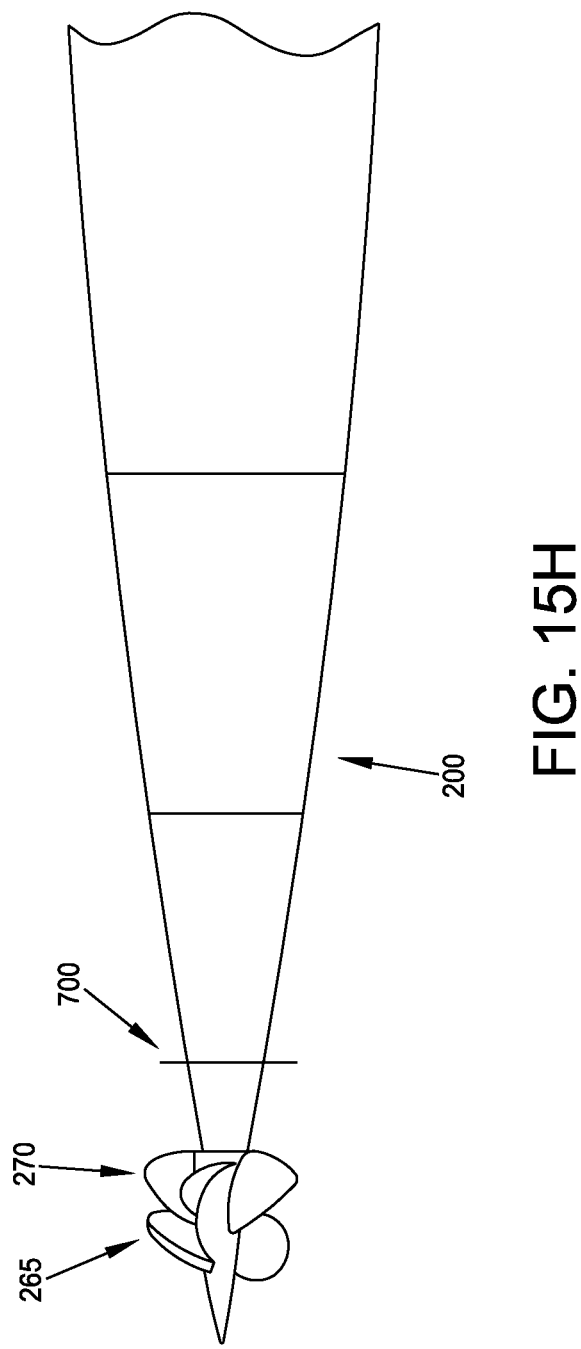
FIGS. 15A and 15B are schematic views showing how a gaseous envelope may be provided around the BTFs so as to reduce drag as the vessel moves through the water.
FIGS. 15X-15Z and 15ZA-15ZD are schematic views showing a baffle plate with means for injecting air (or another fluid) from the trailing surface of the baffle plate.
Figure 15I:
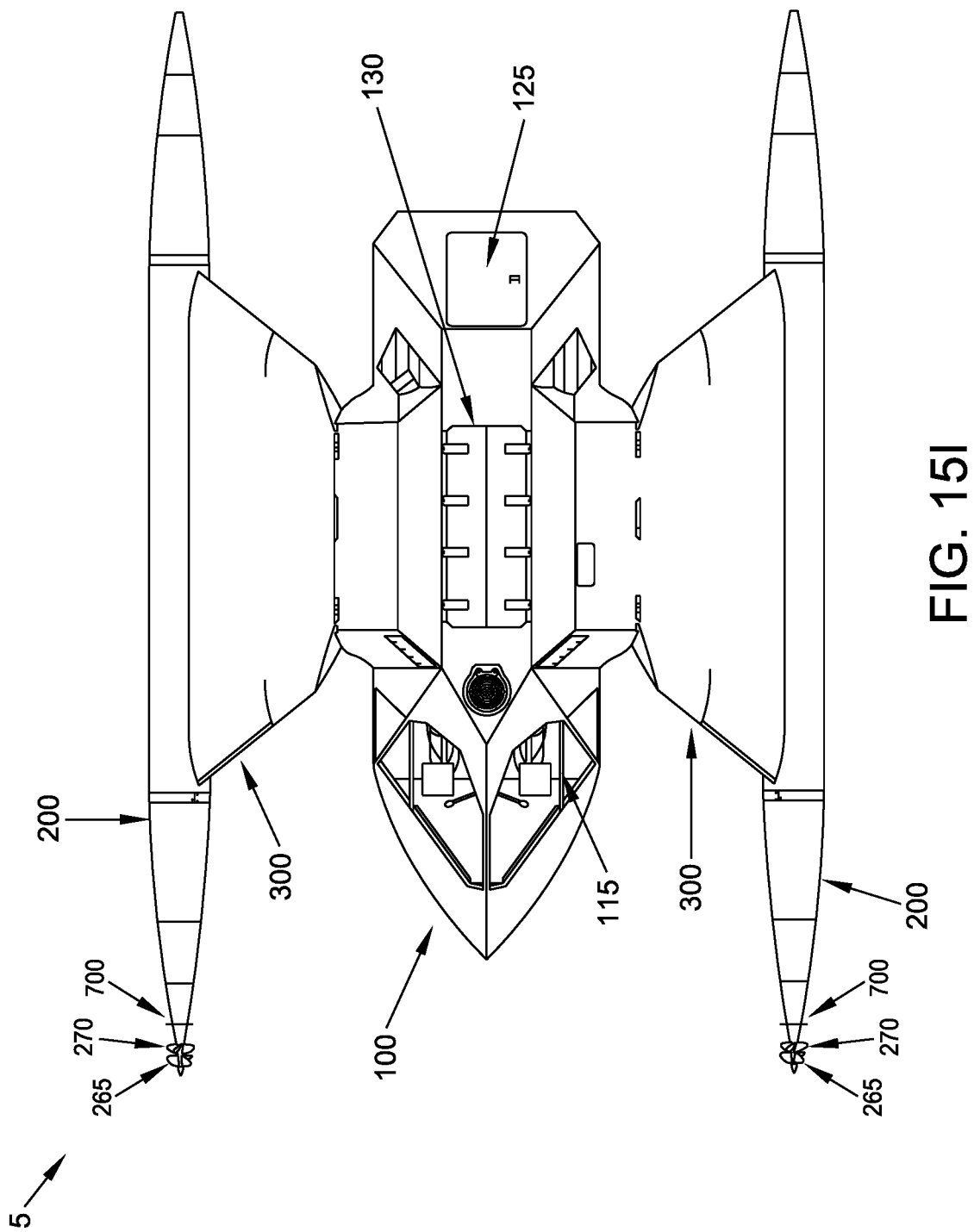
Figure 15J:
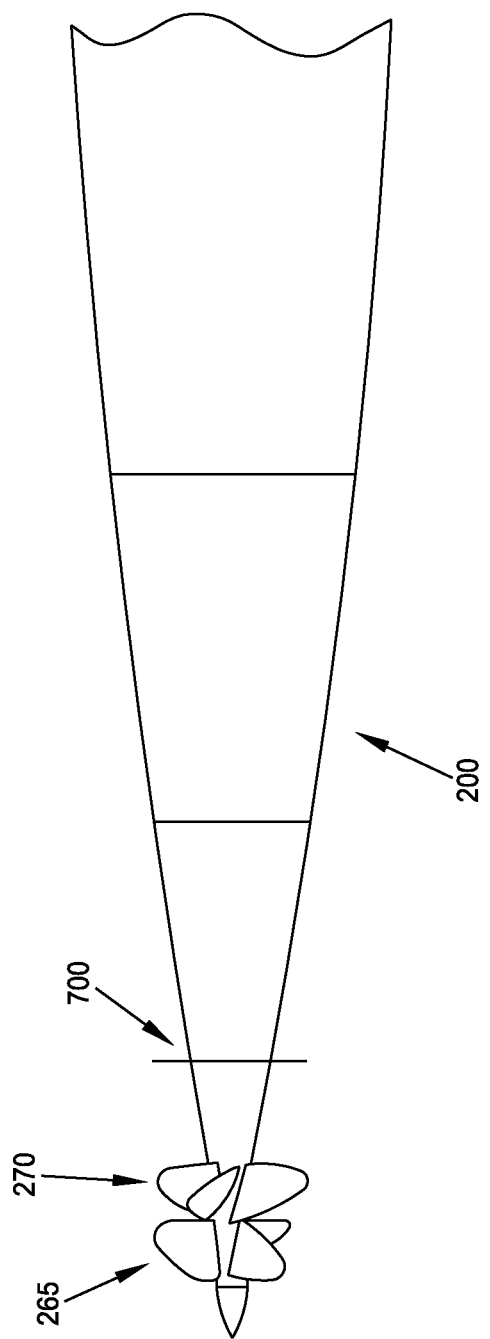
Figure 15K:
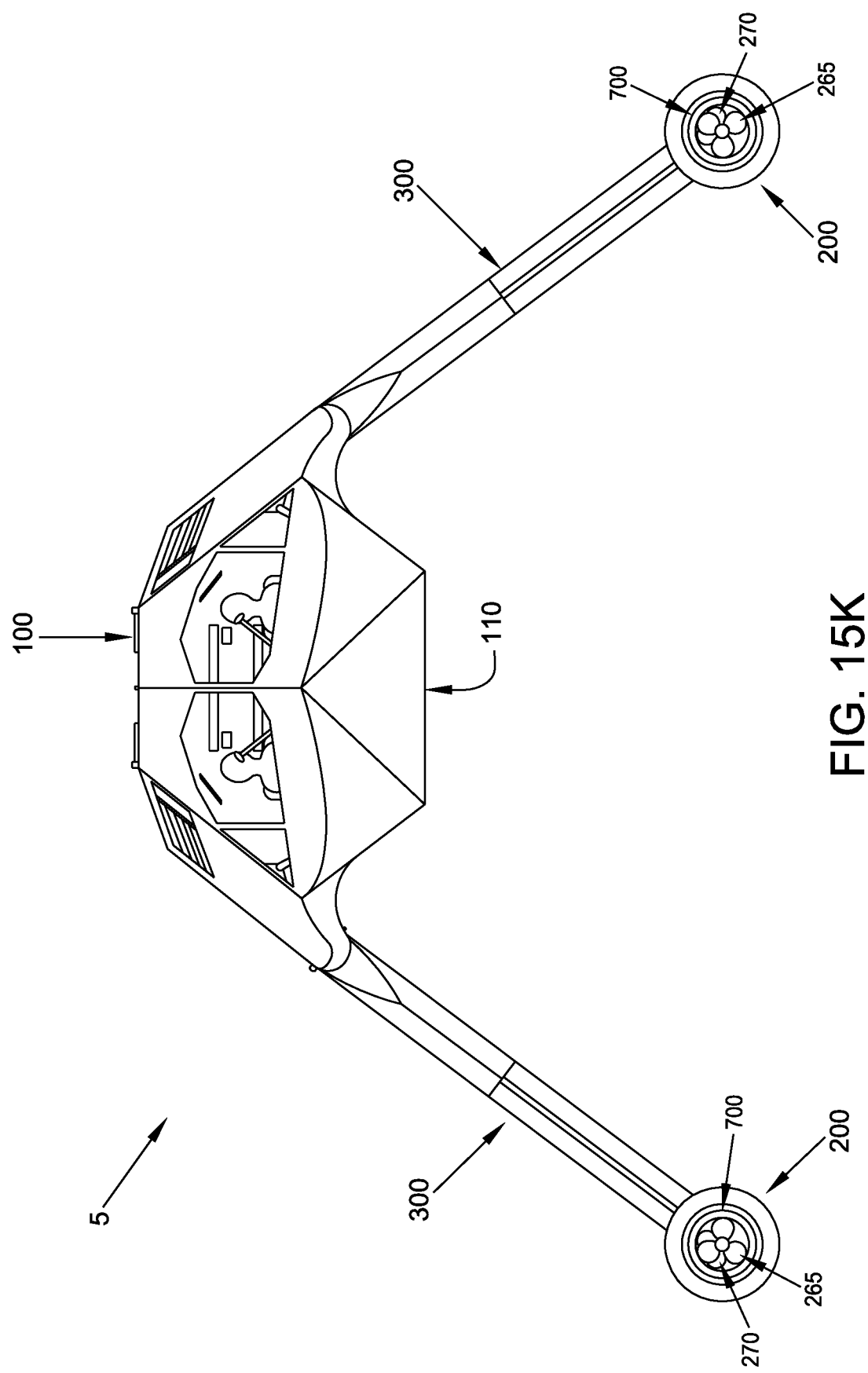
Figure 15N:
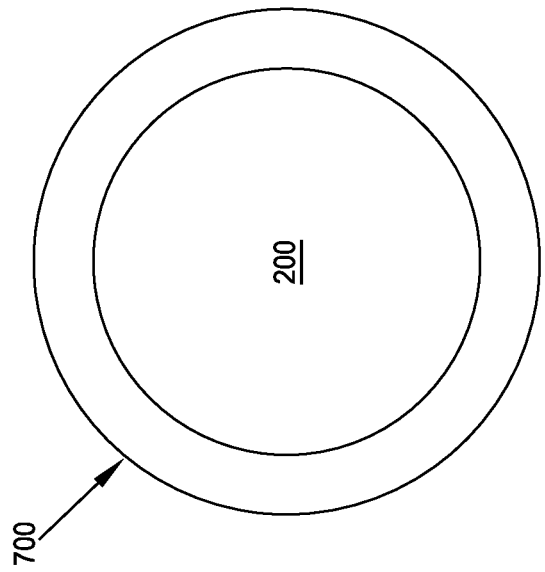
Figure 15M:
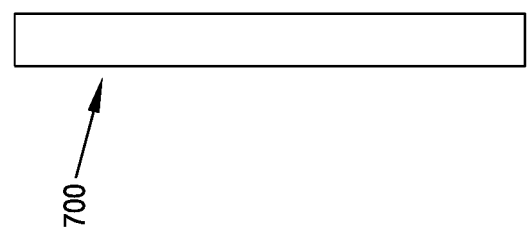
Figure 15U:
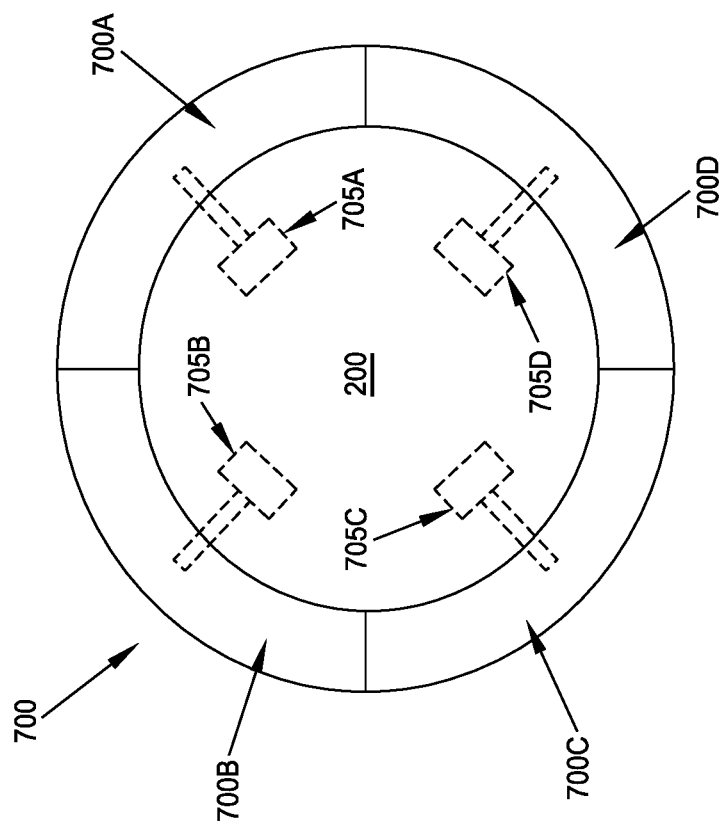
Figure 15T:
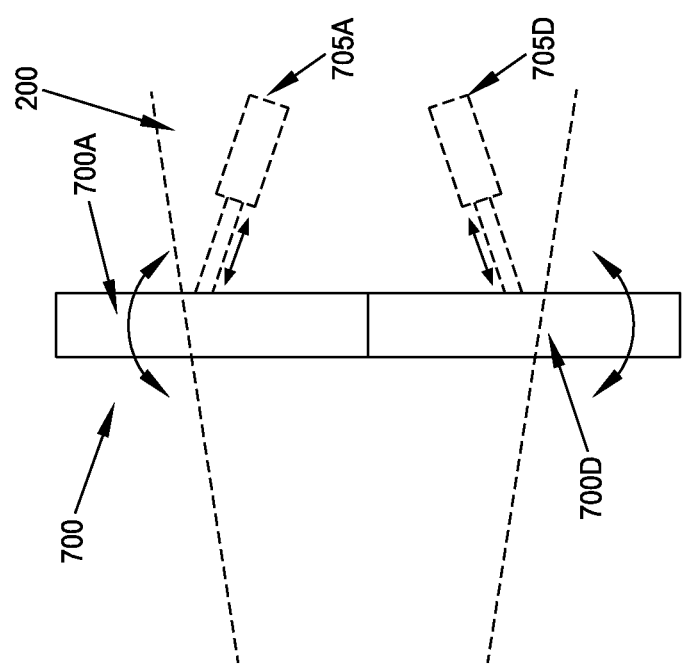
Figure 15V:
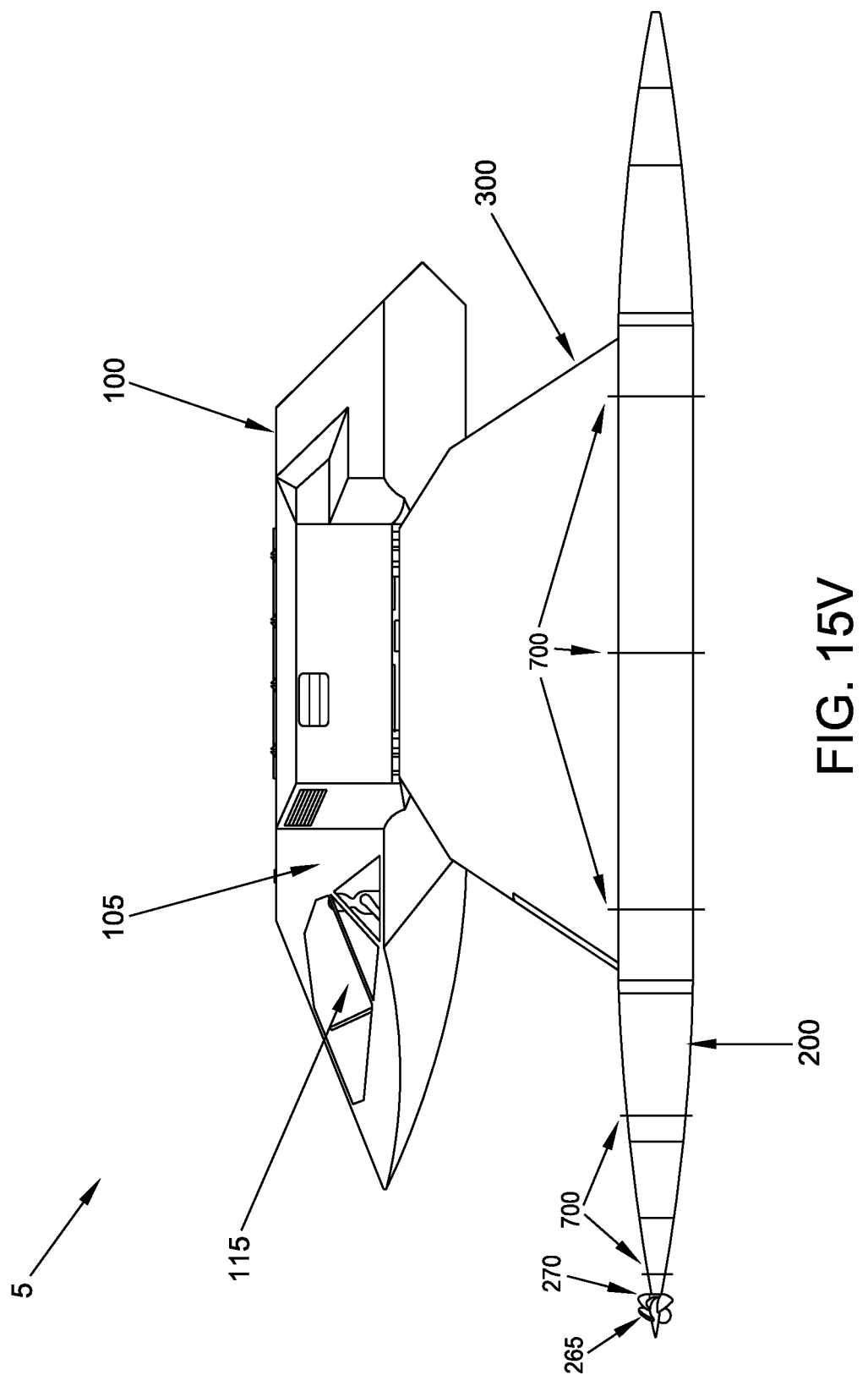
Figure 15W:
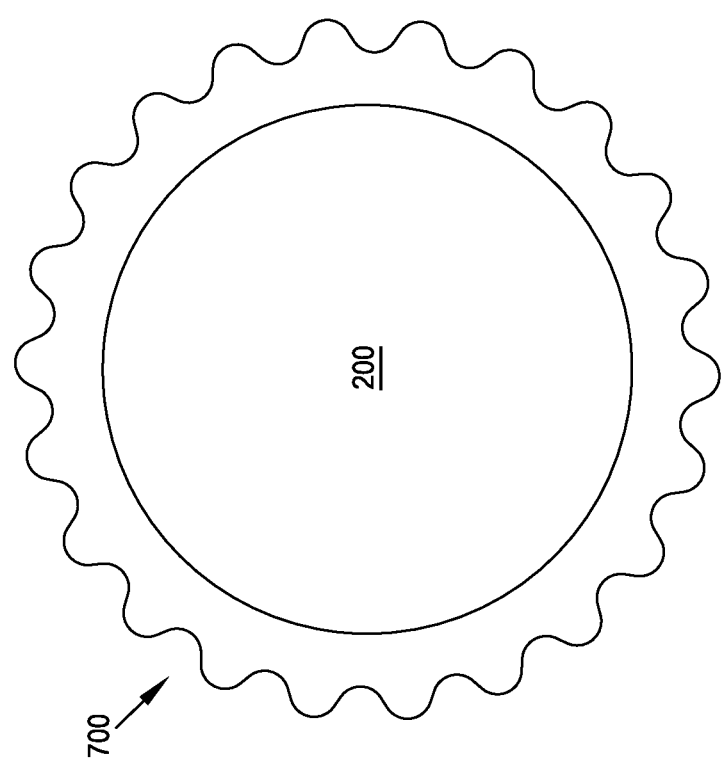

In one form of the invention, the outer perimeter of baffle plate 700 is circular, such as is shown in FIGS. 15G-15V. In another form of the invention, the outer perimeter of baffle plate 700 is corrugated (or serpentine, or comprises a series of peaks and troughs, etc.). See FIG. 15W. Forming the outer perimeter of baffle plate 700 in this manner provides a "corrugated" supercavitation envelope having a less dense boundary layer of non-supercavitated water around the BTF. As a result, because the surface area of the boundary layer between the supercavitated water and the non-supercavitated water has been reduced, if the sidewall of the BTF should encounter the boundary layer of non-supercavitated water, reduced hull friction will result.

Figure 15Y:
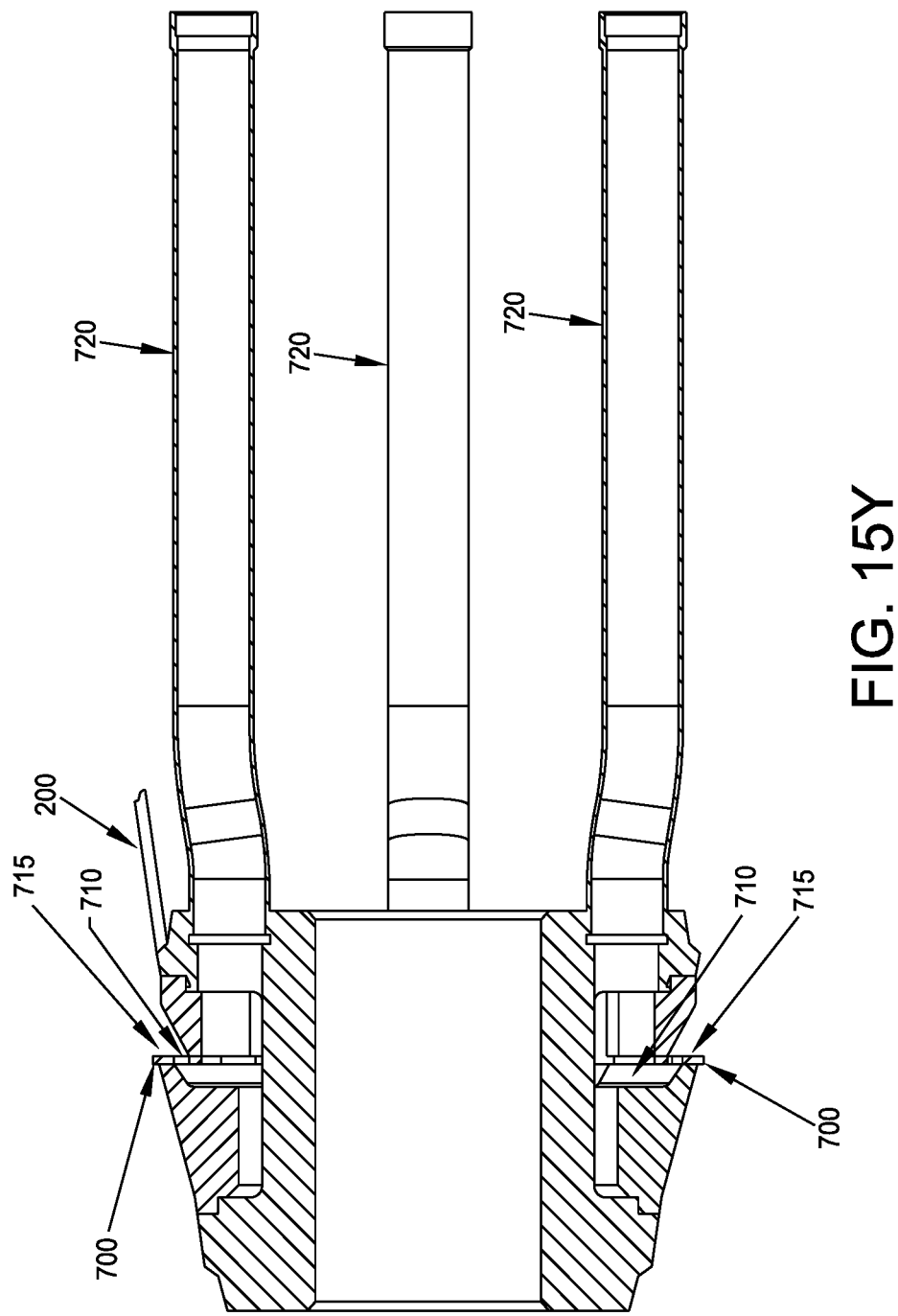
Figure 15Z:
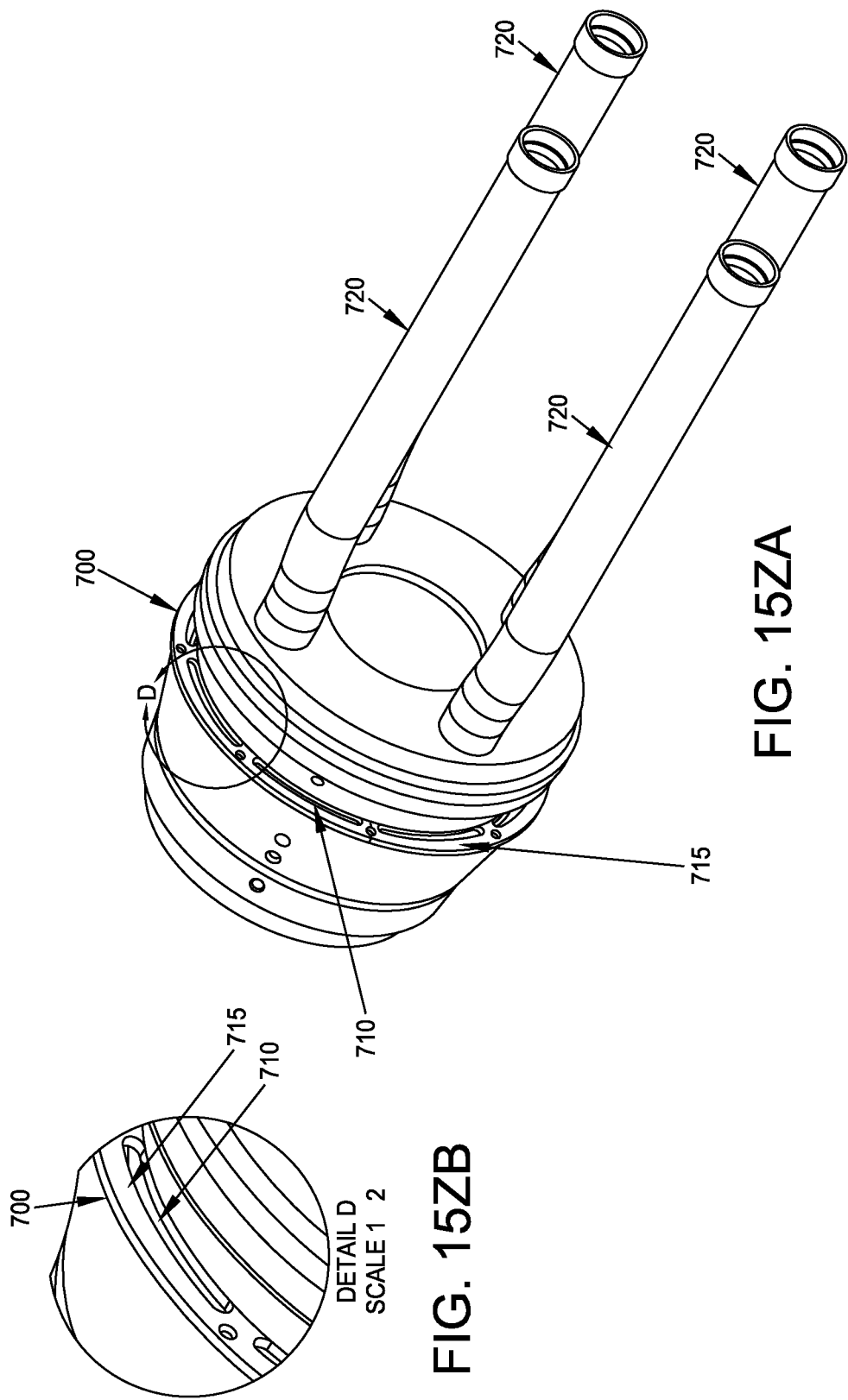
Figure 15Z:
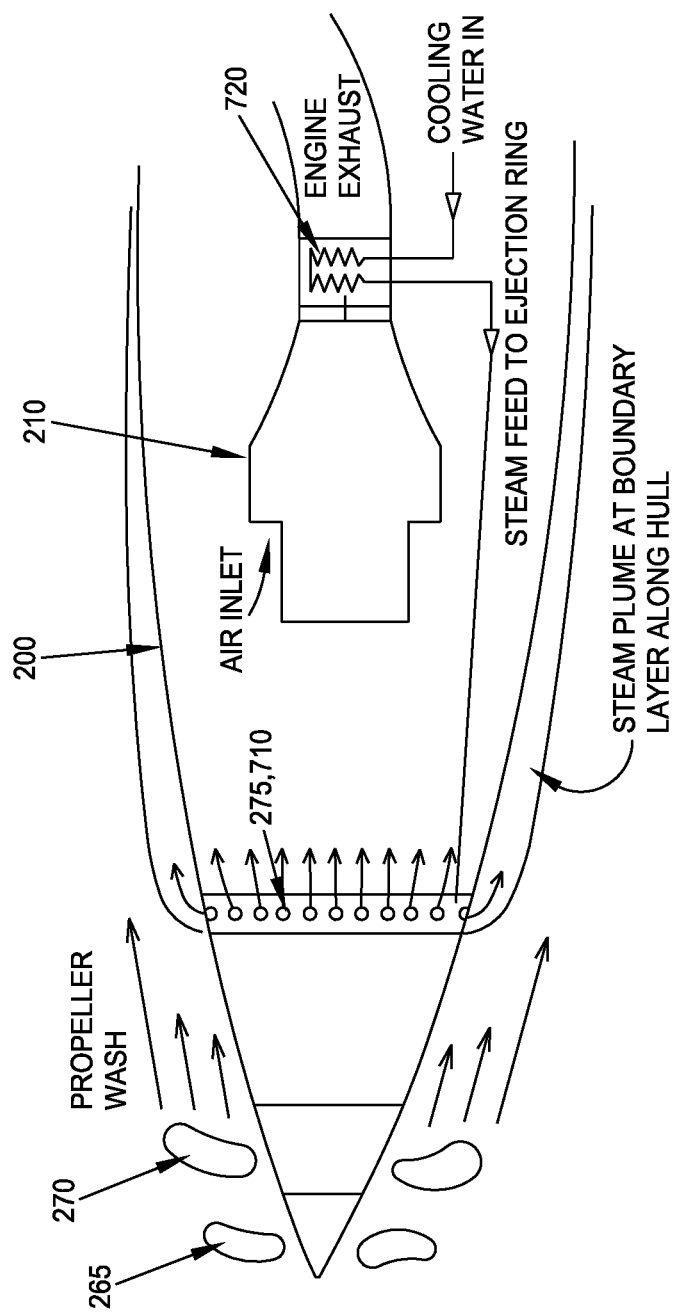
Figure 16:
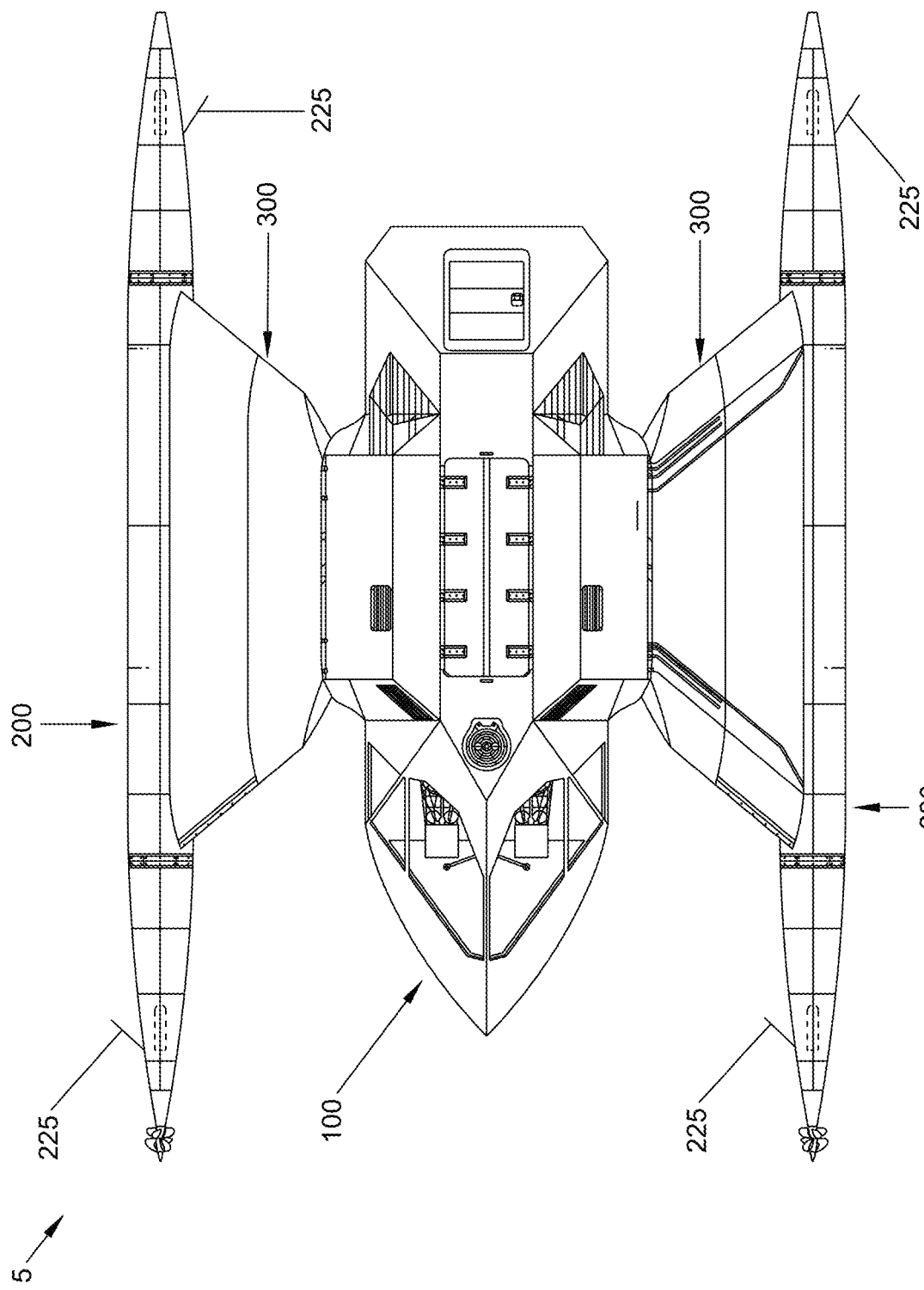
FIGS. 16-26 are schematic views showing further details of the spoilers used to steer the novel attack craft and adjust its attitude.
Figure 17:
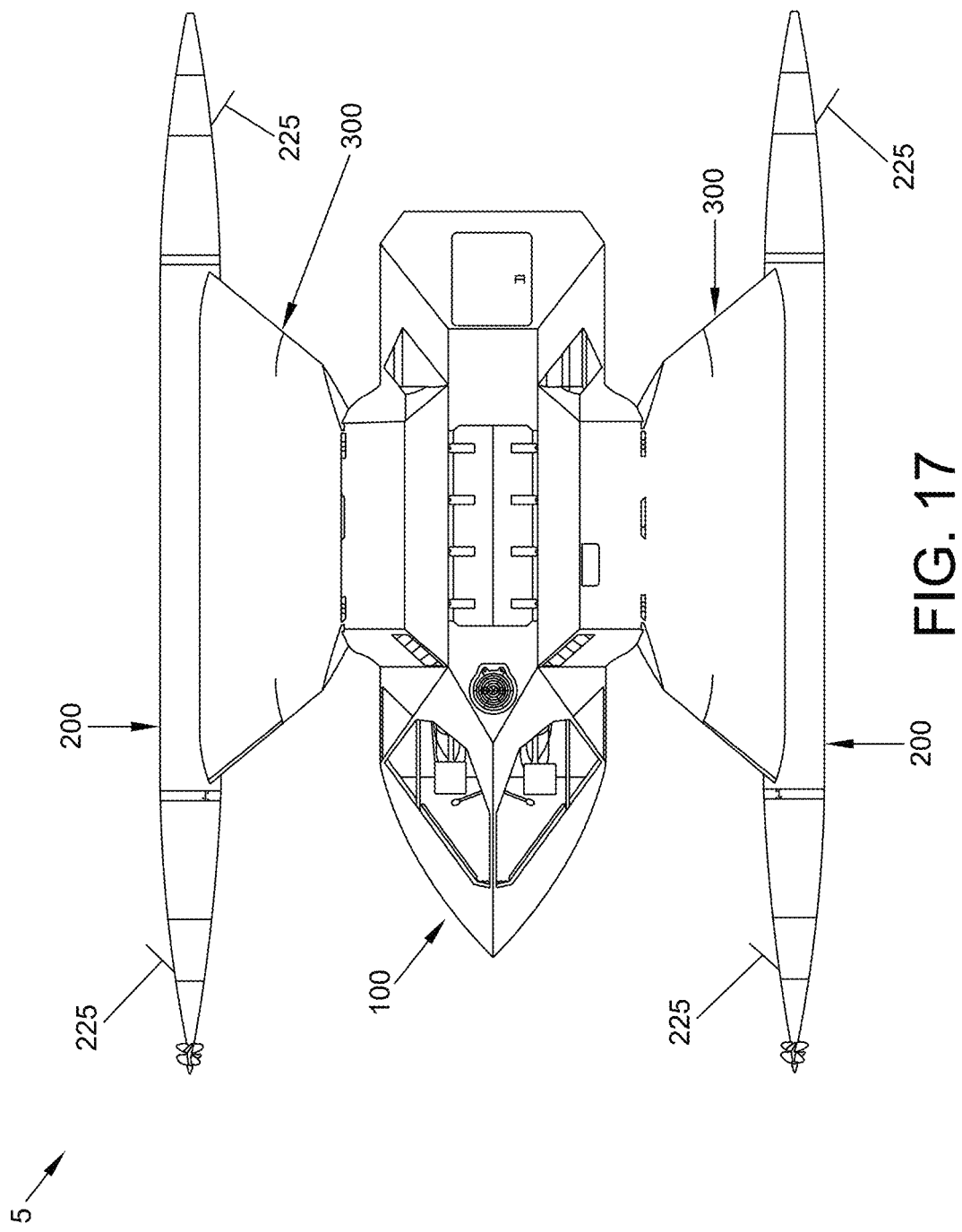
Figure 18:
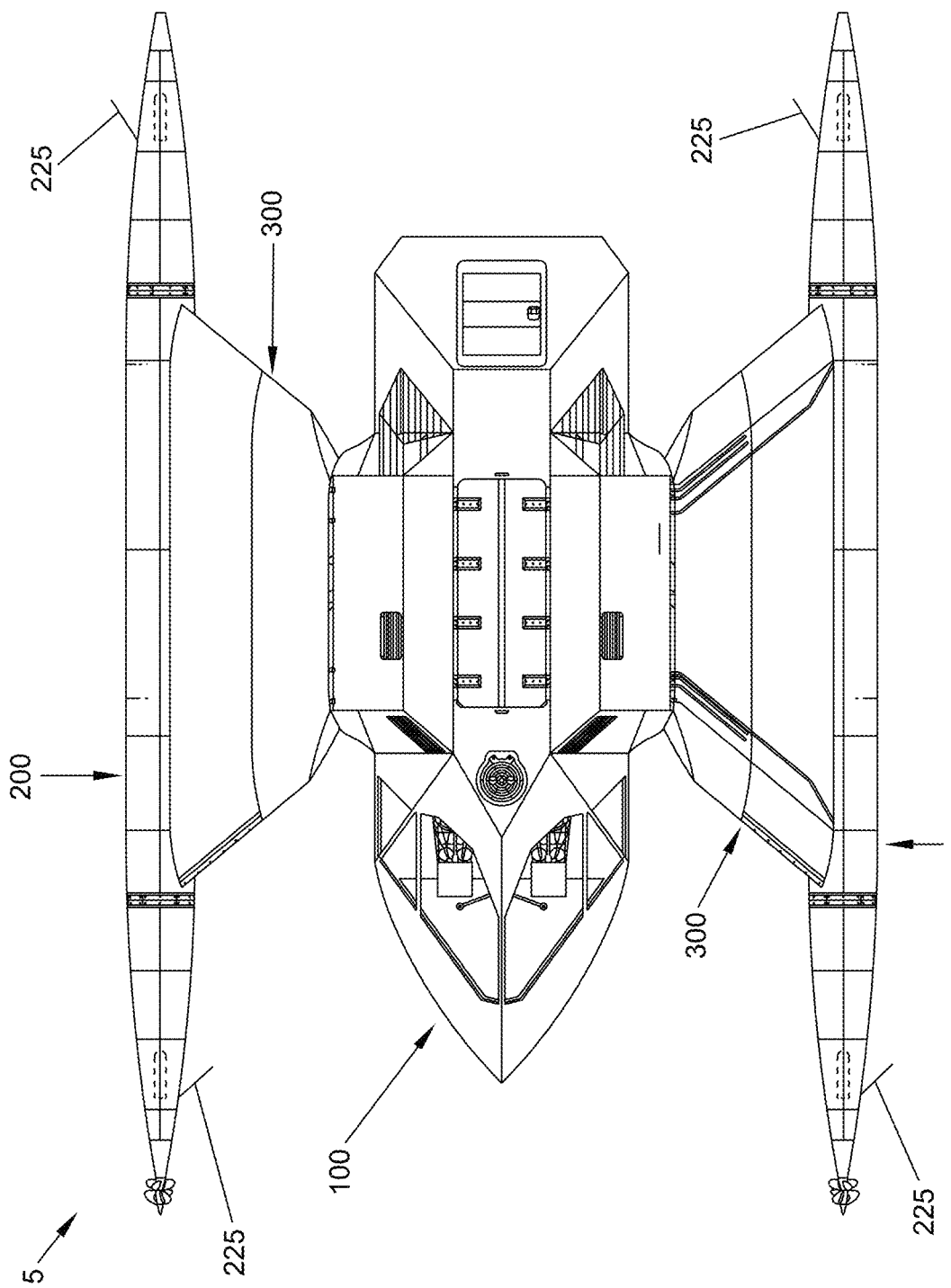
Figure 19:
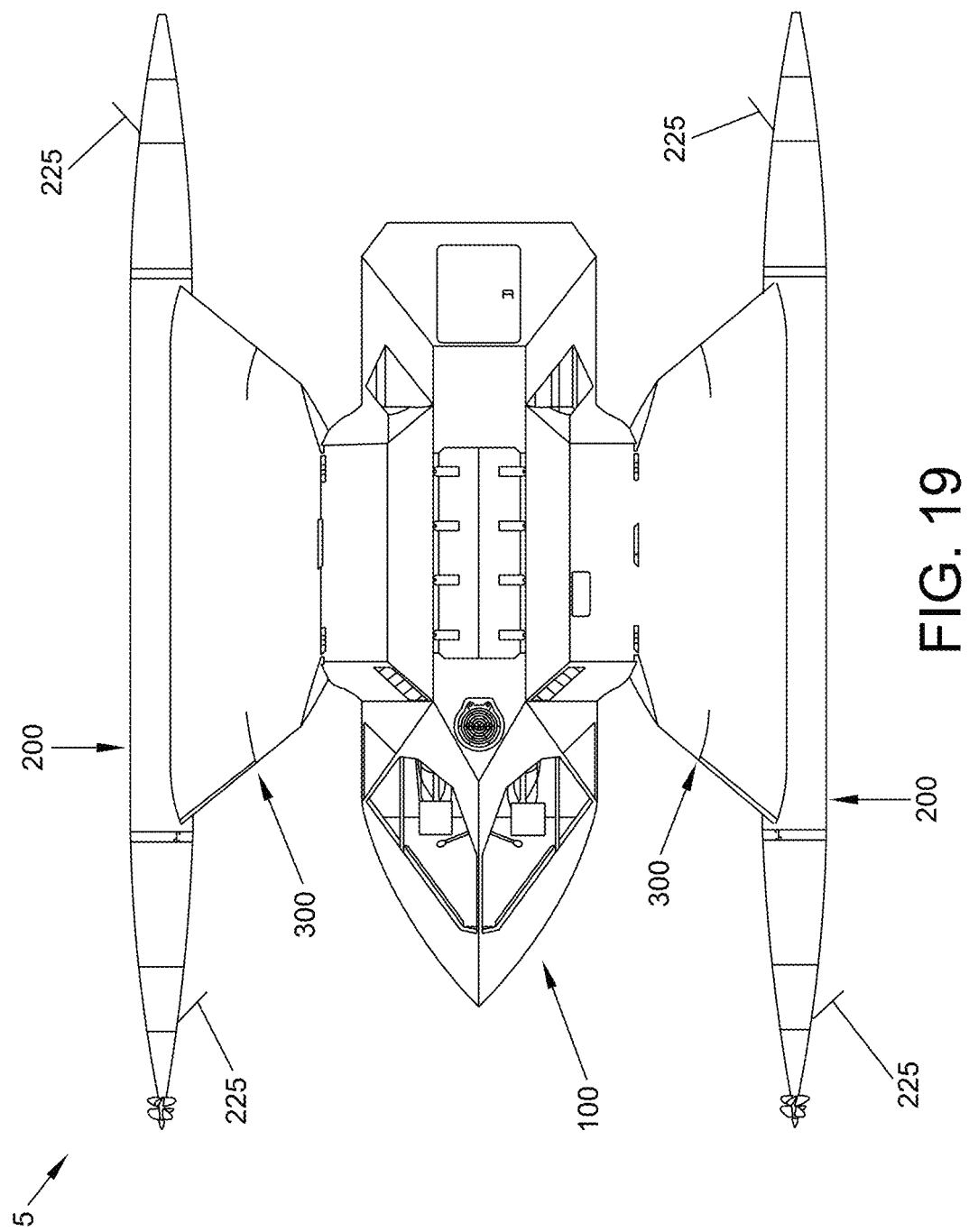
Figure 20:
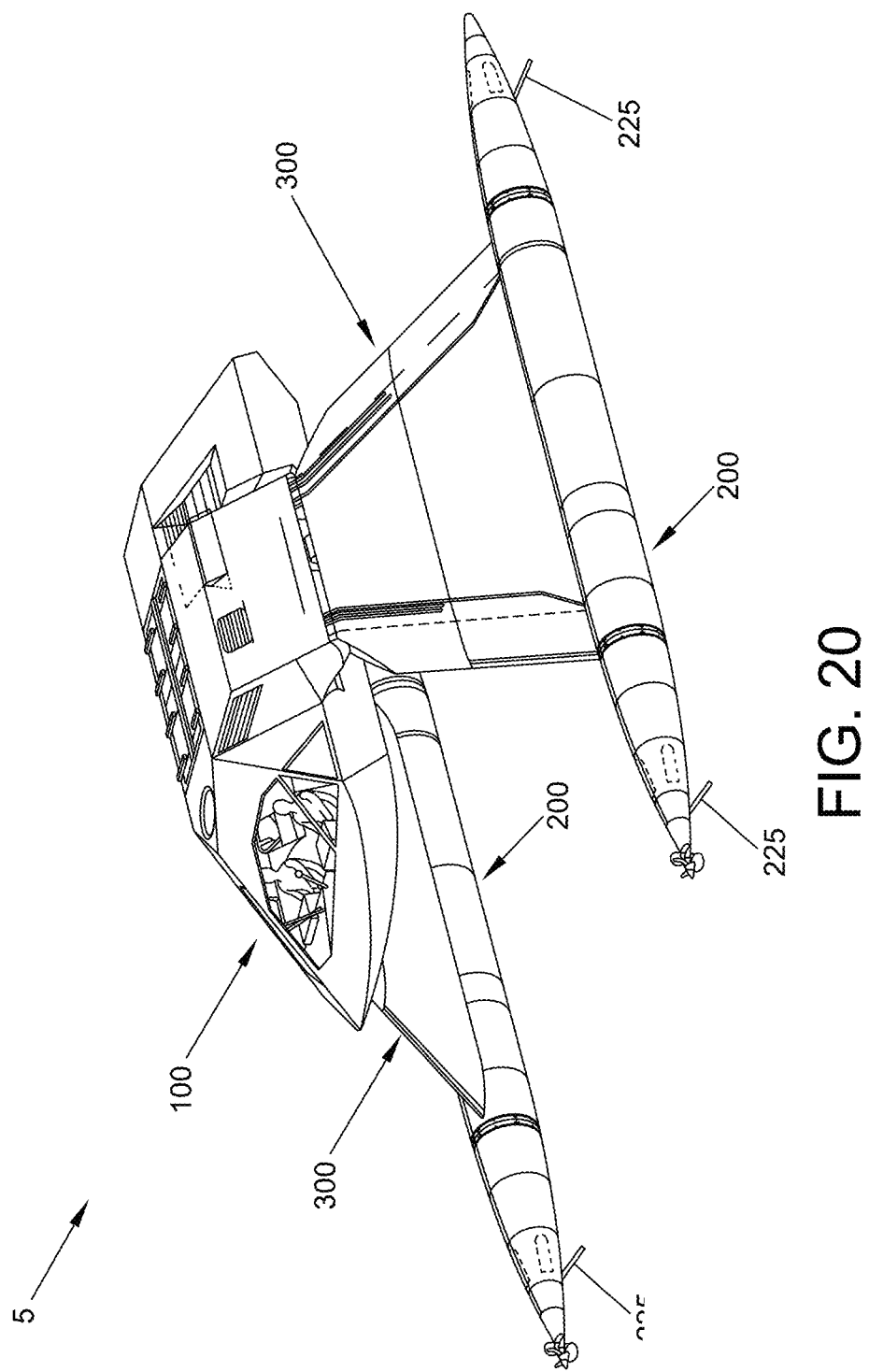
Figure 21:
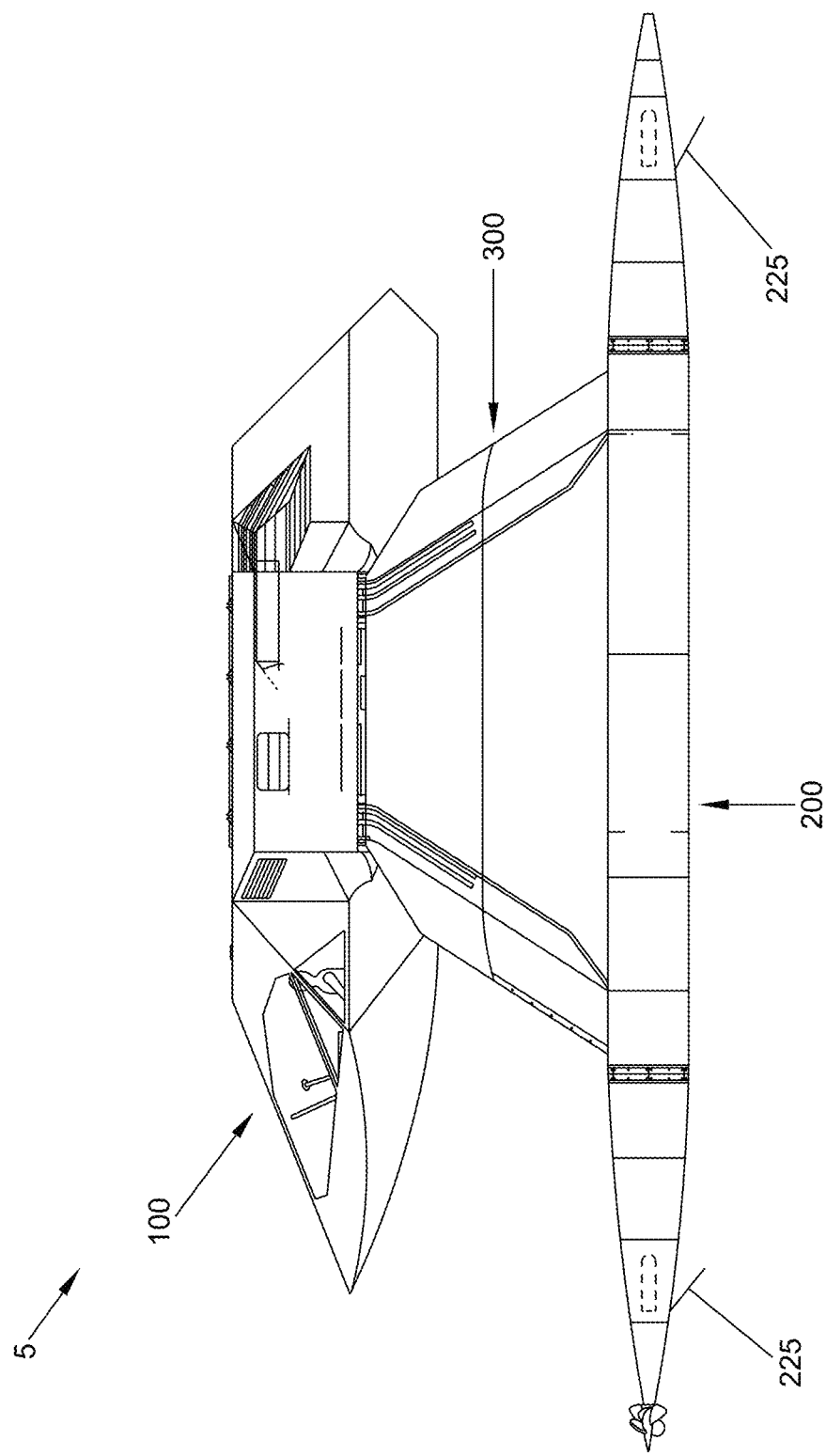
Figure 22:
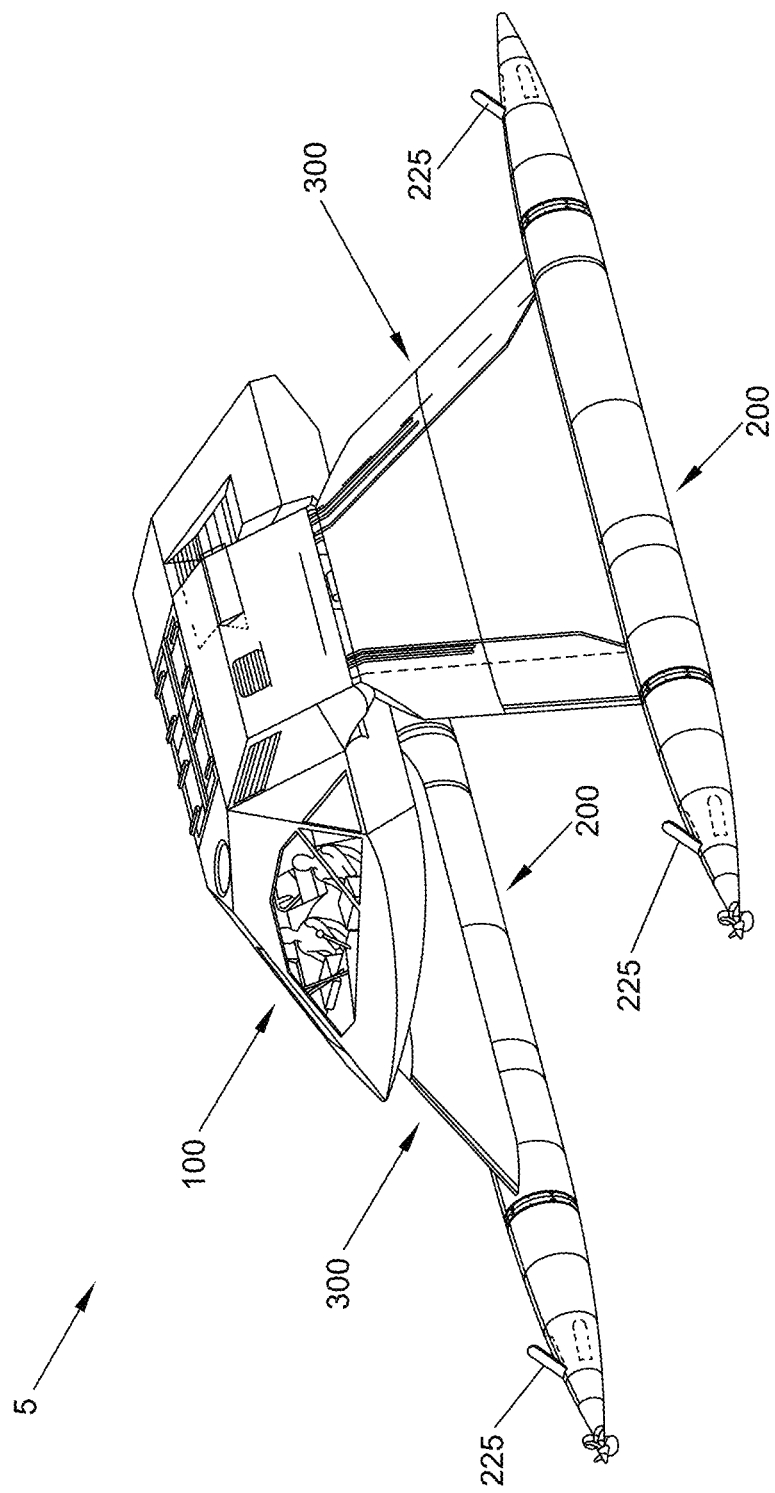
Figure 23:
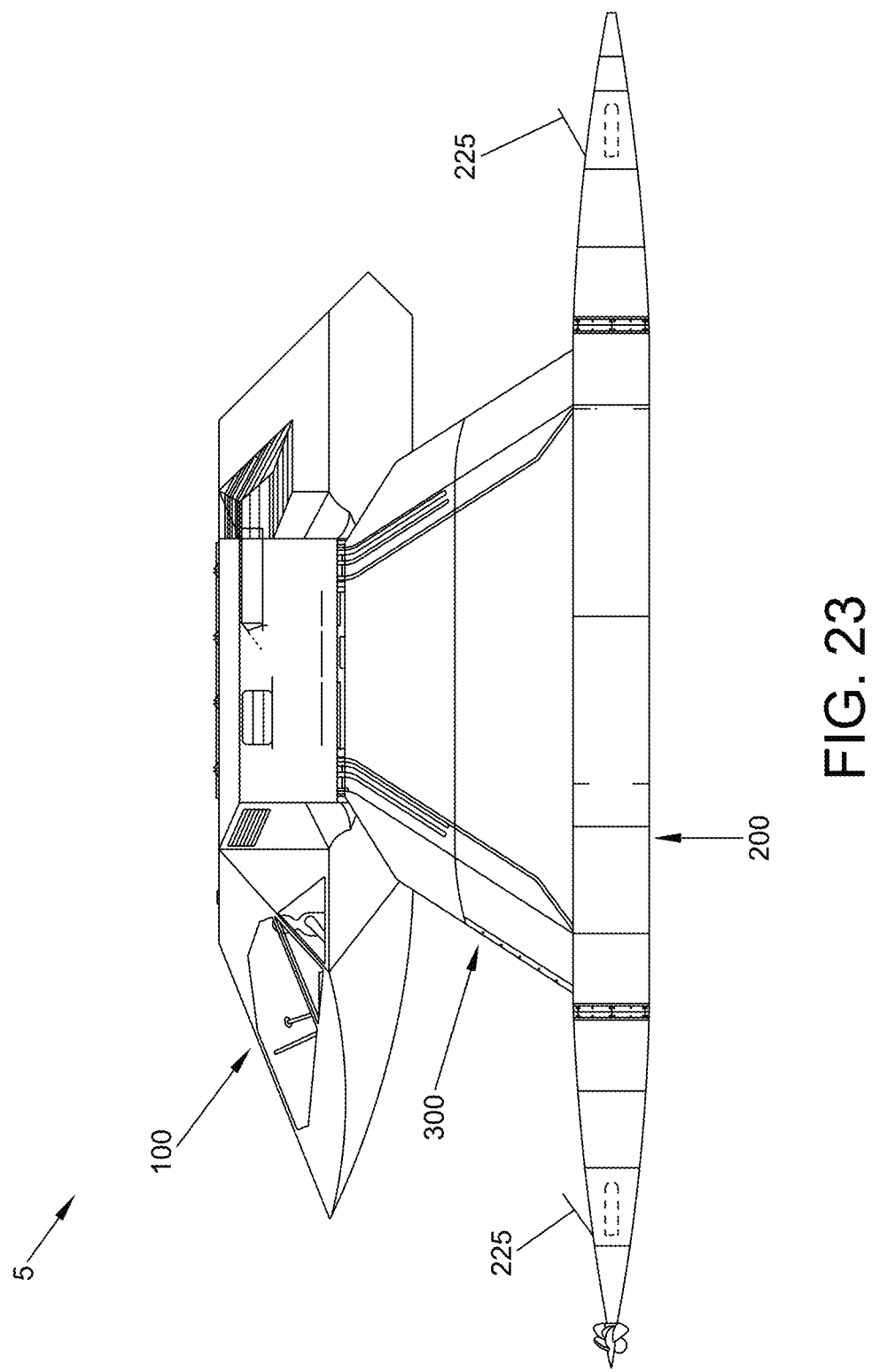

If desired, and looking now at FIGS. 15X-15Z and 15ZA-15ZD, baffle plate 700 may be provided with means for ejecting air from the aft surface of the baffle plate. More particularly, in this form of the invention, one or more grooves 710 may be formed in the aft surface 715 of baffle plate 700. An air line 720 may be used to deliver air to grooves 715, whereupon the air is released into the gaseous envelope produced by baffle plate 700, thereby enhancing the gaseous envelope and further reducing hull friction as the trailing portions of the BTF pass through the gaseous envelope. As seen in FIGS. 15ZC and 15ZD, grooves 710 may be provided about the entire perimeter of baffle plate 700 (FIG. 15ZC) or about only a portion of the perimeter of baffle plate 700 (FIG. 15ZD). If desired, a fluid other than air (e.g., another gas or a liquid) may be ejected from grooves 710.

As will hereinafter be discussed, BTF 200 may also be used as the hull of a submarine, or as the hull of a torpedo, or as the hull of an unmanned drone, etc. In this respect it should be appreciated that the baffle plate 700 may be utilized on these craft as well so as to enhance the supercavitation effect used to reduce hull friction.

Furthermore, it should be noted that, if desired, the baffle plate 700 may be used on submerged surfaces of substantially any water craft, including water craft using rear propulsion means such as rear propellers, rear water jets, etc., so as to reduce hull drag and increase the speed of the craft. By way of example but not limitation, the baffle plate 700 may be used on a rear propulsion SWATH vessel, a rear propulsion submarine, a rear propulsion torpedo, a rear propulsion unmanned drone, etc.

And, if desired, baffle plate 700 can be movable relative to BTF 200 such that baffle plate 700 can be disposed flush with the outer surface of BTF 200 and then deployed outwardly when the baffle effect is desired. This construction can be highly advantageous in certain circumstances, e.g., where the baffle plate 700 is to be provided on a torpedo which must be launched from a torpedo tube.

In one preferred form of the present invention, each BTF 200 is provided with (i) two counter-rotating propellers 265, 270 which generate a gaseous envelope about the perimeter of the BTF, (ii) at least one venturi injection ring disposed aft of the two counter-rotating propellers 265, 270 which generates an additional gaseous envelope which supplements and enhances the gaseous envelope produced by the two serially-mounted, counter-rotating propellers on the front end of BTFs 200, and (iii) at least one baffle plate 700 disposed aft of the two counter-rotating propellers 265, 270 which generates an additional gaseous envelope which also supplements and enhances the gaseous envelope produced by the two serially-mounted, counter-rotating propellers on the front end of BTFs 200.

In one preferred form of the invention, the at least one venturi injection ring 276 is disposed aft of the two counter-rotating propellers 265, 270 and in front of the at least one baffle plate 700, in which case the gaseous envelope produced by the at least one venturi injection ring 276 supplements and enhances the gaseous envelope produced by the two serially-mounted, counter-rotating propellers 265, 270 on the front end of BTFs 200, and the gaseous envelope produced by the at least one baffle plate 700 supplements and enhances the gaseous envelope produced by the two serially-mounted, counter-rotating propellers 265, 270 and the gaseous envelope produced by the at least one venturi injection ring 276.

In another preferred form of the invention, the at least baffle plate 700 is disposed aft of the two counter-rotating propellers 265, 270 and in front of the at least one venturi injection ring 276, in which case the gaseous envelope produced by the at least one baffle plate 700 supplements and enhances the gaseous envelope produced by the two serially-mounted, counter-rotating propellers 265, 270 on the front end of BTFs 200, and the gaseous envelope produced by the at least one venturi injection ring 276 supplements and enhances the gaseous envelope produced by the two serially-mounted, counter-rotating propellers 265, 270 and the gaseous envelope produced by the at least one baffle plate 700.

In the foregoing disclosure, openings 275 (FIG. 15B) are provided for releasing air just aft of the trailing propeller, whereby to create an even more dense gaseous envelope for reducing BTF friction. As noted above, a venturi injection ring 276 may be disposed about openings 275 so as to enhance the release of air about the perimeter of BTF 200. Furthermore, grooves 710 may be formed in the aft surface 715 of baffle plate 700 so as to release air just aft of the baffle plate, whereby to create an even more dense gaseous envelope aft of baffle plate 700. The air provided to openings 275 and/or grooves 710 may be ambient air (acquired via air intakes adjacent the command module or struts, or by snorkels extending upward from BTFs 200). Alternatively, and looking now at FIG. 15ZE, gas turbine engine 210 may be equipped with a heat exchanger 725 such that cooling water introduced into heat exchanger 725 can be turned into steam which is then ejected from openings 275 and/or grooves 710, whereby to enhance the gaseous envelope coming off the two counter-rotating propellers 265, 270 and/or venturi injection ring 276 and/or baffle plate 700. In this respect it should be appreciated that releasing steam from openings 275 and/or grooves 710 is highly desirable, inasmuch as the steam is at a temperature and pressure significantly higher than the water flowing past BTF 200 and hence provides a more robust gaseous envelope.

Rudderless System

Conventional rudders are continuously deployed in the water, so that they create friction and drag not only when being manipulated so as to change the direction of the vessel, but also under normal operating conditions. This friction and drag has a substantial detrimental effect on the speed of the vessel.

In contrast, and looking now at FIGS. 16-26, attack craft 5 provides forward and aft steering elements (or spoilers) 225 that are projectable from, and retractable into, the outer skin of hollow tubular structure 205. In this respect it should be appreciated that each of the spoilers 225 can be projected an adjustable amount outboard from hollow tubular structure 205. Furthermore, command module 100 can be provided with various control systems which permit each of the spoilers 225 to be operated in a coordinated fashion or, if desired, independently from one another.

In one preferred form of the invention, sixteen spoilers 225 are provided: four spoilers 225 at the front of each BTF 200 and four spoilers 225 at the rear of each BTF 200, with spoilers 225 being disposed at the "12 o'clock", "3 o'clock", "6 o'clock", and "9 o'clock" positions. This arrangement allows spoilers 225 to apply left, right, up and/or down forces (or any combination thereof) to the front and/or rear of each of the BTFs 200 while attack craft 5 is underway.

Spoilers 225 provide numerous significant advantages over conventional rudders.

For one thing, spoilers 225 provide substantially no drag when the vessel is underway and no directional changes are needed—this is because the spoilers then reside flush with the outer skins of hollow tubular structures 205. Spoilers 225 impose drag on the vessel only when they are extended outwardly from the skins of hollow tubular structures 205, whereby to provide the forces necessary to maneuver the vessel—and they are thereafter returned to their inboard (i.e., flush, and no-drag) positions as soon as the maneuver is completed and the vessel returns to standard forward motion.

Additionally, and significantly, the provision of spoilers 225 on the fore and aft portions of hollow tubular structures 205 permits the application of more dramatic turning forces. More particularly, by setting a fore spoiler to turn in one direction and a corresponding aft spoiler to turn in the opposite direction, significant turning forces can be quickly and easily applied to the vessel using spoilers of relatively modest size. Thus, course corrections can be effected quickly, making the vessel extremely agile, while permitting the turning friction of the spoilers to be applied only for short durations.

Figure 24:
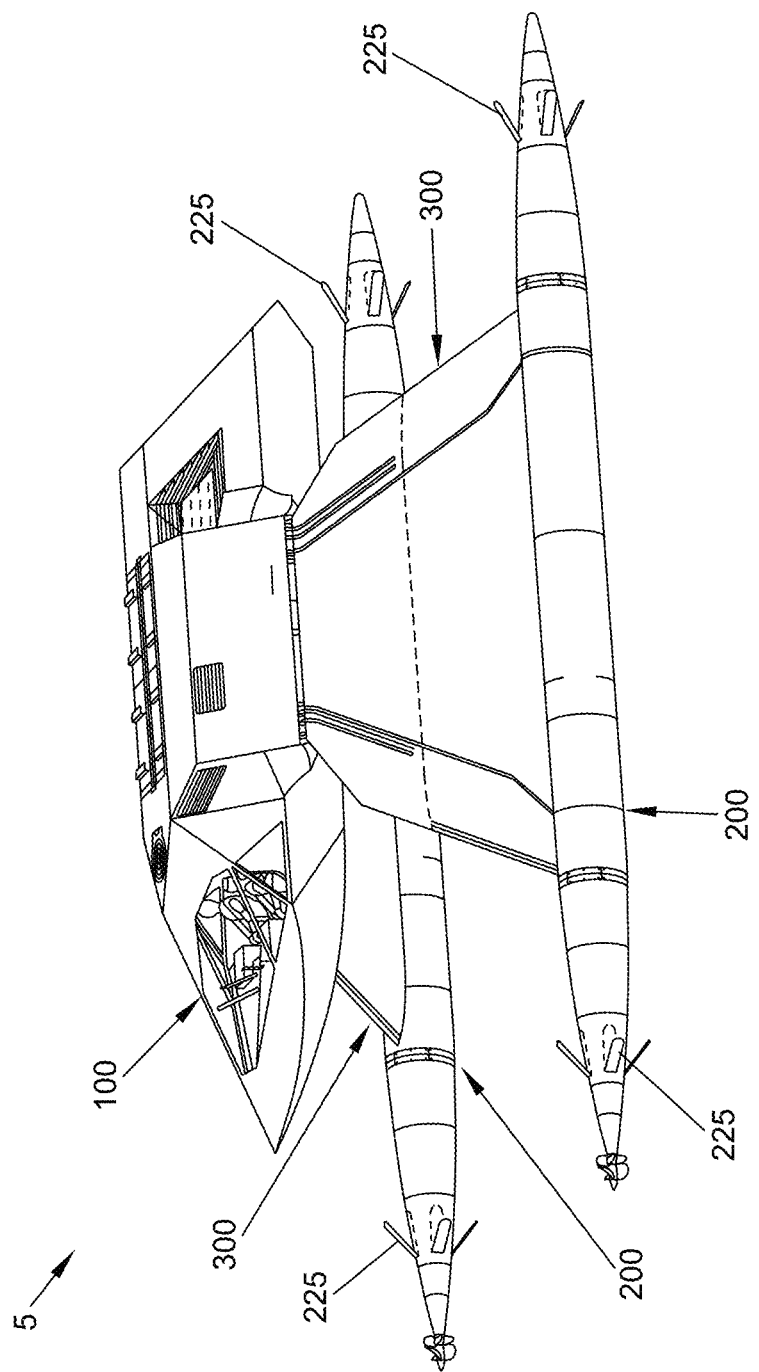
Figure 25:
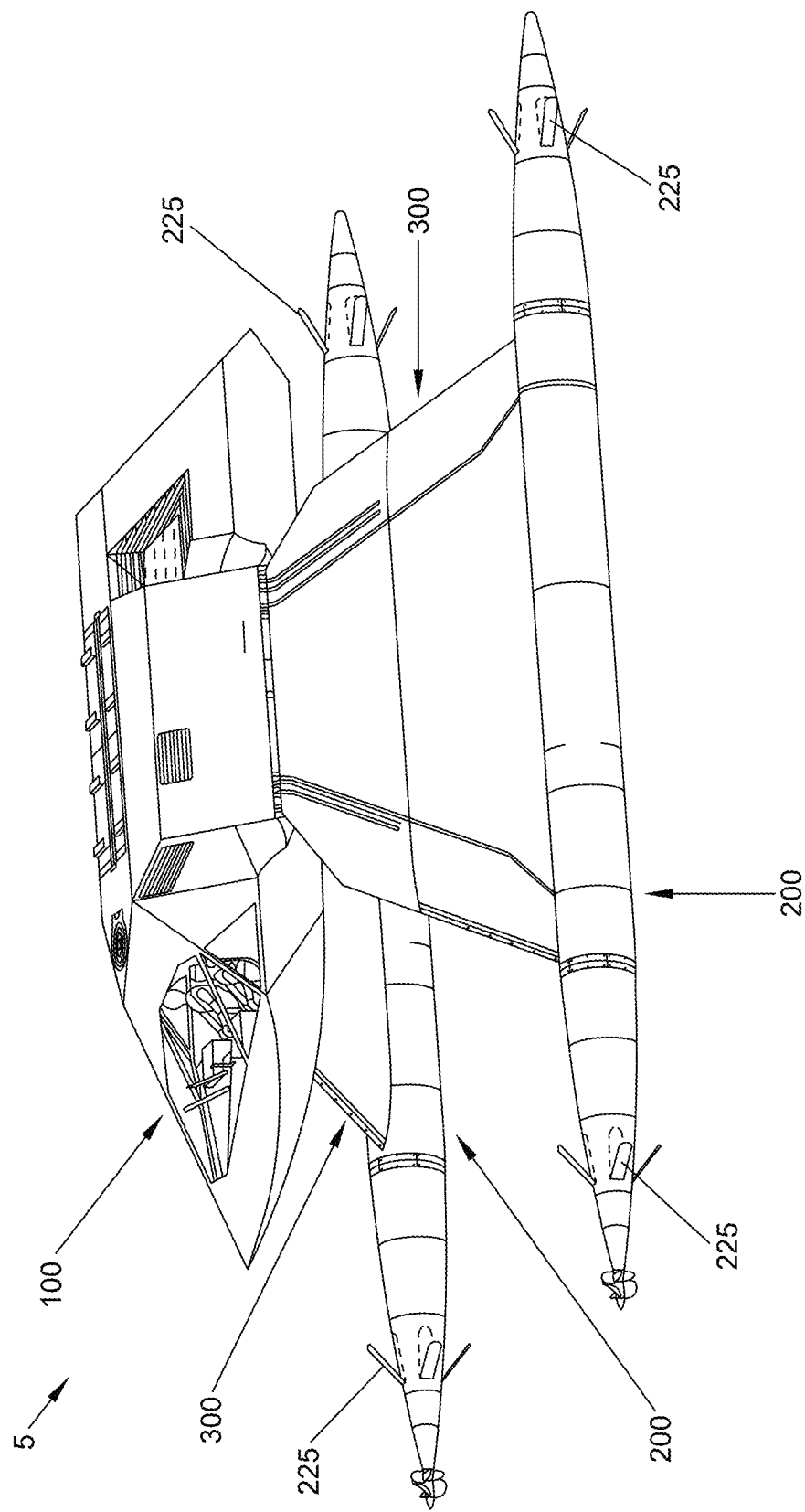
Figure 26:
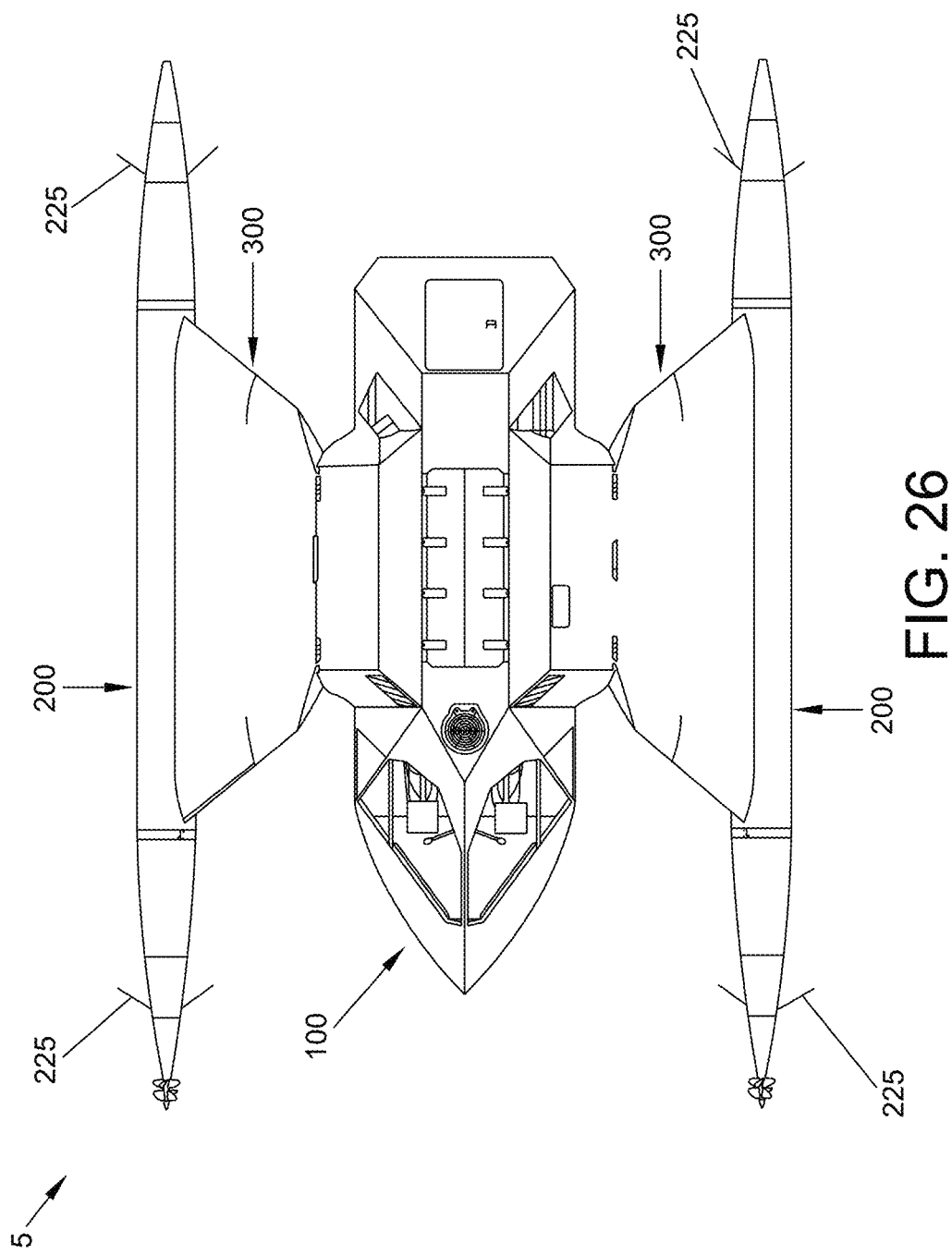

Spoilers 225 can be used for turning left or right (see FIGS. 16-19), for adjusting the trim (i.e., the up/down attitude) of the vessel (see FIGS. 20-23), and/or to enhance deceleration of the vessel (see FIGS. 24-26).

Spoilers 225 can be flush plates that protrude from the outer skins of hollow tubular structures 205 and cause friction when needed to change direction. Alternatively, spoilers 225 can be made of an elastomeric material that can be inflated with air, fluids, etc. and which protrude from the outer skins of hollow tubular structures 205.

Fuel Tanks 220

Fuel tanks 220 are housed inside BTFs 200, preferably in the center section 230. Fuel tanks 220 preferably comprise double-walled tanks made of a flexible bladder material (e.g., a flexible bladder disposed inside another flexible bladder). This arrangement allows for a fluid (e.g., seawater) to be pumped into the outer bladder in order to compensate for the consumption of fuel from within the inside bladder, thereby ensuring that the buoyancy of the attack craft remains constant.

Center of Gravity

The center of gravity for attack craft 5 is intended to be as low as possible, in order to maximize vessel stability. This is achieved by positioning heavy components such as engines 210 and fuel tanks 220 within the BTFs, thereby lowering the vessel's center of gravity so as to be as close as possible to the midline of the BTFs. In this respect it will be appreciated that turbine engines 210 and fuel tanks 220 constitute approximately ⅔ of the total vessel weight and, due to the construction of attack craft 5, this weight is disposed entirely below the waterline. This leads to enhanced vessel stability.

Connecting Struts 300

Figure 27:
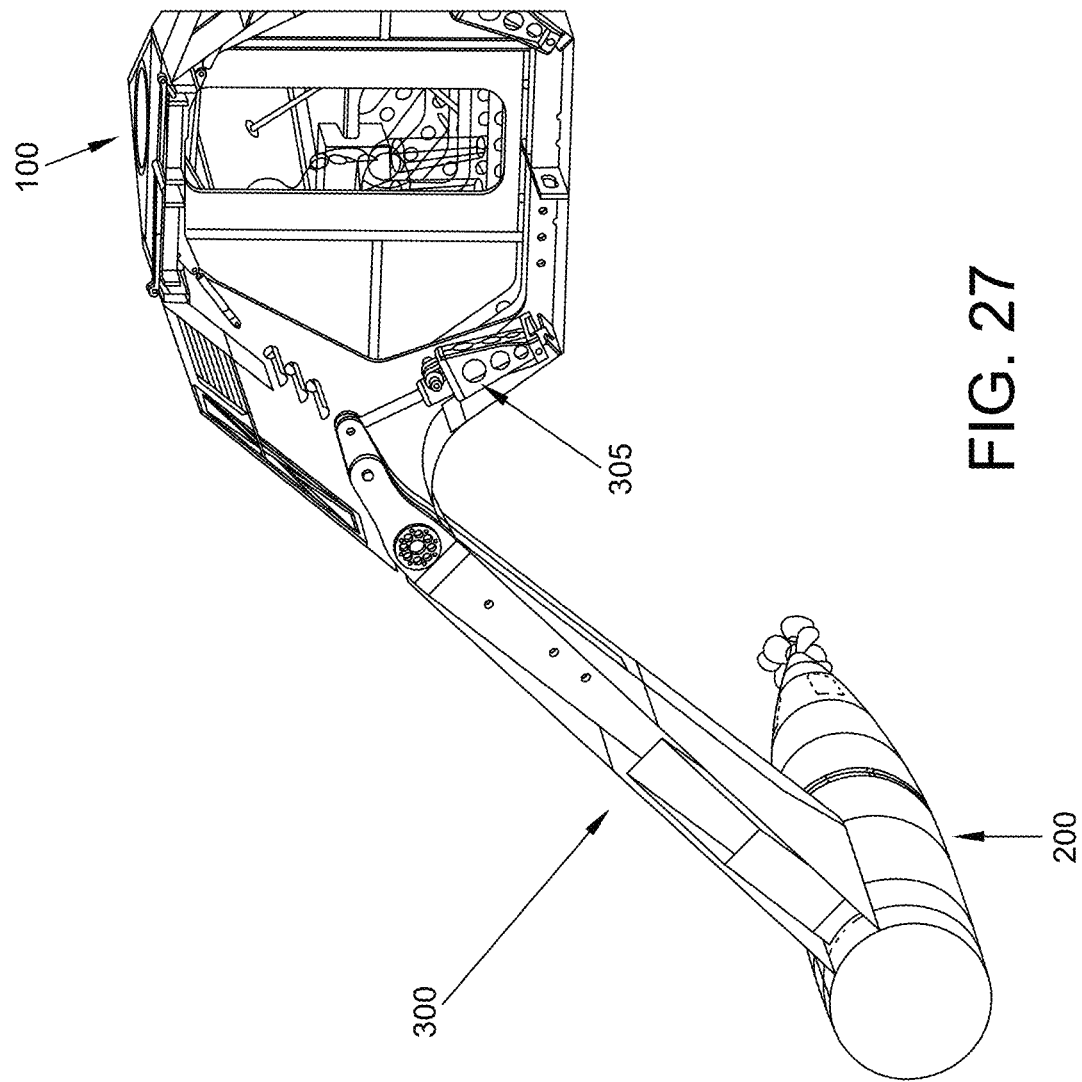
FIGS. 27-36 are schematic views showing how the position of the struts and BTFs can be adjusted relative to the command module.
Figure 28:
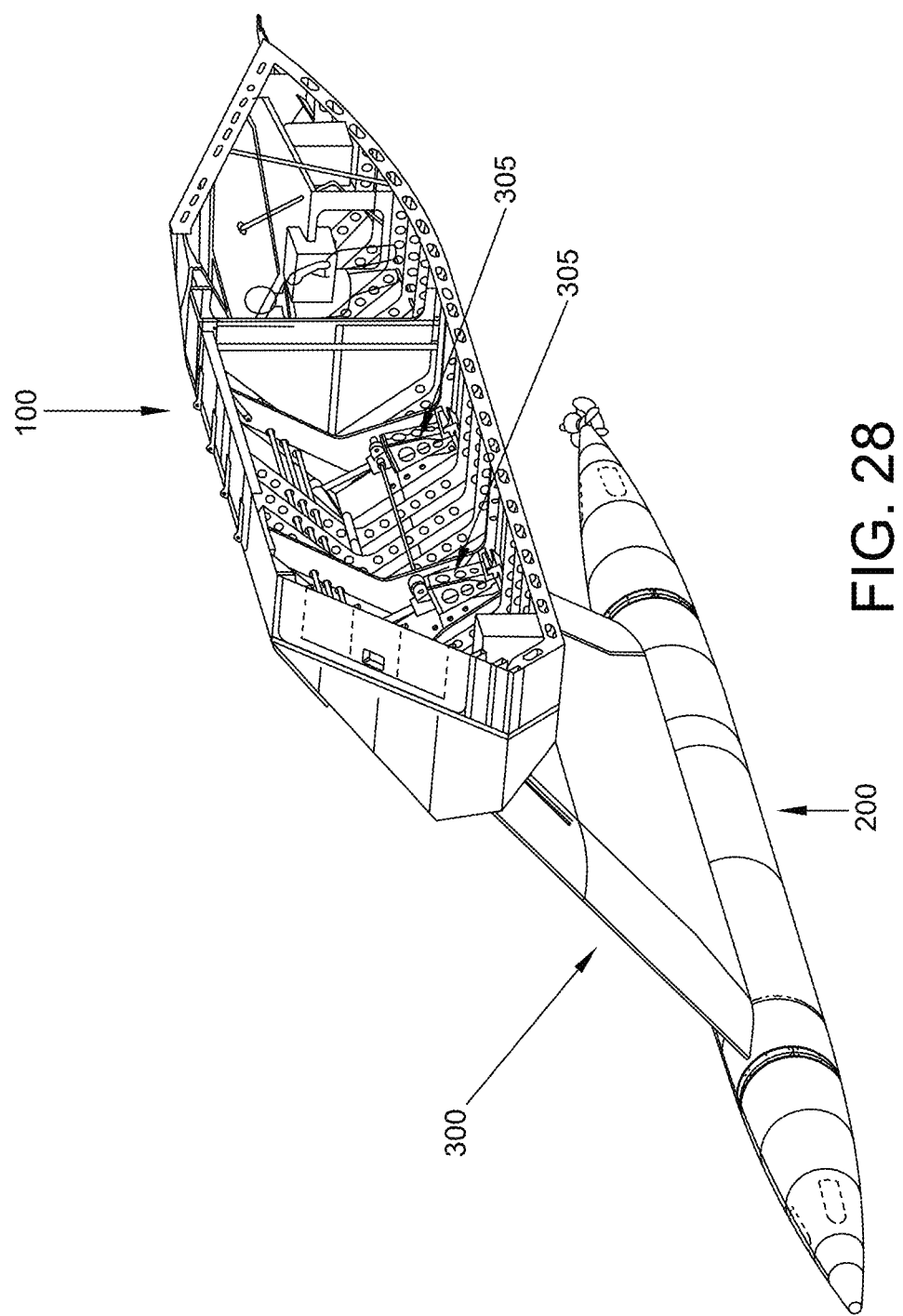
Figure 29:
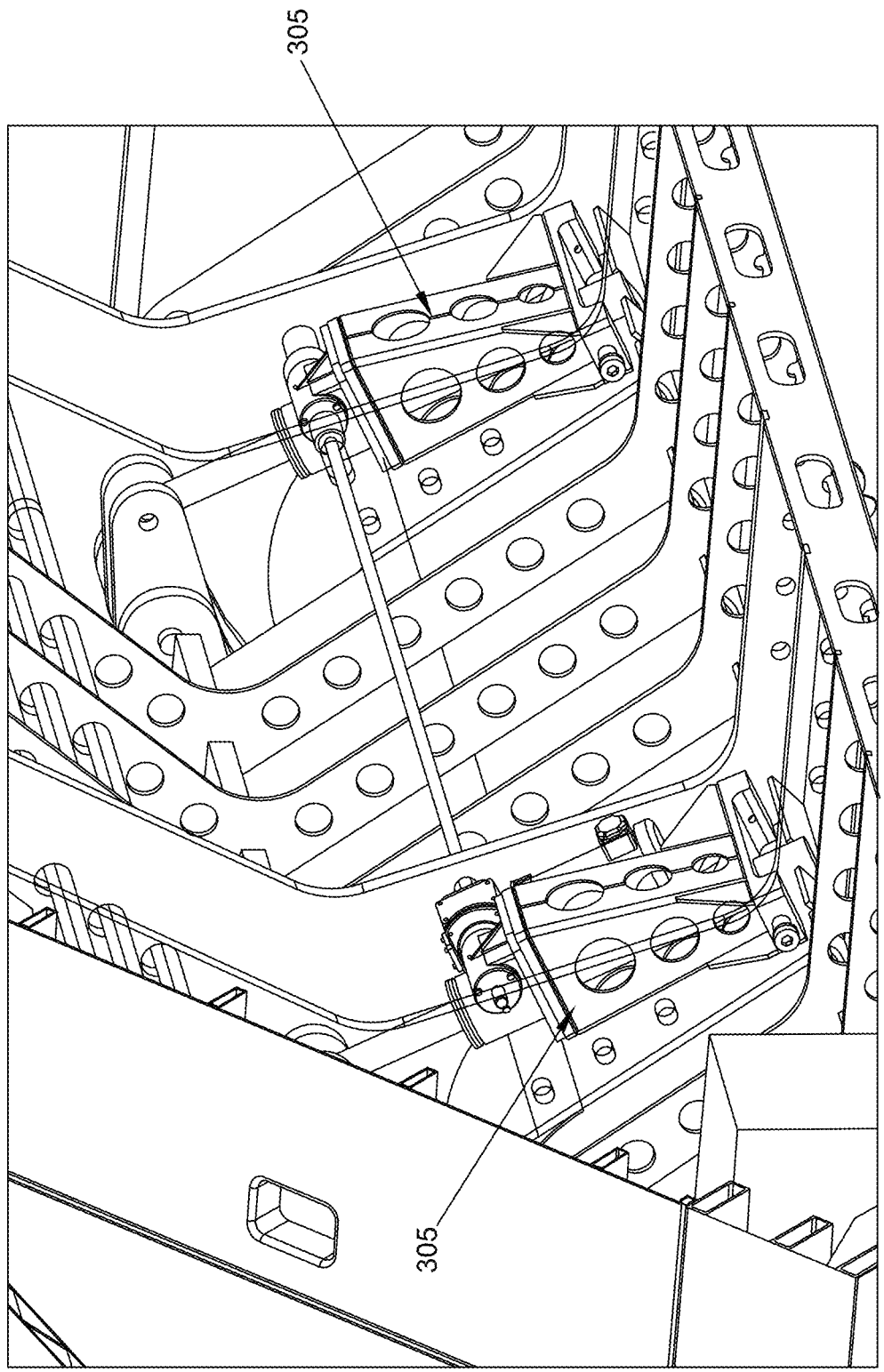
Figure 30:
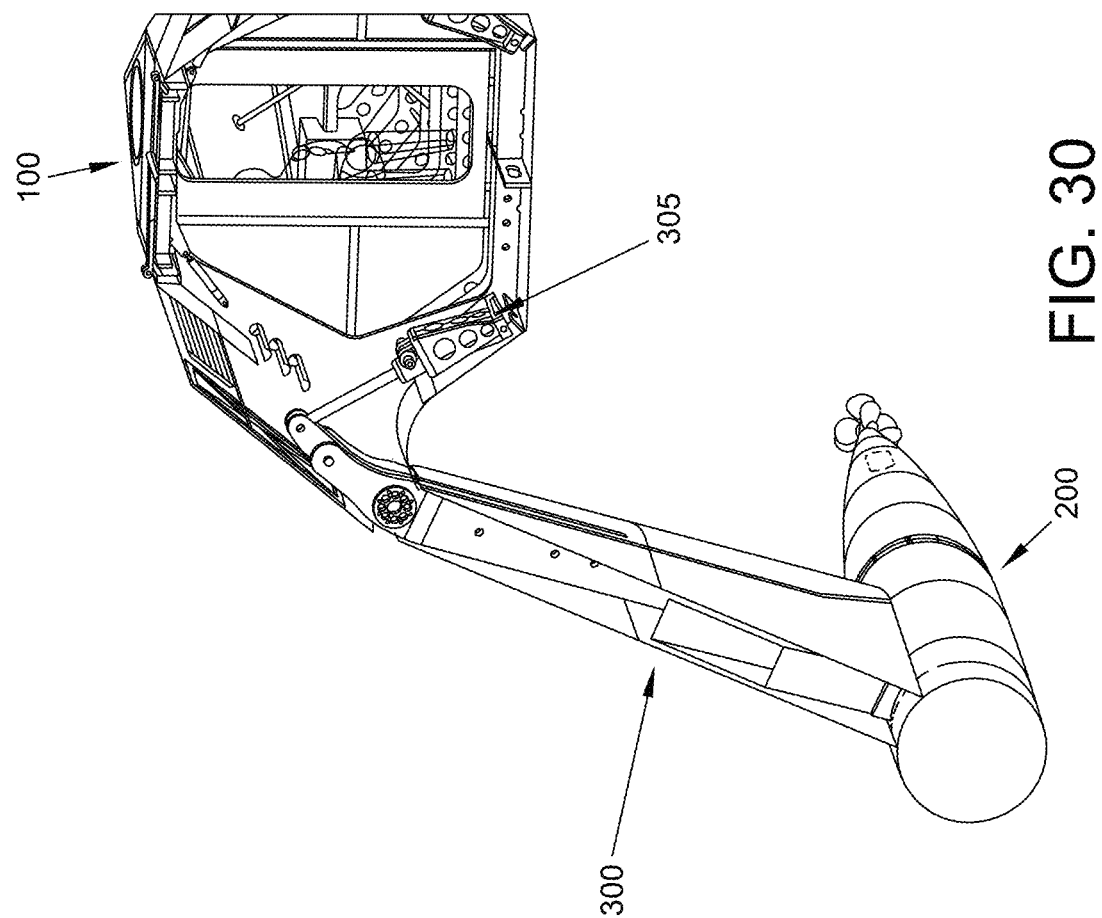
Figure 31:
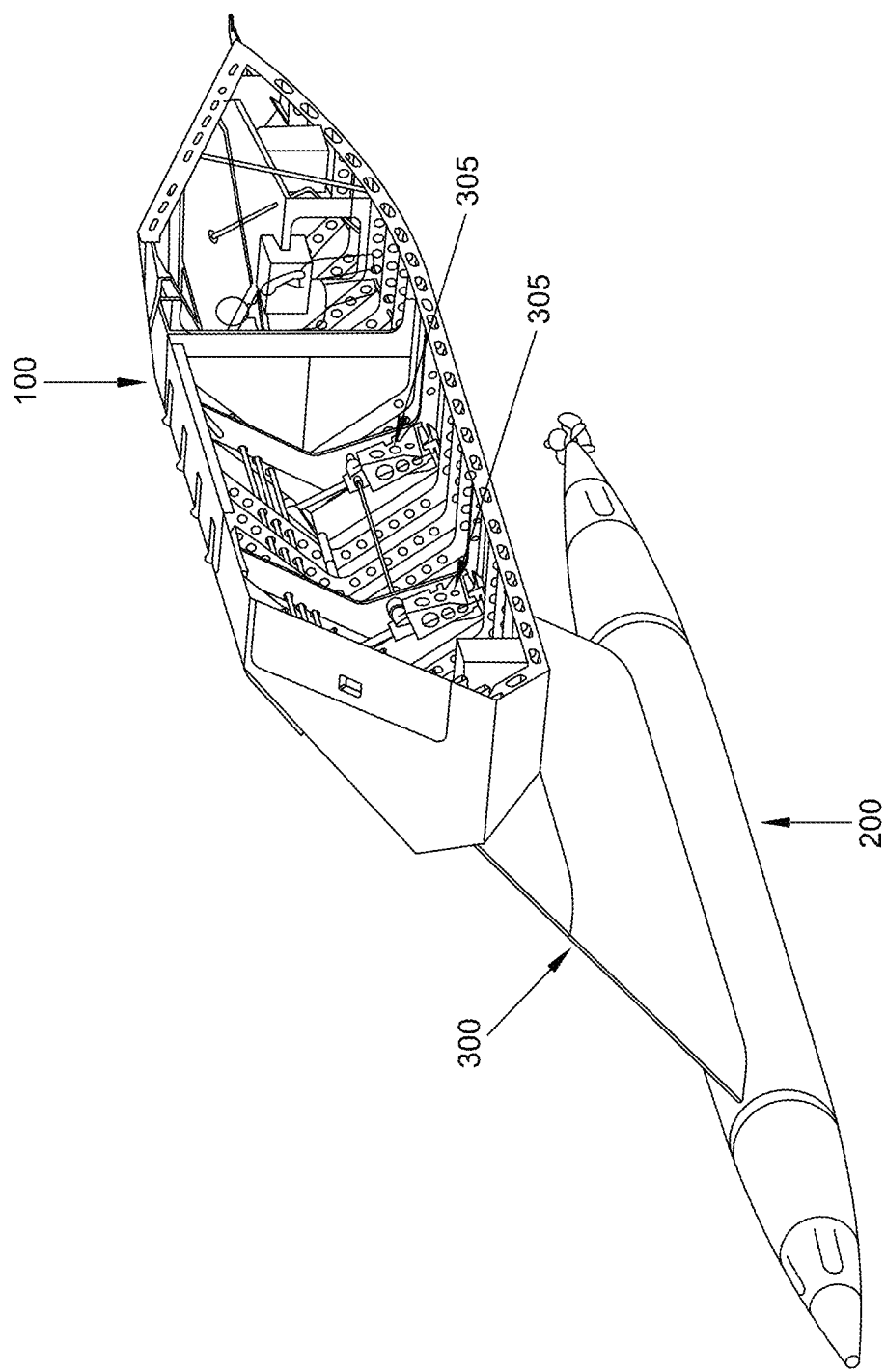
Figure 32:
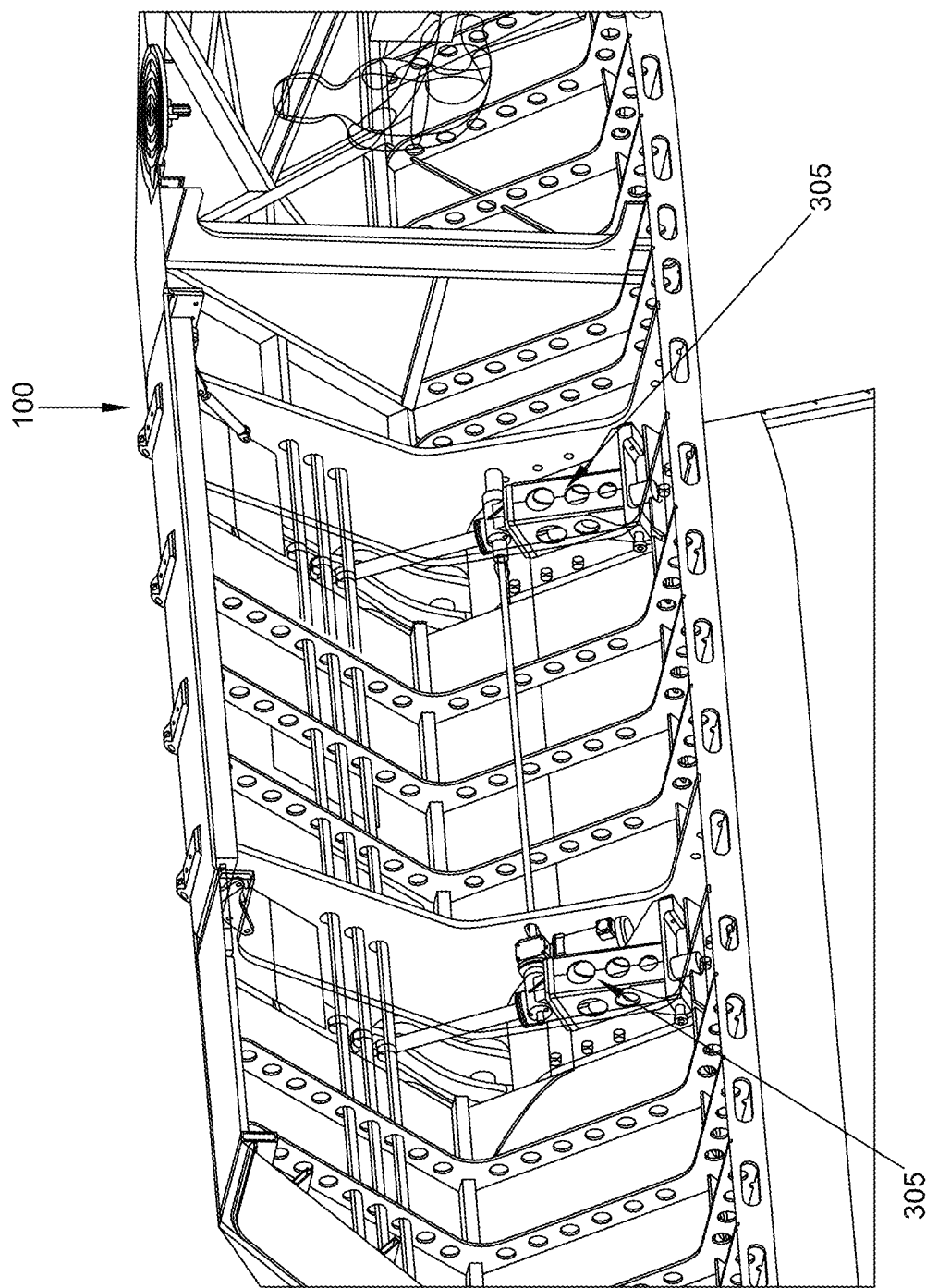
Figure 33:
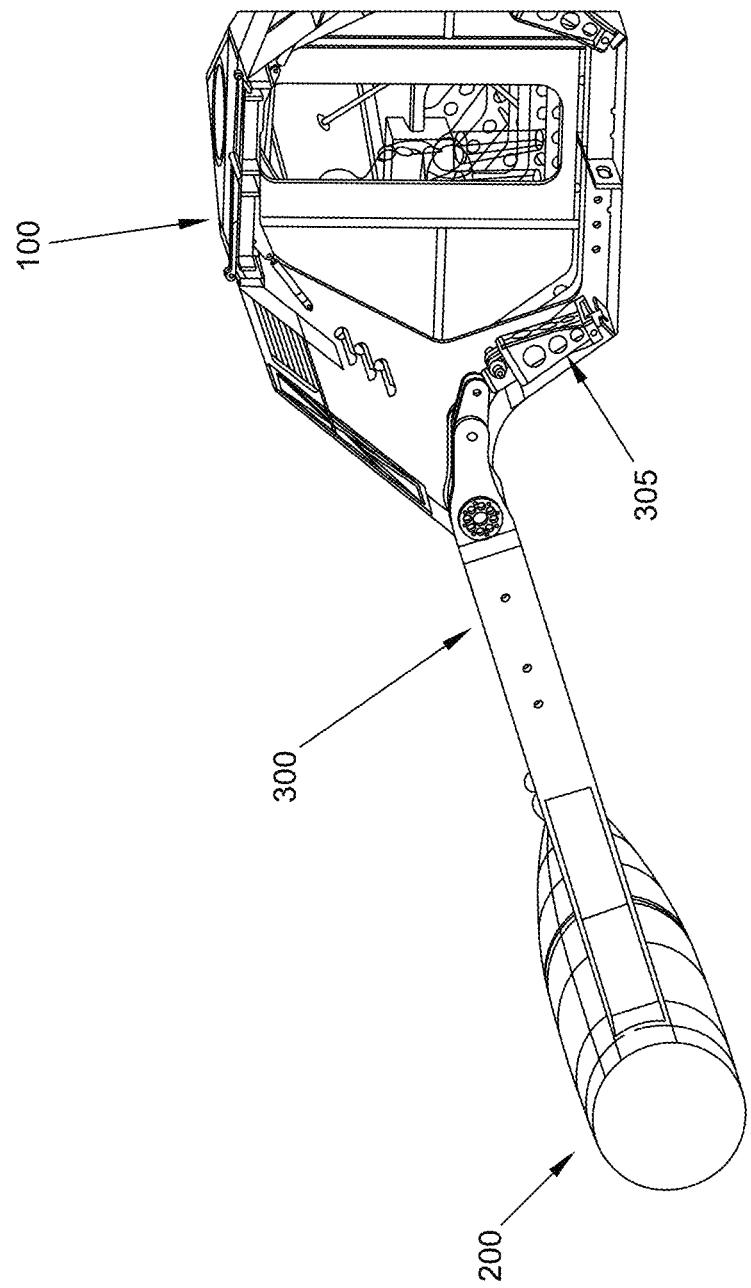
Figure 34:
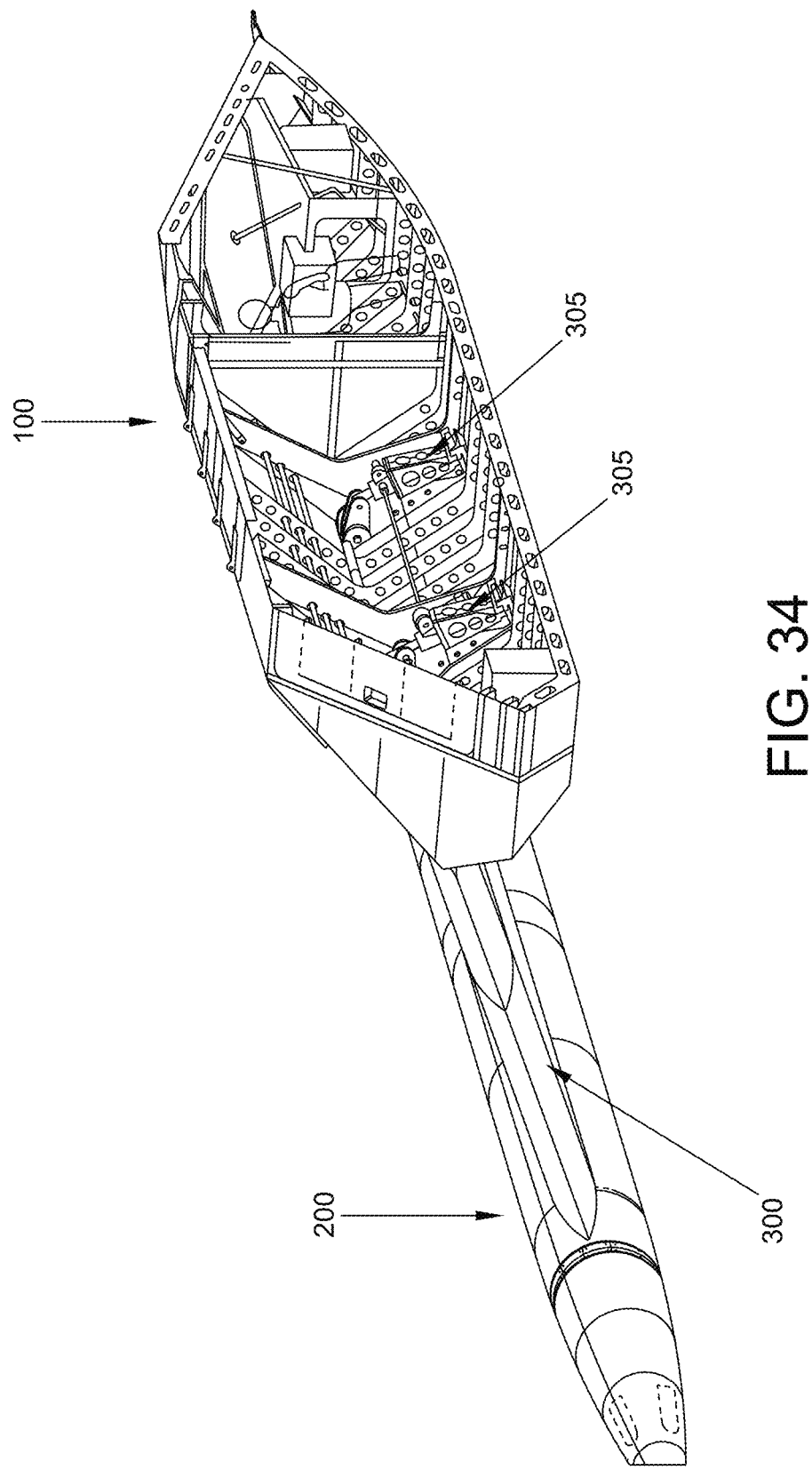
Figure 35:
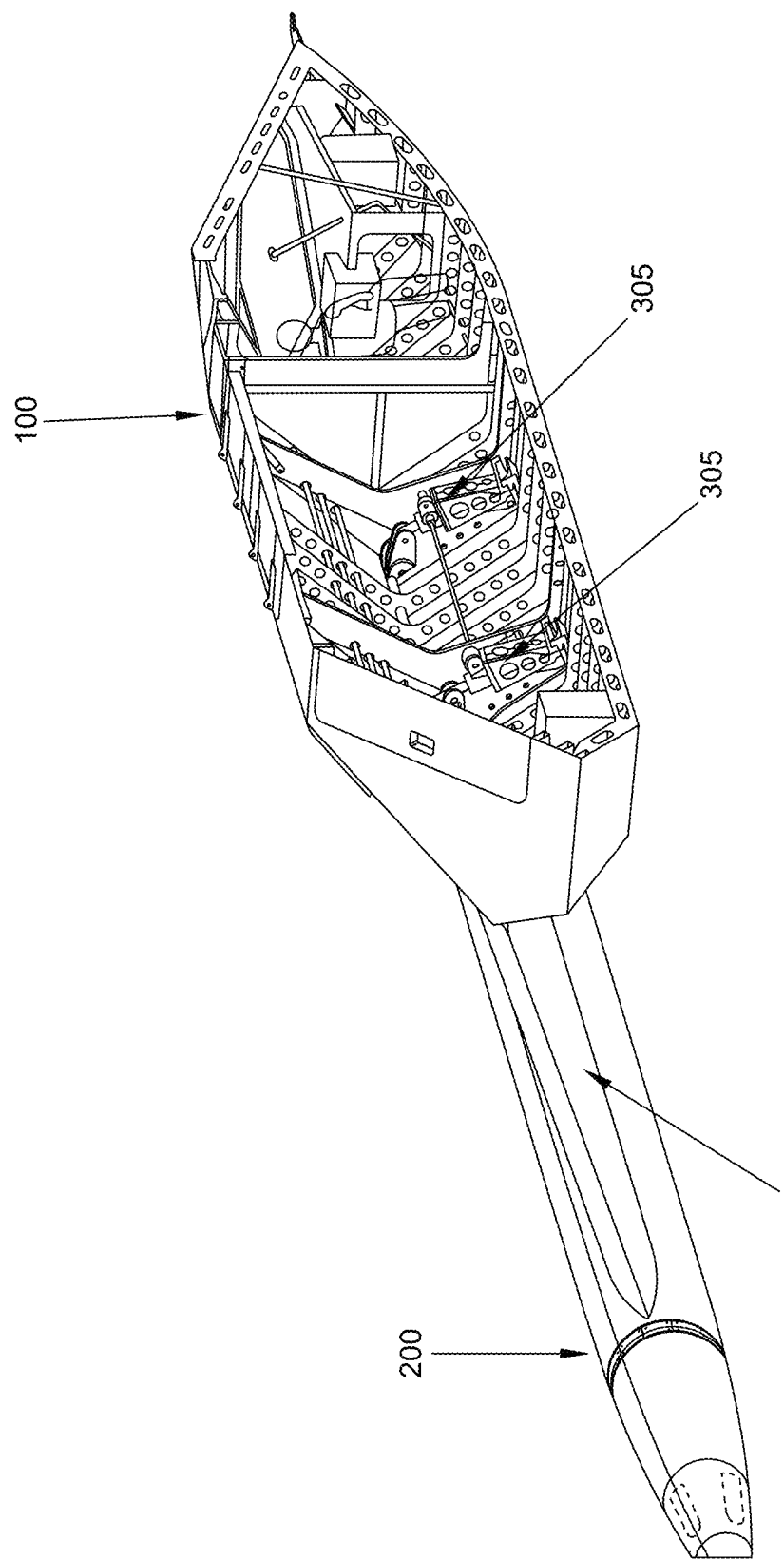
Figure 36:
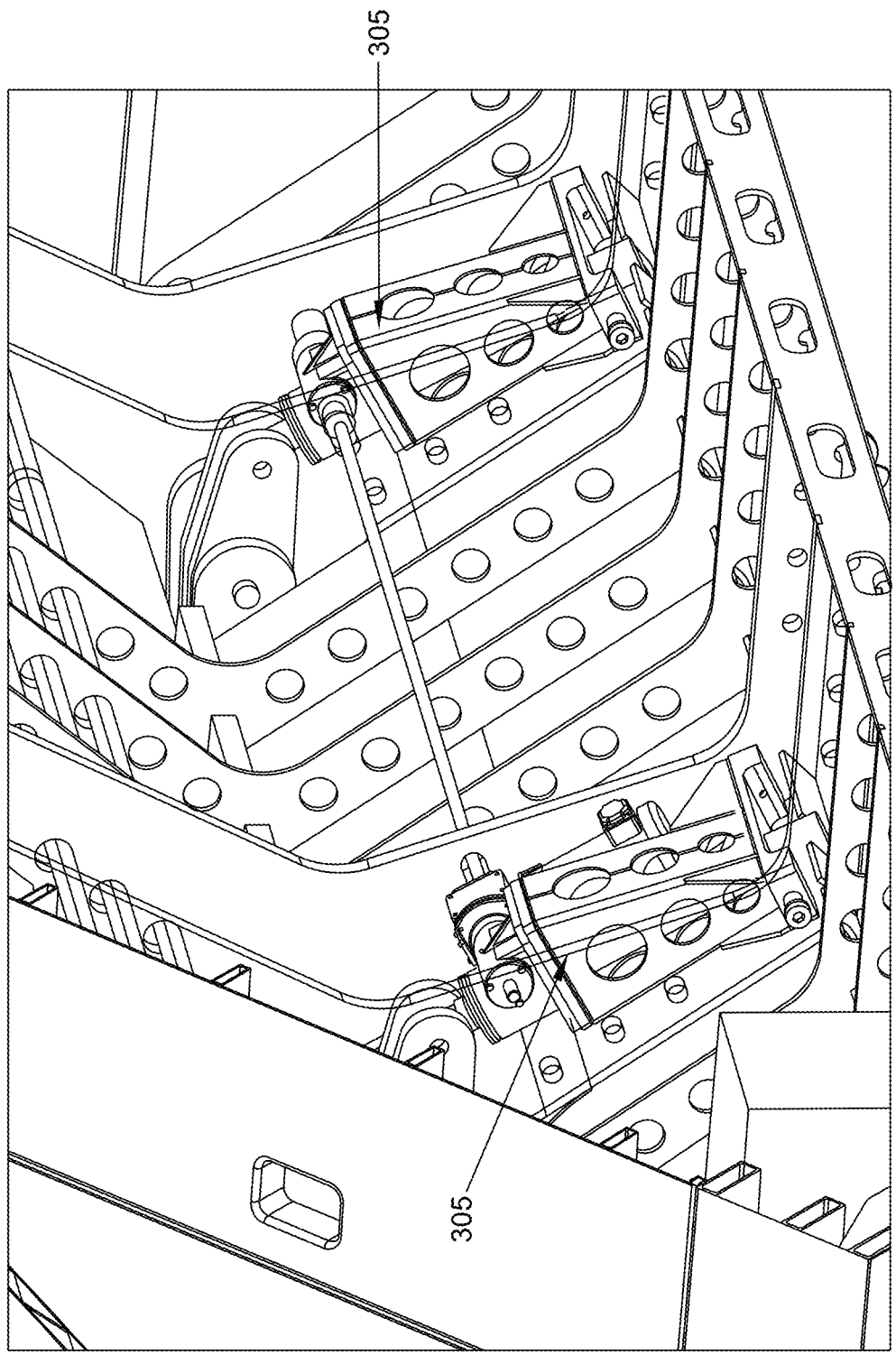

As noted above, connecting struts 300 attach BTFs 200 to command module 100. As also noted above, struts 300 are designed to be fixed to BTFs 200 and pivot on command module 100 so as to allow attack craft 5 to assume different configurations (FIGS. 4, 7 and 8), whereby to permit command module 100 to sit different distances from the water. As seen in FIGS. 27-36, struts 300 comprise hydraulic or electric jack screws 305 connected to load arms located within struts 300, whereby to move struts 300 relative to command module 100. In this respect it will be appreciated that FIGS. 27-29 show struts 300 in a position corresponding to the attack craft configuration shown in FIG. 4, FIGS. 30-32 show struts 300 in a position corresponding to the attack craft configuration shown in FIG. 7, and FIGS. 33-36 show struts 300 in a position corresponding to the attack craft configuration shown in FIG. 8.

Since struts 300 extend into the water, it is important to keep the struts as thin as possible so as to minimize drag.

It should also be appreciated that the structural integrity of struts 300 relies primarily on the strength of the load arms located within the struts acting in conjunction with the outer skin of the struts, while using minimal internal frames. This is important, since struts 300 need to have large areas of uninterrupted volume in order to permit engine intake to pass uninterrupted through the interior of the struts.

Fly-By-Wire Controls

In one preferred form of the invention, sensors are located on hull-like bottom surface 110 of command module 100 and continuously measure the distance of the command module from the water surface. A computer automatically adjusts the disposition of struts 300 so as to maintain the command module a desired distance above the water surface. In this respect it will be appreciated that, particularly when attack craft 5 is operating at high speeds (e.g., 80 knots) in open water, it is important to keep command module 100 from coming into contact with the surface of the water (and particularly important to keep command module 100 from coming into contact with the irregular sea swells commonly found in the open sea).

Thus, for example, in standard seas, attack craft 5 may be placed in the configuration shown in FIG. 4 so that command module 100 is safely out of the water and the vessel has modest radar, infrared and visual signatures.

However, in high seas, while operating at high speed, attack craft 5 may be placed in the configuration shown in FIG. 7 so that command module 100 stands well out of the water and is free from the affect of swells.

Furthermore, depending on sea conditions, attack craft 5 may be placed in a selected configuration between those shown in FIGS. 4 and 7.

Attack craft 5 is also designed to operate in stealth mode, by lowering its physical profile. In this case, attack craft 5 may be placed in the configuration shown in FIG. 8 so that command module 100 sits just above, or actually in, the water, reducing its radar, infrared and visual signatures. This mode can be very useful when attack craft 5 is being used for reconnaissance purposes and/or to deliver small teams of special forces behind enemy lines and/or to extract the same.

Thus, in one preferred form of the invention, attack craft 5 is normally operated in the configuration shown in FIG. 4, with command module 100 completely out of the water, but the command module being as low as possible so as to have a reduced profile. However, in high seas and at high speed, attack craft 5 may be operated in the configuration shown in FIG. 7, so that command module 100 stands well clear of any swells. And, when desired, attack craft 5 can be operated in the configuration shown in FIG. 8 so as to assume a stealth mode.

Or, attack craft 5 may be operated in a selected configuration between those shown in FIGS. 4, 7 and 8.

Preferably, speed sensors feed speed data to a main computer, which adjusts the sensitivity of the steering controls so that, while travelling at low speeds, the controls are more reactive and when travelling at high speeds, the controls are less reactive. In other words, the main computer preferably adjusts the sensitivity of the steering controls so that (i) large movements of the steering controls (e.g., a joystick) are required at high speeds to make modest changes in the disposition of spoilers 225, and (ii) small movements of the steering controls are required at slow speeds to make significant changes in the disposition of spoilers 225. This construction eliminates the possibility that a modest movement of the controls at high speed will result in a catastrophic change in the direction or attitude of the craft.

Extendable BTF Boom

If desired, BTFs 200 can be provided with an extendible boom. This boom is deployable from the trailing end of the BTF, and is preferably flexible. The extendible boom can serve two purposes.

First, the extendible boom can have controllable surface protrusions along its length that can be enlarged or contracted so as to allow drag to be applied to the boom, thus further stabilizing the BTF in a manner similar to the tail of a kite. The protrusions cause drag that stabilizes the vessel in both the horizontal and vertical planes. The protrusions can be controlled by elastic bladders which are inflated so as to increase size (and hence drag) as desired, or a mechanical device located at the end of the boom that provides mechanical drag resistance, thereby increasing stability.

Second, the extendible boom can also house sonar, listening devices, magnetometers, gravity interruption sensors, etc. that can be used for the identification of submerged objects. By mounting these devices on the end of an extendible boom, the devices can be isolated from the remainder of attack craft 5, so as to minimize interference with device function.

Supercavitating Air Outlet Holes Formed in the Hull of the BTF and/or Air Trap Fins Formed Along the Hull of the BTF for Constraining Movement of the Supercavitated Air Skirt Relative to the Hull of the BTF As described above, the present invention comprises a high speed SWATH boat with underwater hull friction reduction. Creating an air skirt around the hull of the buoyant tubular foil (i.e., by propeller-generated supercavitation and, optionally, by ejecting air through the hull and into the flow of water around the hull) displaces water from around the hull and replaces it with a dense stream of air bubbles, thereby allowing the hull to ride through a cushion of dense foam air bubbles. Inasmuch as water generates 800 to 1000 times more friction with a hull than air, the provision of an air skirt surrounding the hull of the buoyant tubular foil (BTF) dramatically reduces friction as the hull moves.

However, it will be appreciated that inasmuch as air is lighter than water, the air bubbles (created by the propeller-supercavitation and, optionally, by ejecting air out of the hull) tend to rise as soon as they are formed. This upward movement of the air skirt can reduce coverage of the hull by the air skirt.

Thus, it is desirable to keep the air bubbles traveling horizontally along the hull as long as possible, so as to maintain coverage of the hull by the air curtain and thereby decrease hull friction as the hull moves. Ideally, a complete skirt of air should be maintained about the entire perimeter of the hull so as to minimize hull friction. However, even an incomplete air skirt will act to reduce hull friction. At 50 knots, a 60 foot long structure passes through the bubble region in one second, so anything which increases the amount of time that the air curtain remains in contact with the hull provides an important benefit. Thus, even a $\frac{1}{10}$ second increase in the time that a bubble spends in contact with the hull results in substantial friction reduction for the buoyant tubular foil (BTF).

The following identifies various ways in which the air curtain may be maintained for a longer period of time against the hull:

1. As noted above, the air skirt is created around the hull of the buoyant tubular foil (BTF) by propeller-generated supercavitation and, optionally, by ejecting air through the hull and into the flow of water around the hull. Thus, in one form of the invention, the hull is provided with many air outlet holes 405 for ejecting air out of the hull and supplementing the propeller-generated supercavitation bubble stream. Preferably, these air outlet holes 405 extend horizontally along the length of the buoyant tubular foil 200, ensuring that the air curtain covers substantially the entire length of the hull of BTF 200. See FIGS. 37 and 37A-37C. Air ejection holes 405 may also be provided on struts 300, e.g., on the leading edge of the struts (see FIGS. 37, 37B and 37C).

2. Additionally, the hull of BTF 200 is also provided with a plurality of horizontally-extending air trap fins 410. Air trap fins 410 channel the air bubbles along the length of the hull and retard movement of the air bubbles away from the hull. See FIGS. 37 and 37A-37C.

3. If desired, air trap fins 410 may be contoured (FIG. 37) so as to force the rising air bubbles to follow a tortuous path to escape away from the hull of the BTF.

4. If desired, air trap fins 410 may be disposed in a spiral configuration around the hull of the BTF (FIG. 37) so as to define bubble channels along the hull of the BTF, whereby to cause the air bubbles to be trapped and constrained against the hull of the BTF as the air bubbles defuse along the channel.

5. Air trap fins 410 may be of a scallop-type design, thereby providing recessed channels along the hull of the BTF, whereby to hold the air against the hull of the BTF.

6. It should be appreciated that the provision of air trap fins 410 helps provide a water-flow boundary around the circumference of the underwater hull (FIGS. 37 and 37A-37D). This water-flow boundary comprises a water density gradient extending between dense sea water (spaced from the BTF) and an air and water mixture (adjacent to the BTF). The height of the air trap fins 410 helps determine the thickness of the water-flow boundary layer. It should be appreciated that the height of the air trap fins 410 can be adjusted (e.g., proportionally or otherwise) according to the length of the hull, e.g., for a shorter hull, the air trap fins may be shorter, and for a longer hull the air trap fins may be taller.

7. Air trap fins 410 may run for only a portion of the length of the hull or for the entirety of the length of the hull, and may be radially distributed on all surfaces (FIGS. 37A and 37C).

8. If desired, air trap fins 410 may be radially distributed, except for the bottom ¼ to ½ of the underside of the BTF hull (FIGS. 37 and 37D). In this case, the air curtain provided beneath the hull of the BTF will dissipate more rapidly, thereby allowing the bottom of the hull to ride on dense water and sheathing the remainder of the hull in an air/water bubble stream. This configuration can provide better support for the craft, inasmuch as the water beneath (and supporting) the craft is relatively free of air and hence substantially not compressible under the weight of the craft.

Single Propeller Cavitation

Figure 37E:
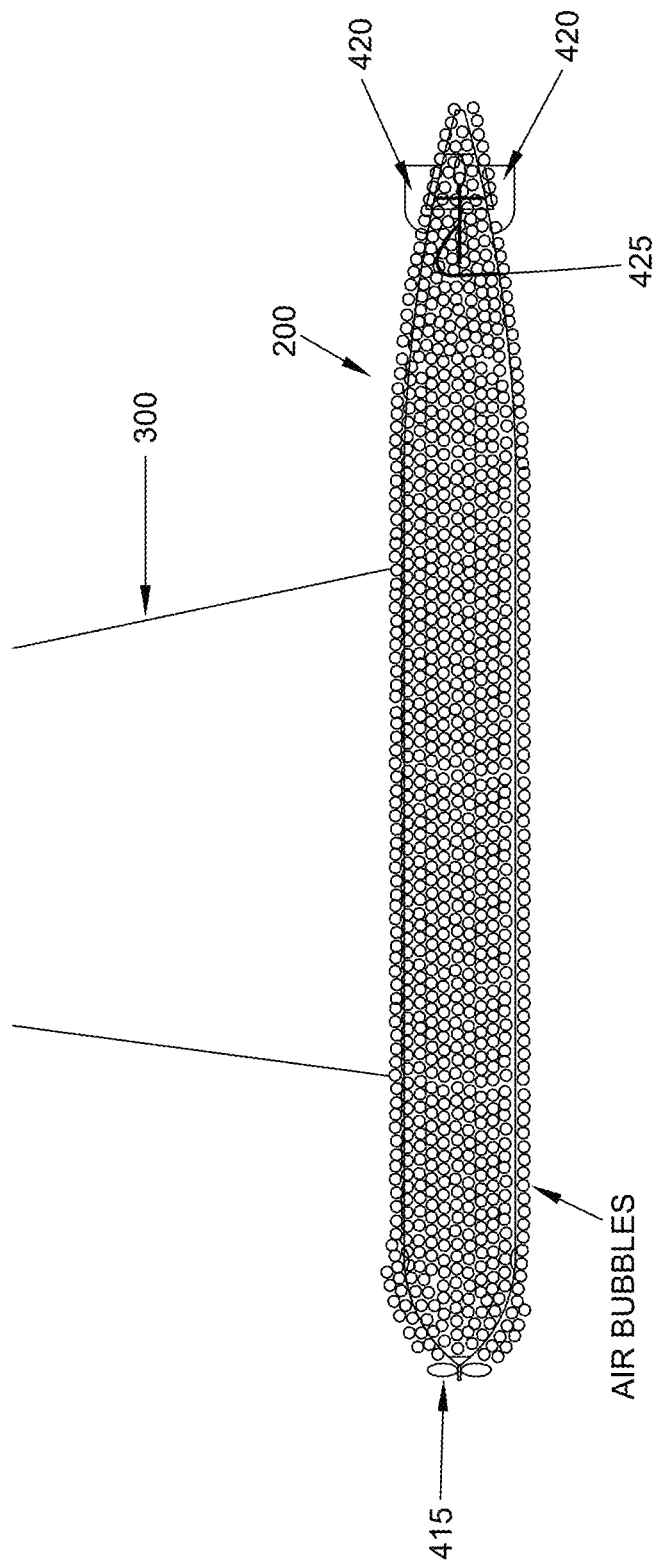
FIG. 37E is a schematic view of a buoyant tubular foil (BTF) having a single front propeller mechanism for generating a supercavitated air curtain (e.g., an envelope or skirt of gaseous bubbles) encompassing the hull of the buoyant tubular foil.

In an alternative embodiment of the present invention, and looking now at FIG. 37E, the marine vessel propeller system comprises a single propeller 415 placed at the bow of a buoyant tubular foil 200. The propeller 415 is sized and configured such that, in operation, the propeller creates and dispenses rearwardly an intense stream of supercavitated water which envelopes the hull of the buoyant tubular foil, which is also preferably provided with air trap fins as previously described, and operative to prevent immediate escape of the supercavitated water from the buoyant tubular foil (BTF) 200. Again, steering may be provided by spoilers as previously disclosed herein or, alternatively, by conventional rudders 420 (and, optionally, planes 425) as shown in FIG. 37E.

Submarine, Torpedo and Unmanned Submersible Craft Embodiments

In the foregoing disclosure, there is disclosed a novel fleet protection attack craft 5 which generally comprises a command module 100 for carrying crew, weapons and payload (including passengers), a pair of buoyant tubular foils (BTFs) 200 for providing buoyancy, propulsion and steering, and a pair of struts 300 for supporting command module 100 on BTFs 200.

It is further within the scope of the present invention to provide a novel submersible water craft (which may also sometimes hereinafter be referred to herein as a vehicle or vessel, with the terms craft, vehicle and/or vessel meant to be interchangeable), such as a submarine and/or a torpedo and/or an unmanned drone, etc. which utilizes a single (buoyant) tubular hull, generally of the sort disclosed above in connection with buoyant tubular foil (BTF) 200, as the hull of the submersible water craft (e.g., submarine, torpedo, unmanned drone, etc.). For the purposes of the present invention, such a tubular hull may be considered to be a buoyant tubular foil (BTF), and may sometimes be so referred to herein.

Figure 38:
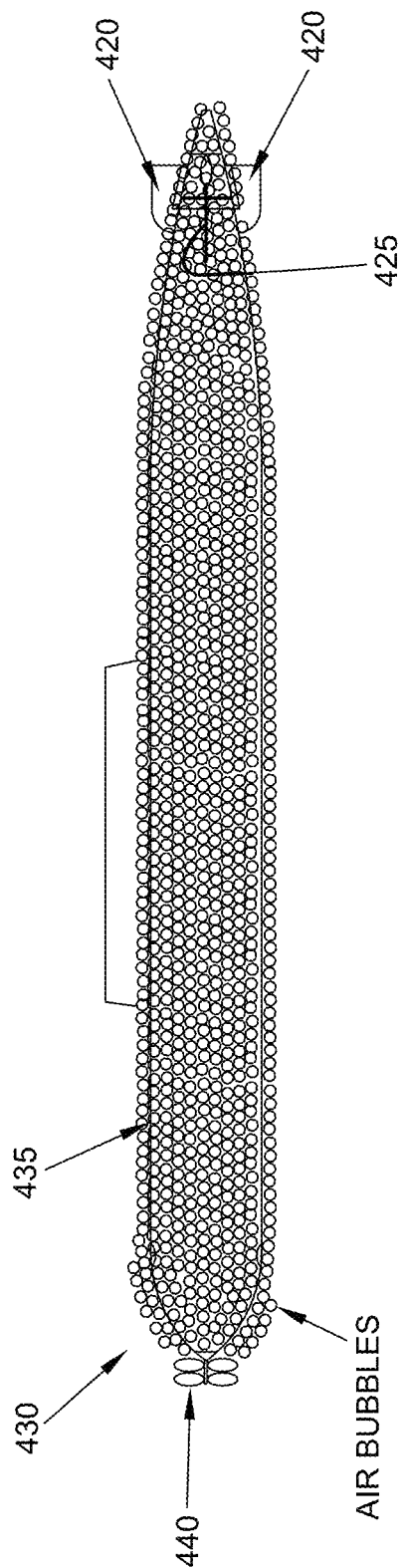
FIG. 38 is a schematic view of a submarine comprising a buoyant tubular foil (i.e., a tubular hull) equipped with a front pulling propeller mechanism for generating a supercavitated air curtain (e.g., an envelope or skirt of gaseous bubbles) encompassing the hull of submarine.
Figure 38A:
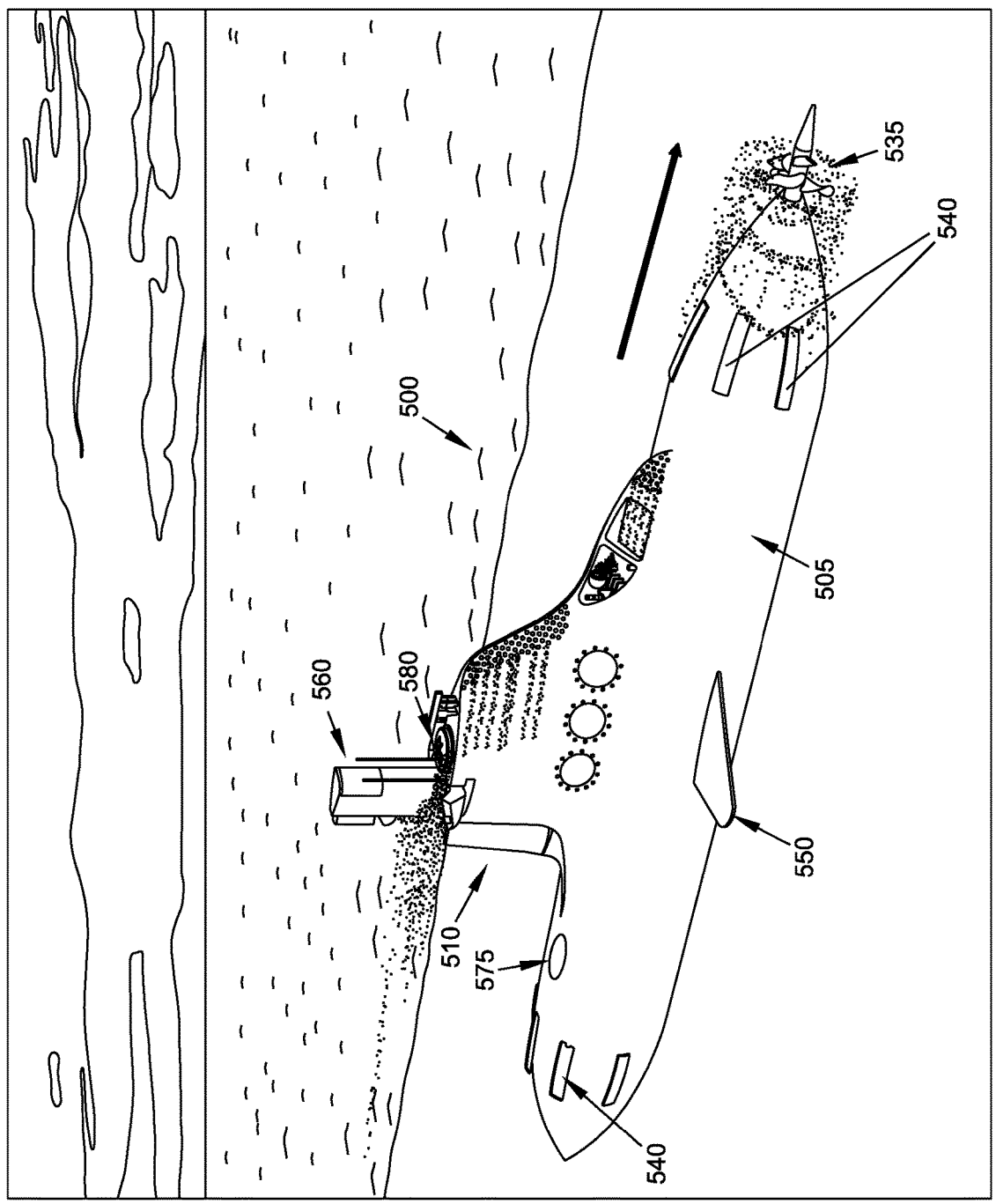
Figure 38B:
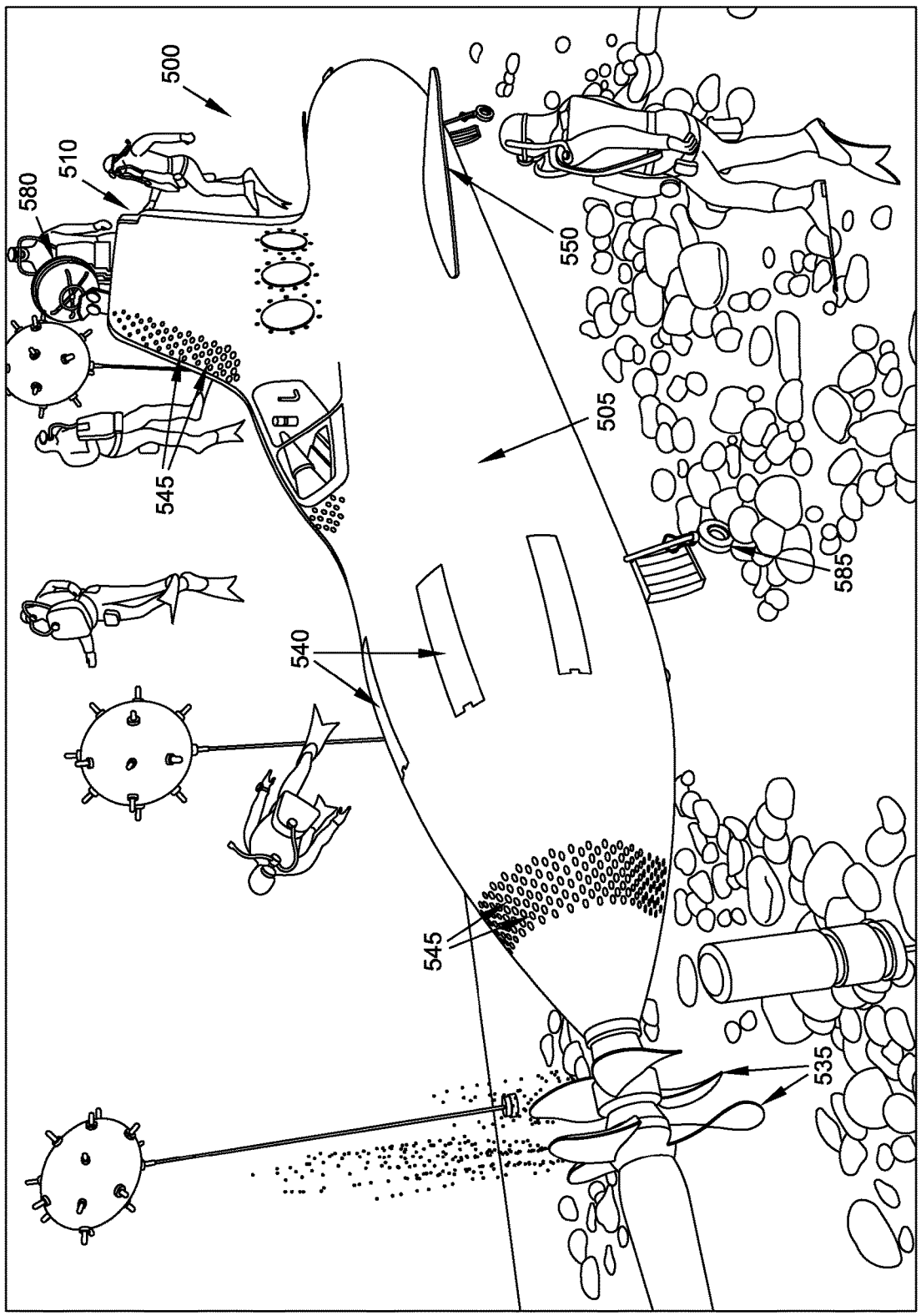
Figure 38C:
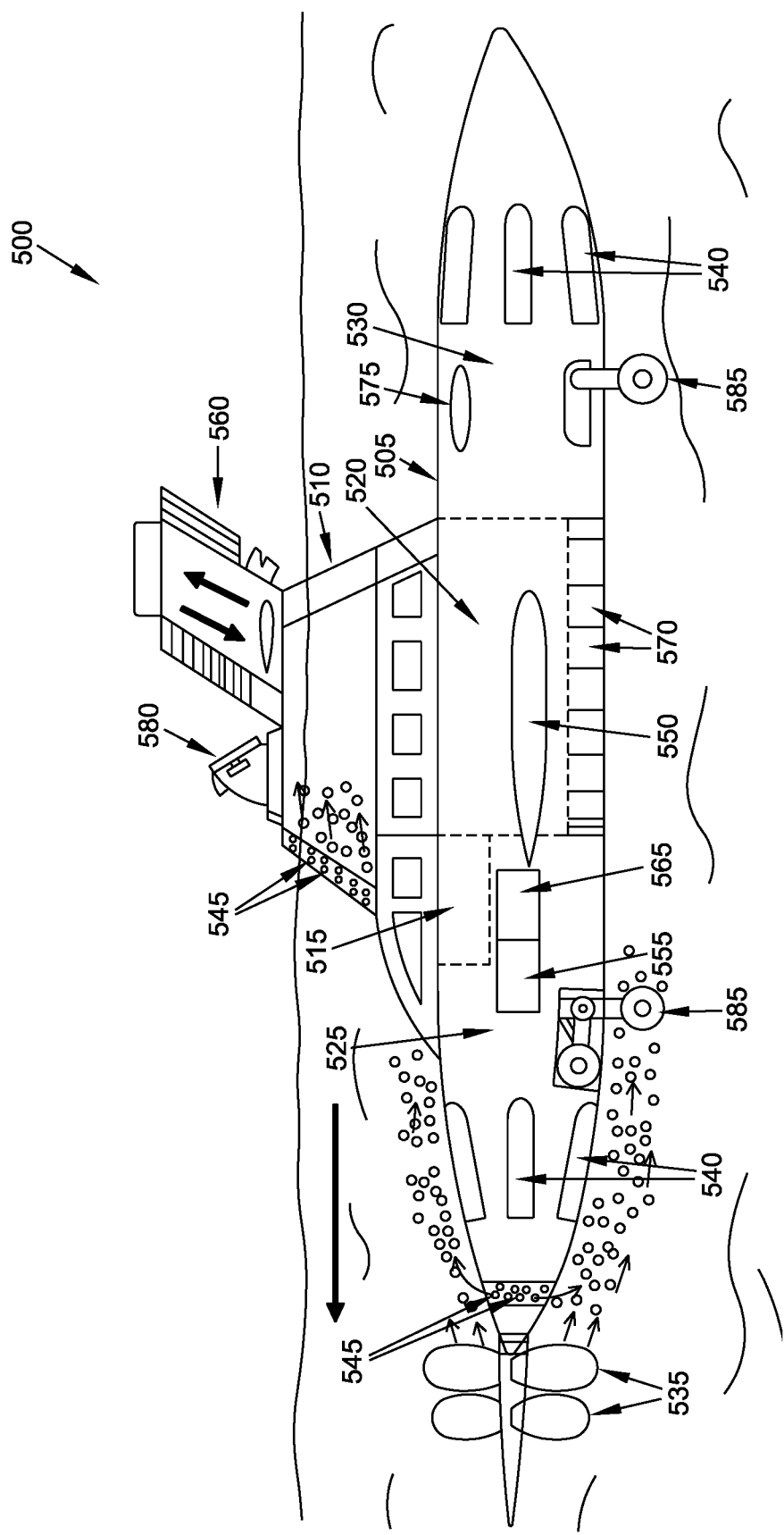

In one form of the present invention, and referring now to FIG. 38, there is provided a submarine 430 which comprises a tubular hull (i.e., BTF) 435, and front-pulling propeller or propellers 440 for providing propulsion and an air skirt (supercavitation) for engulfing the hull of the submarine in the manner previously discussed. Again, steering for the submarine may be provided by spoilers as previously discussed or, alternatively, rudders 420 (and, optionally, planes 425) as shown in FIG. 38.

By way of example but not limitation, and looking now at FIGS. 38A, 38B, 38C and 38D, there is shown a novel submarine 500 formed in accordance with the present invention. Novel submarine 500 is uniquely suited to rapidly and covertly deploying small teams of personnel to any coastline in the world.

More particularly, submarine 500 generally comprises a tubular hull (i.e., BTF) 505 having a conning tower 510 extending upwards therefrom, and including a pilot cockpit 515, crew quarters 520, an engine room 525, and an area 530 for storing fuel (e.g., in fuel tanks and/or fuel bladders, etc., not shown) and/or other cargo (e.g., weapons).

Submarine 500 also comprises front-pulling propeller or propellers 535 for providing propulsion and an air skirt (supercavitation) for engulfing the hull of the submarine in the manner previously discussed, and spoilers 540 for providing steering in the manner previously discussed. Preferably, a pair of counter-rotating propellers 535 are used, with the pair of counter-rotating propellers being arranged to cancel out any rotational forces which might induce the submarine to spin on its lengthwise axis. Additionally, submarine 500 preferably comprises nozzles 545 disposed just aft of propeller(s) 535, and also disposed on the front edges of conning tower 510, for ejecting fluids (e.g., gases and/or low friction liquids) from the submarine and into the flow of water around the submarine, whereby to further reduce friction as the submarine moves through the water. Submarine 500 preferably also comprises a pair of horizontal stabilizers 550 for providing additional attitude control for the submarine, e.g, while the submarine is operating at low speeds. Horizontal stabilizers 550 are preferably retractable into hull 505 for reduced friction when the submarine is running at high speeds.

In this form of the invention, a gas turbine engine 555, aspirated through a telescoping snorkel 560, is provided for high speed propulsion when the submarine is running on the surface of the water or at a depth shallow enough for snorkel 560 to function. An electric motor 565, powered by batteries 570, is provided for propulsion when the submarine is submerged below snorkel depth and/or when the submarine requires "silent" running (e.g., for covert operations).

Ballast tanks (not shown) of the sort well known in the art are provided for regulating the buoyancy of the submarine in the water.

An air lock 575 is preferably provided in hull 505 in order to permit divers to exit and enter the hull while the submarine is submerged. Alternatively, an air lock (not shown) may be provided in conning tower 510 for access via top hatch 580.

If desired, retractable wheels 585 may be provided so as to render the submarine amphibious.

In one preferred manner of use, submarine 500 travels through the ocean at high speeds, powered by its gas turbine engine 555, which is aspirated through telescoping snorkel 560. This is preferably done with the submarine operating fully submerged at snorkel depth, although it may also be done with the conning tower 510 protruding above the surface of the water while the hull 505 is submerged below the surface of the water. Front-pulling propeller(s) 535, which provide both propulsion and an air skirt (supercavitation) for engulfing the hull of the submarine, and spoilers 540 for providing steering, make such high speed operation practical and efficient. Additionally, nozzles 545 (disposed just aft of propeller(s) 535, and also disposed on the front edges of conning tower 510) eject fluids (e.g., gases and/or low friction liquids) from the submarine and into the flow of water around the submarine, whereby to further reduce friction as the submarine moves through the water. During such high speed operation, horizontal stabilizers 550 are preferably retracted into hull 505 for reduced friction.

If and when it is necessary to evade detection, the submarine can submerge below snorkel depth and switch to battery power. While this typically results in limited operating time and/or in slower operating speeds due to the limited onboard battery capacity, it allows the submarine to operate substantially silently. When operating at lower operating speeds, horizontal stabilizers 550 may be used to enhance attitude control.

When the submarine is to approach a shoreline (e.g., to deploy a covert team of personnel), the submarine can operate on battery power so as to minimize noise and avoid detection.

Personnel can exit and enter the submarine while the submarine is submerged via air lock 575 and/or top hatch 580.

If desired, batteries 570 may be replaced by, and/or supplemented by, fuel cells of the sort known in the art.

In another form of the invention, and referring now to FIG. 39, a single tubular structure (BTF), such as a body 445 of a torpedo 450, may be provided with a warhead (e.g., detonator and high explosives) and provides for buoyancy (including negative buoyancy where desired), propulsion and steering, as is known in the art. More particularly, in this form of the invention, buoyancy is preferably provided by ballast tanks contained within the body 445 of the torpedo 450. Propulsion is provided by at least one front-pulling propeller 455 of the sort disclosed above, and an electric motor contained within the body 445 of the torpedo 450, with the front-pulling propeller or propellers 455 providing an air skirt (supercavitation) around the body 445 of the torpedo 450 during movement of the torpedo through water, in the manner previously disclosed. Again, steering may be provided by spoilers as previously disclosed herein or, alternatively, rudders 420 (and, optionally, planes 425) as shown in FIG. 39.

Figure 40:
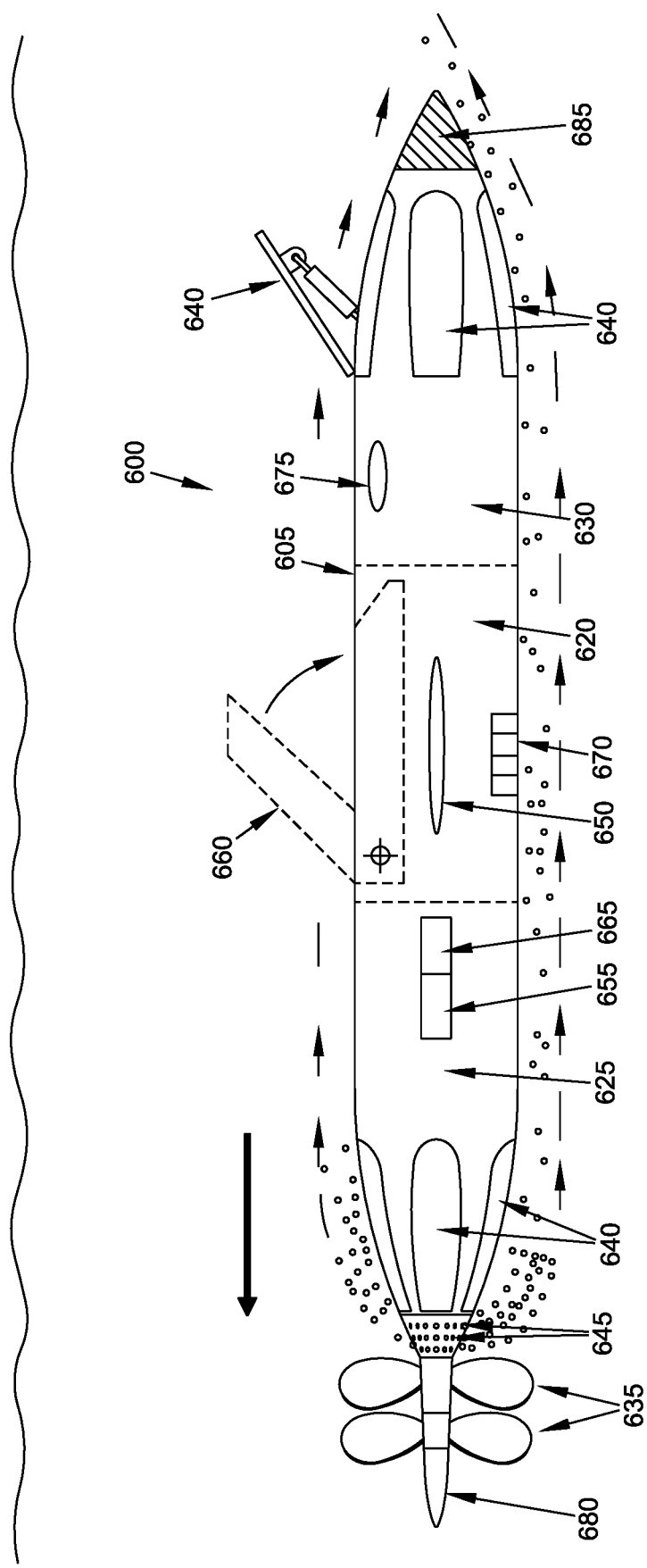
FIG. 40 is a schematic view of a novel unmanned submersible craft formed in accordance with the present invention.

In another form of the present invention, and referring now at FIG. 40, there is shown a novel unmanned submersible craft 600 formed in accordance with the present invention. Novel unmanned submersible craft 600 is uniquely suited to rapidly and covertly enter areas where it is necessary to gather visual, electronic (including radar and sonar) and/or chemical data in order to assess a situation.

More particularly, unmanned submersible craft 600 generally comprises a tubular hull (i.e., BTF) 605 having an equipment area 620, an engine room 625, and an area 630 for storing fuel (e.g., in fuel tanks and/or fuel bladders, etc., not shown) and/or other cargo (e.g., weapons).

Unmanned submersible craft 600 also comprises front-pulling propeller or propellers 635 for providing propulsion and an air skirt (supercavitation) for engulfing the hull of the unmanned submersible craft in the manner previously discussed, and spoilers 640 for providing steering in the manner previously discussed. Preferably, a pair of counter-rotating propellers 635 are used, with the pair of counter-rotating propellers being arranged to cancel out any rotational forces which might induce the submarine to spin on its lengthwise axis. Additionally, unmanned submersible craft 600 preferably comprises nozzles 645 disposed just aft of propeller(s) 635 for ejecting fluids (e.g., gases and/or low friction liquids) from the unmanned submersible craft and into the flow of water around the unmanned submersible craft, whereby to further reduce friction as the unmanned submersible craft moves through the water. Unmanned submersible craft 600 preferably also comprises a pair of horizontal stabilizers 650 (only one of which is shown in FIG. 40) for providing additional attitude control for the unmanned submersible craft, e.g, while the unmanned submersible craft is operating at low speeds. Horizontal stabilizers 650 are preferably retractable into hull 605 for reduced friction when the unmanned submersible craft is running at high speeds.

In this form of the invention, a gas turbine engine 655, aspirated through a pivotally-retractable or telescoping snorkel 660, is provided for high speed propulsion when the unmanned submersible craft is running on the surface of the water or at a depth shallow enough for snorkel 660 to function. An electric motor 665, powered by batteries 670, is provided for propulsion when the unmanned submersible craft is submerged below snorkel depth and/or when the unmanned submersible craft requires "silent" running (e.g., for covert operations).

Ballast tanks (not shown) of the sort well known in the art are provided for regulating the buoyancy of the unmanned submersible craft in the water.

It is intended that unmanned submersible craft 600 be able to gather visual, electronic (including radar and sonar)

and/or chemical data in the area around the craft. This typically means gathering visual, electronic and/or chemical data from above the surface of the water, although in some circumstances it may also involve gathering visual, electronic and/or chemical data from below the surface of the water. In one preferred form of the invention, the visual, electronic and/or chemical data is gathered from above the surface of the water while the unmanned submersible craft remains in a submerged condition so as to minimize the possibility of detection. To this end, the visual, electronic and/or chemical sensors are preferably adapted to be advanced from the unmanned submersible craft to a position above the surface of the water while the unmanned submersible craft remains below the surface of the water. This may be done by mounting visual, electronic and/or chemical sensors to snorkel 660 so that visual, electronic and/or chemical sensors project above the surface of the water while snorkel 660 is in its deployed condition. Additionally, visual, electronic and/or chemical sensors may be mounted to a telescoping mast (not shown) or floating buoy (not shown) housed within a deployment chamber 675 in order that the visual, electronic and/or chemical sensors may be raised to the surface of the water while the unmanned submersible craft remains below the surface of the water. In addition to the foregoing, visual, electronic and/or chemical sensors may be mounted in nose cone 680, and/or tail cone 685, so that visual, electronic and/or chemical data can be gathered by the unmanned submersible craft.

In one preferred manner of use, unmanned submersible craft 600 travels through the ocean at high speeds, powered by its gas turbine engine 655, which is aspirated through telescoping snorkel 660. This is done with the unmanned submersible craft operating fully submerged at snorkel depth. Front-pulling propeller(s) 635, which provide both propulsion and an air skirt (supercavitation) for engulfing the hull of the unmanned submersible craft, and spoilers 640 for providing steering, make such high speed operation practical and efficient. Additionally, nozzles 645 (disposed just aft of propeller(s) 635) eject fluids (e.g., gases and/or low friction liquids) from the unmanned submersible craft and into the flow of water around the unmanned submersible craft, whereby to further reduce friction as the unmanned submersible craft moves through the water. During such high speed operation, horizontal stabilizers 650 are preferably retracted into hull 605 for reduced friction.

If and when it is necessary to evade detection, the unmanned submersible craft 600 can submerge below snorkel depth and switch to battery power. While this typically results in limited operating time and/or in slower operating speeds due to the limited onboard battery capacity, it allows the unmanned submersible craft to operate substantially silently. When operating at lower operating speeds, horizontal stabilizers 650 may be used to enhance attitude control.

Alternatively, and/or additionally, the unmanned submersible craft may be carried by an aircraft to an area closer to its final destination, and then dropped from the aircraft, so as to shorten the distance to be traveled by the unmanned submersible craft and still maintain its stealth approach.

When the unmanned submersible craft has reached the area in which it is to gather visual, electronic and/or chemical data, it preferably remains submerged and runs under battery power, except for short periods of time when it may rise to snorkel depth and run under its gas turbine engine 655 so as to recharge its batteries. With the unmanned submersible craft remaining submerged, visual, electronic and/or chemical data is gathered by the sensors carried by the craft, e.g., from above the surface of the water by raising sensors to the surface by a telescoping mast (not shown) or a floating buoy (not shown) projected from deployment chamber 675, and/or from below the surface of the water via the sensors carried by nose cone 680 and/or tail cone 685.

Alternatively, and/or additionally, the unmanned submersible craft may reposition itself into a vertical orientation (e.g., in the manner shown in FIG. 41) so that tail cone 685 projects above the surface of the water, such that the sensors in tail cone 685 may be used to acquire visual, electronic and/or chemical data from above the surface of the water.

The data acquired by the unmanned submersible craft may then be transmitted back to a base station by conventional radio transmission of the sort well known in the art.

If desired, batteries 670 may be replaced by, and/or supplemented by, fuel cells of the sort known in the art.

And if desired, nose cone 680, and/or tail cone 685, and/or hull 605, may carry fittings for permitting refueling of the unmanned submersible craft from a fuel source (e.g., a surface vessel, a submarine, a remote refueling module, etc.).

Front Pulling Propeller Mechanism

It should be appreciated that with the preferred form of the present invention, a front pulling propeller mechanism is used to both (i) pull the buoyant tubular foil (BTF) 200 (or other tubular structure) though the water, and (ii) generate the friction-reducing air curtain which engulfs the trailing BTF 200 (or other tubular structure). Thus, the same element (i.e., the front pulling propeller mechanism) is used to simultaneously provide both propulsion and the supercavitating friction-reducing air curtain. As noted above, each of these aspects provides significant improvements in propulsion efficiencies, with (i) the front pulling propeller mechanism biting into virgin water, which enhances the propulsion action of the propeller mechanism, and (ii) the front pulling propeller mechanism providing the supercavitating friction-reducing air curtain which reduces hull friction as the BTF 200 (or other tubular structure) moves through the water. Uniquely, the front pulling propeller mechanism is used to simultaneously provide both of these functions.

Significantly, the same approach is used regardless of whether the BTF 200 (or other tubular structure) is part of a SWATH surface vessel, or is the hull of a submarine or other submersible vessel, or is the fuselage of another form of submersible vehicle such as a torpedo or unmanned drone. In other words, with the preferred form of the present invention, the front pulling propeller mechanism simultaneously provides its dual function (i.e., propulsion and the supercavitating friction-reducing air curtain) for the elongated hull structure (i.e., the BTF 200 or other tubular structure) which trails the front pulling propeller mechanism. In this way, the elongated hull structure is moved through the water with great efficiency and hence significantly increased speed.

It will be appreciated that it is important that the front pulling propeller mechanism be configured (e.g., blade shape, blade size, number of blades employed, counterrotation of the blades if more than one blade is provided, etc.) and operated (e.g., blade rotation speed, etc.) for both efficient propulsion and efficient air curtain generation. In this latter respect, it will be appreciated that the propeller mechanism should generate an air curtain of sufficient size and volume to engulf all (or substantially all) of the perimeter of the trailing hull structure (e.g., the BTF 200). In this respect it will be appreciated that not all front pulling propeller mechanisms will generate the supercavitating friction-reducing air curtain desired in the present invention. By way of example but not limitation, a propeller rotating relatively slowly will generate minimal supercavitation function (which may be a desired design feature, such as on a ballistic missile submarine which may give a priority to noise reduction). By way of further example but not limitation, a relatively small propeller may throw off a bubble stream, but the bubble stream may not be large enough to engulf the perimeter of the trailing hull structure and thereby provide the desired air curtain about the outer surface of the trailing hull structure. Thus it will be appreciated that attention must be paid to the configuration of the front pulling propeller mechanism (e.g., blade shape, blade size, number of blades employed, counterrotation of the blades if more than one blade is provided, etc.) and to the operation of the front pulling propeller mechanism (e.g., blade rotation speed, etc.) in order to provide the desired supercavitating friction-reducing air curtain for the trailing hull structure. Appropriate design and operational parameters will be apparent to those skilled in the art in view of the present disclosure.

In one preferred form of the invention, the front pulling propeller mechanism comprises a pair of counterrotating propellers to efficiently provide both propulsion and the supercavitating friction-reducing air curtain, with the propellers having a diameter which is approximately 33 percent to approximately 90 percent of the diameter of the trailing BTF, and most preferably approximately 66 percent of the diameter of the trailing BTF 200 (or other tubular structure), and a rotation speed of approximately 2000 to approximately 3500 revolutions per minute (rpm), and most preferably approximately 3000 revolutions per minute (rpm).

Non-Military and Civilian Applications

In the foregoing description, attack craft 5 is described in the context of its use for military applications. However, it should be appreciated that attack craft 5 may also be used for other, non-military applications such as security applications (e.g., police, immigration and drug enforcement purposes), public safety applications (e.g., sea rescues), high-speed servicing and re-supply applications (e.g., for servicing oil drilling platforms), high-speed water taxi applications, private pleasure craft applications, etc.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A marine vessel comprising:
   a command module;
   first and second buoyant tubular foils; and
   first and second struts for connecting the first and second buoyant tubular foils to the command module, respectively;
   wherein the first and second buoyant tubular foils provide substantially all of the buoyancy required for the marine vessel;
   wherein the first and second struts are pivotally connected to the command module and fixedly connected to the first and second buoyant tubular foils, respectively;
   wherein the first and second struts comprise substantially rigid planar structures;
   at least one first duct for transmitting fluid between the command module and the first buoyant tubular foil, and at least one second duct for transmitting fluid between the command module and the second tubular foil; and
   at least one first flexible coupling disposed at the junction of the at least one first duct and the command module so as to fluidically connect the at least one first duct to the command module regardless of the disposition of the first strut relative to the command module, and at least one second flexible coupling disposed at the junction of the at least one second duct and the command module so as to fluidically connect the at least one second duct to the command module regardless of the disposition of the second strut relative to the command module.

2. A method for moving through water, the method comprising:
   providing a marine vessel comprising:
      a command module;
      first and second buoyant tubular foils; and
      first and second struts for connecting the first and second buoyant tubular foils to the command module, respectively;
      wherein the first and second buoyant tubular foils provide substantially all of the buoyancy required for the marine vessel;
      wherein the first and second struts are pivotally connected to the command module and fixedly connected to the first and second buoyant tubular foils, respectively;
      wherein the first and second struts comprise substantially rigid planar structures;
      at least one first duct for transmitting fluid between the command module and the first buoyant tubular foil, and at least one second duct for transmitting fluid between the command module and the second tubular foil; and
      at least one first flexible coupling disposed at the junction of the at least one first duct and the command module so as to fluidically connect the at least one first duct to the command module regardless of the disposition of the first strut relative to the command module, and at least one second flexible coupling disposed at the junction of the at least one second duct and the command module so as to fluidically connect the at least one second duct to the command module regardless of the disposition of the second strut relative to the command module; and
   moving the marine vessel through water and adjusting the position of the first and second struts relative to the command module.

* * * * *